United States Patent
Seto et al.

[11] Patent Number: 5,754,188
[45] Date of Patent: May 19, 1998

[54] DATA PROCESSING APPARATUS

[75] Inventors: Kaoru Seto, Chigasaki; Hiroshi Mano; Toshio Yoshimoto, both of Tokyo; Takashi Soya, Kawasaki; Atsushi Kashihara, Hachioji; Masaharu Ohkubo, Yokohama; Hiroshi Sasame, Yokohama; Hiromichi Yamada, Yokohama; Masaki Ojima, Midori-ku; Michio Ito, Hachioji; Takashi Kawana, Yokohama; Seiji Uchiyama; Tetsuo Saito, both of Tokyo; Hiroshi Atobe, Yokohama, all of Japan

[73] Assignee: Canon Kabushiki Kaisha, Tokyo, Japan

[21] Appl. No.: 22,406

[22] Filed: Feb. 24, 1993

Related U.S. Application Data

[63] Continuation of Ser. No. 398,822, Aug. 22, 1989, abandoned.

[30] Foreign Application Priority Data

| Aug. 25, 1988 | [JP] | Japan | 63-211501 |
| Aug. 26, 1988 | [JP] | Japan | 63-211909 |
| Aug. 26, 1988 | [JP] | Japan | 63-211912 |
| Aug. 29, 1988 | [JP] | Japan | 63-215922 |
| Dec. 7, 1988 | [JP] | Japan | 63-307757 |
| Dec. 7, 1988 | [JP] | Japan | 63-310880 |
| Dec. 9, 1988 | [JP] | Japan | 63-311731 |
| Jan. 6, 1989 | [JP] | Japan | 64-496 |

[51] Int. Cl.$^6$ .................... G06F 15/00
[52] U.S. Cl. .................... 345/472
[58] Field of Search ........... 395/129, 132, 395/130; 340/728, 731, 747, 750; 345/467, 471, 472, 128, 130

[56] References Cited

U.S. PATENT DOCUMENTS

| 3,539,998 | 11/1970 | Belchar et al. | 364/200 |
| 3,949,375 | 4/1976 | Ciarlo | 340/172.5 |
| 4,725,892 | 2/1988 | Suzuki et al. | 358/287 |
| 4,809,345 | 2/1989 | Tabata et al. | 382/47 |
| 4,812,968 | 3/1989 | Poole | 364/200 |

FOREIGN PATENT DOCUMENTS

| 0029913 | 6/1981 | European Pat. Off. |
| 0079542 | 5/1983 | European Pat. Off. |
| 0319976 | 6/1989 | European Pat. Off. |
| 57-135177 | 8/1982 | Japan |
| 62165477 | 1/1988 | Japan |
| 63-12019 | 1/1988 | Japan |
| 62245864 | 4/1988 | Japan |
| 63-172664 | 7/1988 | Japan |
| 63-182969 | 7/1988 | Japan |
| 63-203341 | 8/1988 | Japan |
| 63-256457 | 10/1988 | Japan |
| WO86/4703 | 8/1986 | WIPO |

*Primary Examiner*—Phu K. Nguyen
*Attorney, Agent, or Firm*—Fitzpatrick, Cella, Harper & Scinto

[57] ABSTRACT

A data processing apparatus includes an image data generating section for generating image data, and an interpolation image data forming section for forming and outputting interpolation image data based on the image data generated by the image data generating section. The interpolation image data forming section includes a memory for storing the image data generated by the image data generating section.

9 Claims, 77 Drawing Sheets

Q= (A+G)*a*b*c*d*e*f*g
  + (B+F)*b*c*d*e*f
  + (C+E)*c*d*e
  + D*d

Q= (B+F)*b*c*d*e*f
 +(b+f)*B*C*D*E*F
 +(C+E)*c*d*e
 +(c+e)*C*D*E
 + D*d
 + A*B*C*D*E*F*G
 + a*b*c*d*e*f*g

Q : PIXEL UNDER CONSIDERATION

```
Q= (A+O) *a*b*c*d*e*f*g*h*i*j*k*l*m*n*o
  + (B+N) *b*c*d*e*f*g*h*i*j*k*l*m*n
  + (C+M) *c*d*e*f*g*h*i*j*k*l*m
  + (D+L) *d*e*f*g*h*i*j*k*l
  + (E+K) *e*f*g*h*i*j*k
  + (F+J) *f*g*h*i*j
  + (G+I) *g*h*i
  + H*h
  + (a+o) *A*B*C*D*E*F*G*H*I*J*K*L*M*N*O
  + (b+n) *B*C*D*E*F*G*H*I*J*K*L*M*N
  + (c+m) *C*D*E*F*G*H*I*J*K*L*M
  + (d+l) *D*E*F*G*H*I*J*K*L
  + (e+k) *E*F*G*H*I*J*K
  + (f+j) *F*G*H*I*J
  + (g+i) *G*H*I
  + A*B*C*D*E*F*G*H*I*J*K*L*M*N*O
  + a*b*c*d*e*f*g*h*i*j*k*l*m*n*o
```

SUB-SCAN DIRECTION

MAIN-SCAN DIRECTION

2B PIXEL AT ISSUE

⊘ ILLUMINATING PORTION

○ ILLUMINATING PORTION OR NON-ILLUMINATING PORTION

■ NORMAL PRINT

• LOW BRIGHTNESS PRINT

FIG. 26A
FIG. 26B
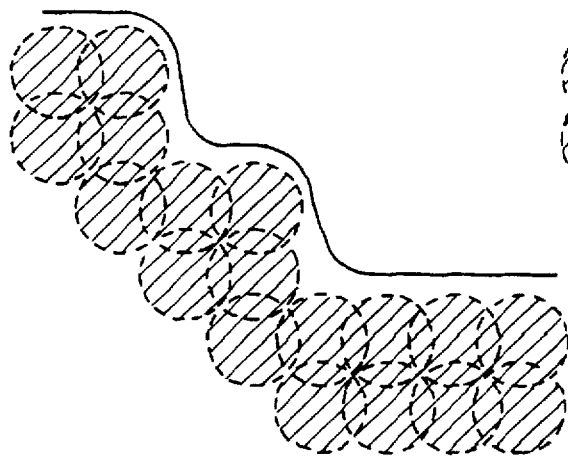
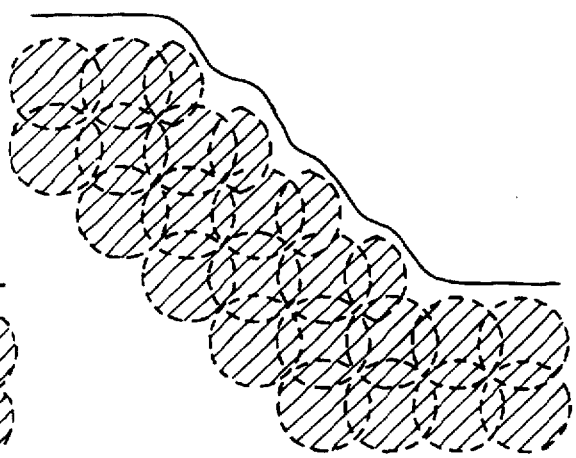
FIG. 27
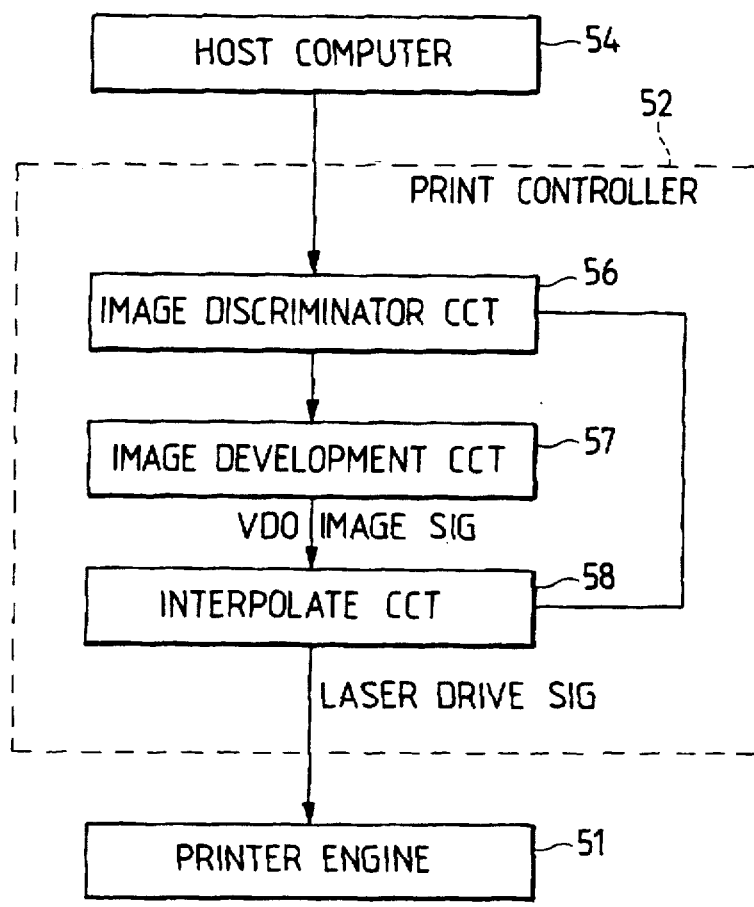

FIG. 28
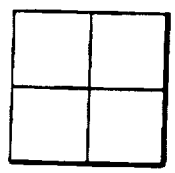 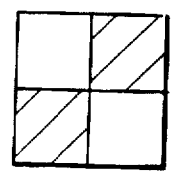 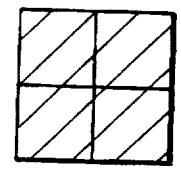
FIG. 29
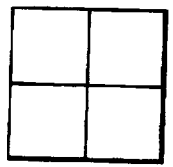 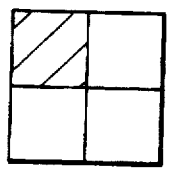 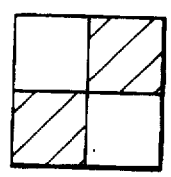 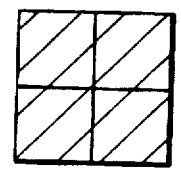
FIG. 30
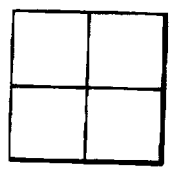 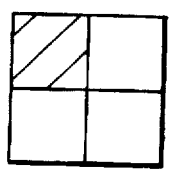 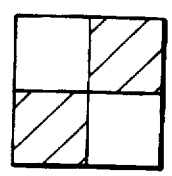 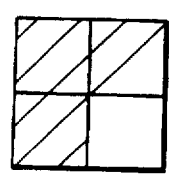 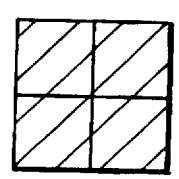

(X1, X2, X3): PIXEL UNDER CONSIDERATION

FIG. 52-1

| 1A | 1B | 1C | 1D | 1E | 1F | 1G |

| 2A | 2B | 2C | 2D | 2E | 2F | 2G |

Q : PIXEL UNDER CONSIDERATION

| 3A | 3B | 3C | 3D | 3E | 3F | 3G |

| 4A | 4B | 4C | 4D | 4E | 4F | 4G |

2G\*3B\*3C\*3D\*3E\*3F\*$\overline{2A}$
+2A\*3B\*3C\*3D\*3E\*2F\*$\overline{2G}$ +2F\*3C\*3D\*3E\*$\overline{2B}$
+2B\*3C\*3D\*3E\*$\overline{2F}$

+2E\*3D
+2C\*3D

+3A\*2B\*2C\*2D\*2E\*2F
+3G\*2B\*2C\*2D\*2E\*2F

+3B\*2C\*2D\*2E
+3F\*2C\*2D\*2E

+3C\*2D
+3E\*2D

+1E\*2E\*3E\*4C\*$\overline{1C}$
+1C\*2E\*3E\*4E\*$\overline{4C}$

+2E\*3C
+2C\*3E

+1C\*2C\*3C\*4E\*$\overline{1E}$
+1E\*2C\*3C\*4C\*$\overline{4E}$

+2D\*3D
+2A\*2B\*2C\*2D\*2E\*2F\*2G

FIG. 52-2
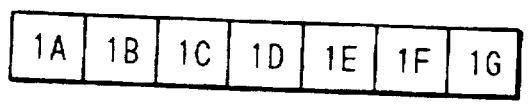
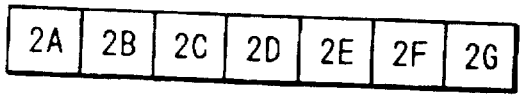
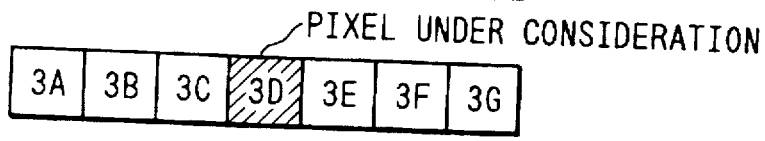
PIXEL UNDER CONSIDERATION
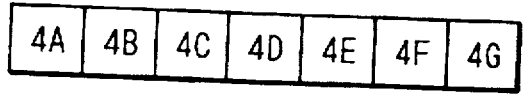
```
3D
+4C*2E*3E*2C̄
+2C*3E*4E*4C̄
+4E*2C*3C*2Ē
+2E*3C*4C*4Ē
```
FIG. 53-1
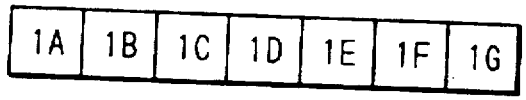
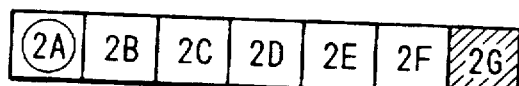
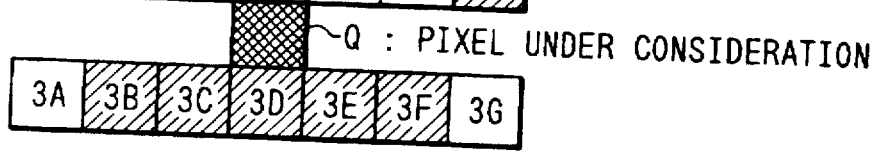
Q : PIXEL UNDER CONSIDERATION
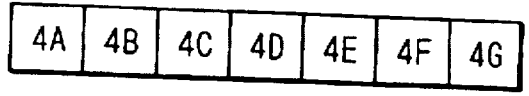

FIG. 53-2
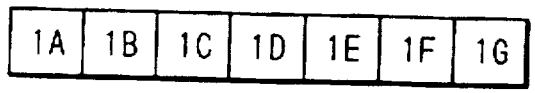
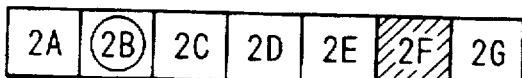
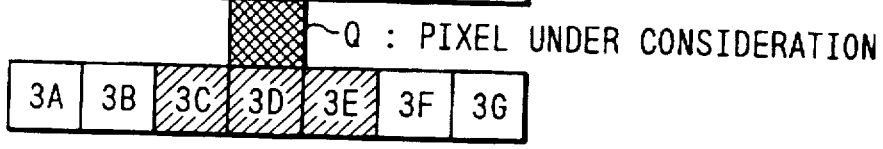
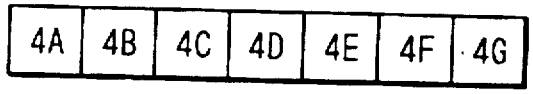
Q : PIXEL UNDER CONSIDERATION
2F*3C*3D*3E*$\overline{2B}$
FIG. 53-3
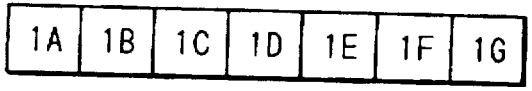
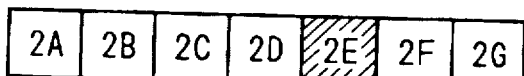
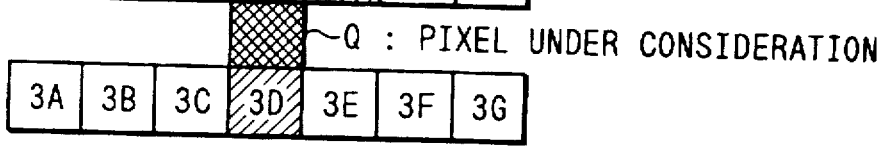
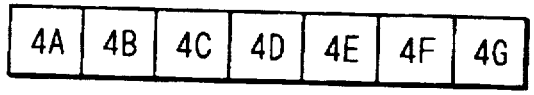
Q : PIXEL UNDER CONSIDERATION
2E*3D FIG. 54A
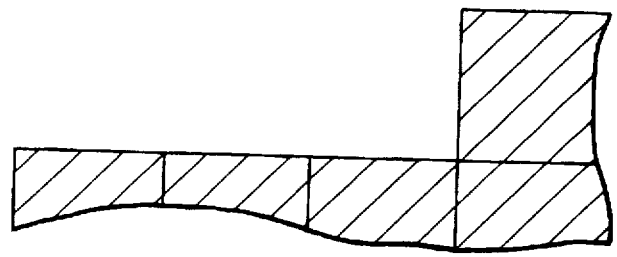
FIG. 54B
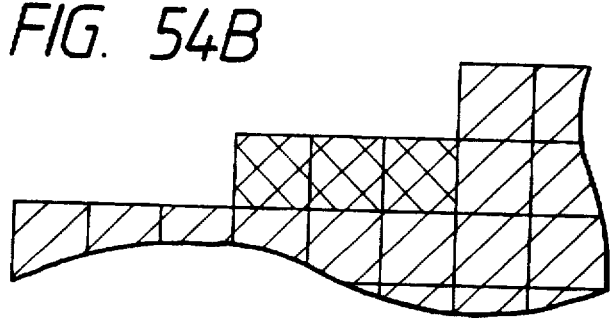

FIG. 55-1
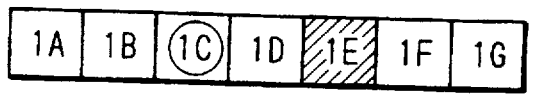
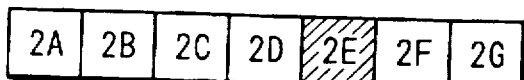
Q : PIXEL UNDER CONSIDERATION
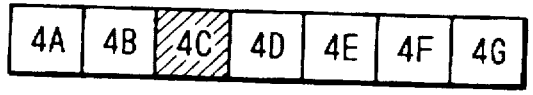
4C*1E*2E*3E*$\overline{1C}$
FIG. 55-2
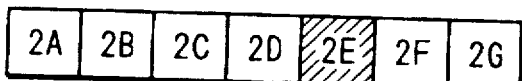
Q : PIXEL UNDER CONSIDERATION
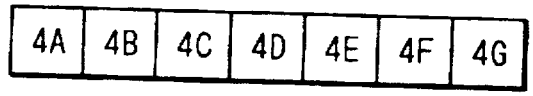
3C*2E

2D*3D

4C*2E*3E*$\overline{2C}$

FIG. 60

| 1A | 1B | 1C | 1D | 1E | 1F | 1G |

| 2A | 2B | 2C | 2D | 2E | 2F | 2G |

Q : PIXEL UNDER CONSIDERATION

| 3A | 3B | 3C | 3D | 3E | 3F | 3G |

| 4A | 4B | 4C | 4D | 4E | 4F | 4G |

$2G*3B*3C*3D*3E*3F*\overline{2A}*\overline{1G}$
$+2A*3B*3C*3D*3E*2F*\overline{2G}*\overline{1A}$ $+2F*3C*3D*3E*\overline{2B}*\overline{1F}$
$+2B*3C*3D*3E*\overline{2F}*\overline{1B}$ $+2E*3D*\overline{1E}$
$+2C*3D*\overline{1C}$ $+3A*2B*2C*2D*2E*2F$
$+3G*2B*2C*2D*2E*2F$ $+3B*2C*2D*2E$
$+3F*2C*2D*2E$ $+3C*2D$
$+3E*2D$ $+1E*2E*3E*4C*\overline{1C}*\overline{4B}$
$+1C*2E*3E*4E*\overline{4C}*\overline{1B}$ $+2E*3C*(\overline{3B}+\overline{2E})$
$+2C*3E*(\overline{2B}+\overline{3F})$ $+1C*2C*3C*4E*\overline{1E}*\overline{4F}$
$+1E*2C*3C*4C*\overline{4E}*\overline{1F}$ $+2D*3D$
$+2A*2B*2C*2D*2E*2F*2G$

FIG. 61

| 1A | 1B | 1C | 1D | 1E | 1F | 1G |

| 2A | 2B | 2C | 2D | 2E | 2F | 2G |

PIXEL UNDER CONSIDERATION

| 3A | 3B | 3C | 3D | 3E | 3F | 3G |

| 4A | 4B | 4C | 4D | 4E | 4F | 4G |

3D
+4C*2E*3E*$\overline{2C}$*$\overline{4B}$
+2C*3E*4E*$\overline{4C}$*$\overline{2B}$
+4E*2C*3C*$\overline{2E}$*$\overline{4F}$
+2E*3C*4C*$\overline{4E}$*$\overline{2F}$

FIG. 62-1

| 1A | 1B | 1C | 1D | 1E | 1F | (1G) |

| (2A) | 2B | 2C | 2D | 2E | 2F | 2G |

Q : PIXEL UNDER CONSIDERATION

| 3A | 3B | 3C | 3D | 3E | 3F | 3G |

| 4A | 4B | 4C | 4D | 4E | 4F | 4G |

2G*3B*3C*3D*3E*3F*$\overline{2A}$*$\overline{1G}$

FIG. 62-2
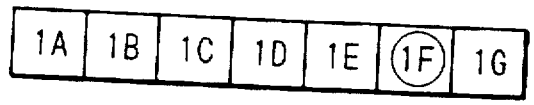
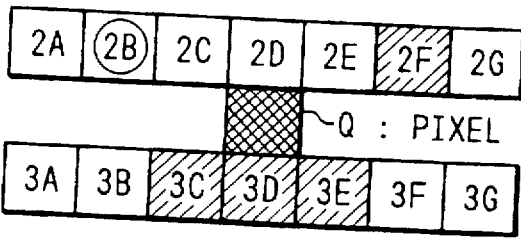
Q : PIXEL UNDER CONSIDERATION
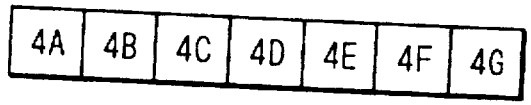
$2F*3C*3D*3E*\overline{2B}*\overline{\overline{1F}}$
FIG. 62-3
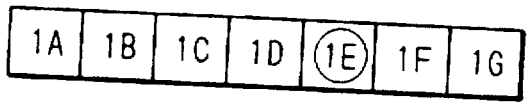
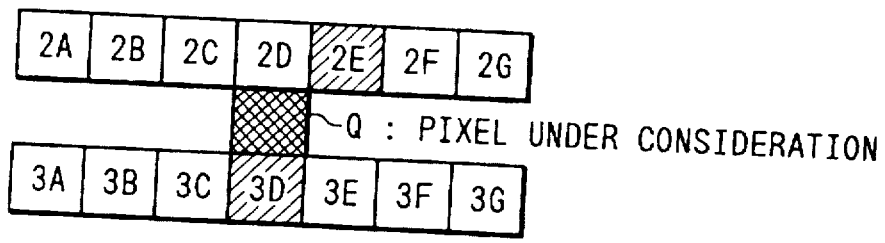
Q : PIXEL UNDER CONSIDERATION
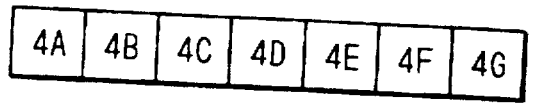
$2E*3D*\overline{\overline{1E}}$

FIG. 62-4
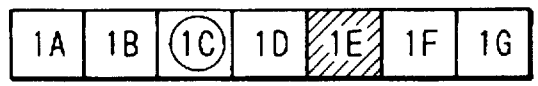
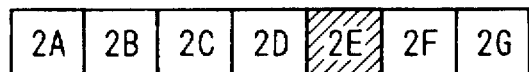
Q : PIXEL UNDER CONSIDERATION
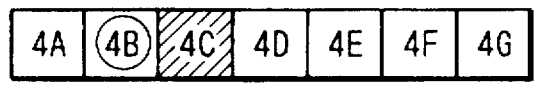
4C∗1E∗2E∗3E∗$\overline{1C}$∗$\overline{4B}$
FIG. 62-5
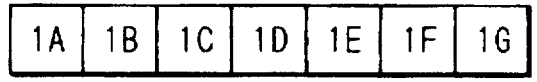
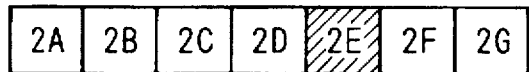
Q : PIXEL UNDER CONSIDERATION
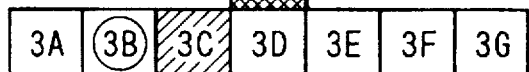
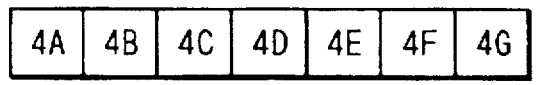
3C∗2E∗$\overline{3B}$

FIG. 62-6

| 1A | 1B | 1C | 1D | 1E | 1F | 1G |

| 2A | 2B | (2C) | 2D | ▨2E▨ | 2F | 2G |

PIXEL UNDER CONSIDERATION

| 3A | 3B | 3C | ▩3D▩ | ▨3E▨ | 3F | 3G |

| 4A | (4B) | ▨4C▨ | 4D | 4E | 4F | 4G |

4C∗2E∗3E∗$\overline{2C}$∗$\overline{4B}$

FIG. 65

| 1X | 1Y | 1Z | 1A | 1B | 1C | 1D | 1E | 1F | 1G | 1H | 1I | 1J |

| 2X | 2Y | 2Z | 2A | 2B | 2C | 2D | 2E | 2F | 2G | 2H | 2I | 2J |

Q : PIXEL UNDER CONSIDERATION

| 3X | 3Y | 3Z | 3A | 3B | 3C | 3D | 3E | 3F | 3G | 3H | 3I | 3J |

| 4X | 4Y | 4Z | 4A | 4B | 4C | 4D | 4E | 4F | 4G | 4H | 4I | 4J |

$2B*2C*2D*2E*2F*2G*2H*\overline{3B}*\overline{3C}*\overline{3D}*\overline{3E}*\overline{3F}*\overline{3G}*\overline{3H}*1A*\overline{2A}$
$+2C*2D*2E*2F*2G*2H*2I*\overline{3C}*\overline{3D}*\overline{3E}*\overline{3F}*\overline{3G}*\overline{3H}*\overline{3I}*1B*\overline{2B}$
$+2D*2E*2F*2G*2H*2I*2J*\overline{3D}*\overline{3E}*\overline{3F}*\overline{3G}*\overline{3H}*\overline{3I}*\overline{3J}*1C*\overline{2C}$ $+2Z*2A*2B*2C*2D*2E*2F*\overline{3Z}*\overline{3A}*\overline{3B}*\overline{3C}*\overline{3D}*\overline{3E}*\overline{3F}*1G*\overline{2G}$
$+2Y*2Z*2A*2B*2C*2D*2E*\overline{3Y}*\overline{3Z}*\overline{3A}*\overline{3B}*\overline{3C}*\overline{3D}*\overline{3E}*1F*\overline{2F}$
$+2X*2Y*2Z*2A*2B*2C*2D*\overline{3X}*\overline{3Y}*\overline{3Z}*\overline{3A}*\overline{3B}*\overline{3C}*\overline{3D}*1E*\overline{2E}$

FIG. 66-1

| 1X | 1Y | 1Z | (1A) | 1B | 1C | 1D | 1E | 1F | 1G | 1H | 1I | 1J |

| 2X | 2Y | 2Z | (2A) | 2B | 2C | 2D | 2E | 2F | 2G | 2H | 2I | 2J |

Q : PIXEL UNDER CONSIDERATION

| 3X | 3Y | 3Z | 3A | (3B) | (3C) | (3D) | (3E) | (3F) | (3G) | (3H) | 3I | 3J |

| 4X | 4Y | 4Z | 4A | 4B | 4C | 4D | 4E | 4F | 4G | 4H | 4I | 4J |

$2B * 2C * 2D * 2E * 2F * 2G * 2H$
$* \overline{3B} * \overline{3C} * \overline{3D} * \overline{3E} * \overline{3F} * \overline{3G} * \overline{3H}$
$* \overline{1A} * \overline{2A}$

FIG. 66-2

| 1X | 1Y | 1Z | 1A | (1B) | 1C | 1D | 1E | 1F | 1G | 1H | 1I | 1J |

| 2X | 2Y | 2Z | 2A | (2B) | 2C | 2D | 2E | 2F | 2G | 2H | 2I | 2J |

Q : PIXEL UNDER CONSIDERATION

| 3X | 3Y | 3Z | 3A | 3B | (3C) | (3D) | (3E) | (3F) | (3G) | (3H) | (3I) | 3J |

| 4X | 4Y | 4Z | 4A | 4B | 4C | 4D | 4E | 4F | 4G | 4H | 4I | 4J |

$2C * 2D * 2E * 2F * 2G * 2H * 2I$
$* \overline{3C} * \overline{3D} * \overline{3E} * \overline{3F} * \overline{3G} * \overline{3H} * \overline{3I}$
$* \overline{1B} * \overline{2B}$

FIG. 66-3

| 1X | 1Y | 1Z | 1A | 1B | (1C) | 1D | 1E | 1F | 1G | 1H | 1I | 1J |

| 2X | 2Y | 2Z | 2A | 2B | (2C) | 2D | 2E | 2F | 2G | 2H | 2I | 2J |

Q : PIXEL UNDER CONSIDERATION

| 3X | 3Y | 3Z | 3A | 3B | 3C | (3D) | (3E) | (3F) | (3G) | (3H) | (3I) | (3J) |

| 4X | 4Y | 4Z | 4A | 4B | 4C | 4D | 4E | 4F | 4G | 4H | 4I | 4J |

$2D * 2E * 2F * 2G * 2H * 2I * 2J$
$* \overline{3D} * \overline{3E} * \overline{3F} * \overline{3G} * \overline{3H} * \overline{3I} * \overline{3J}$
$* \overline{1C} * \overline{2C}$

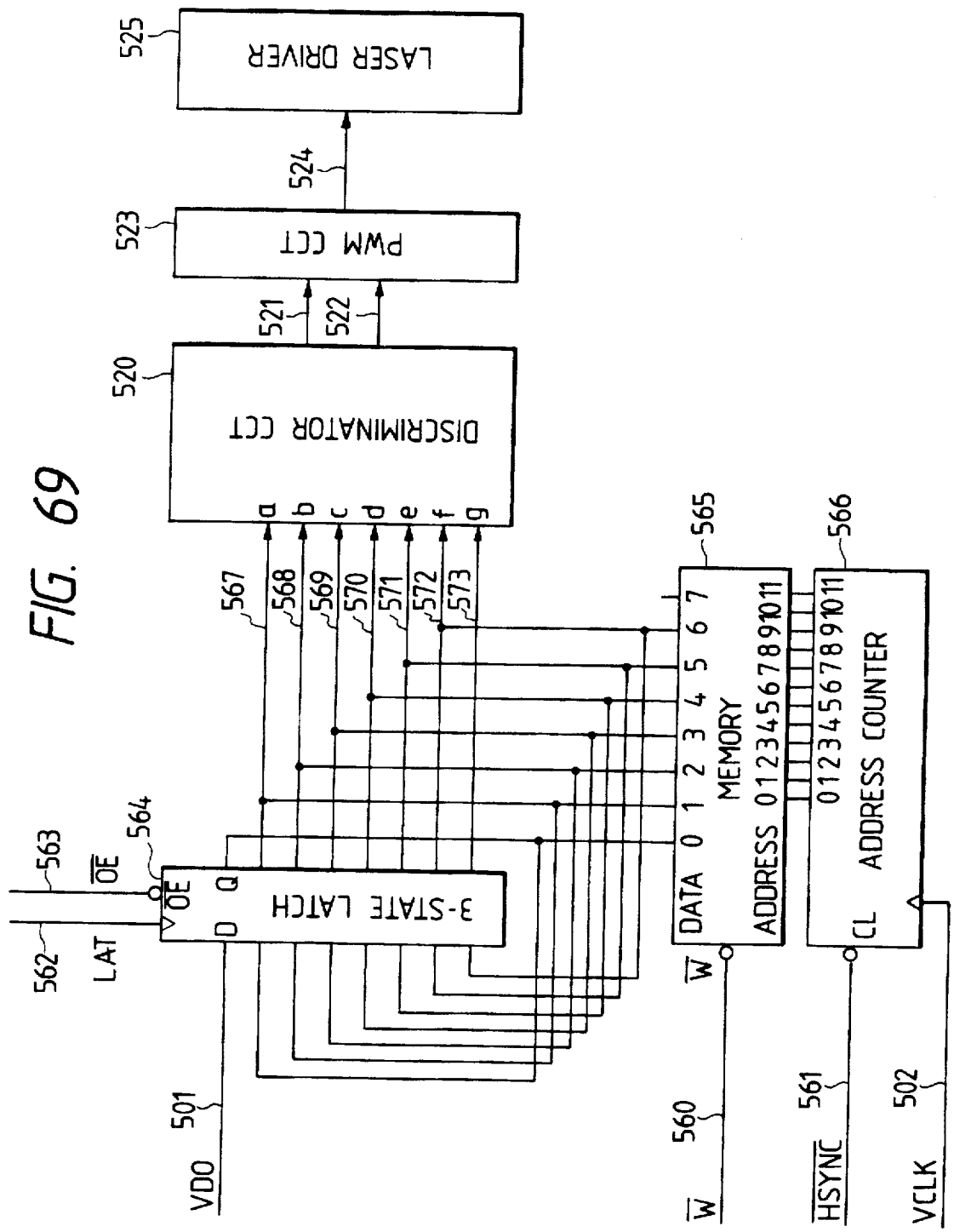

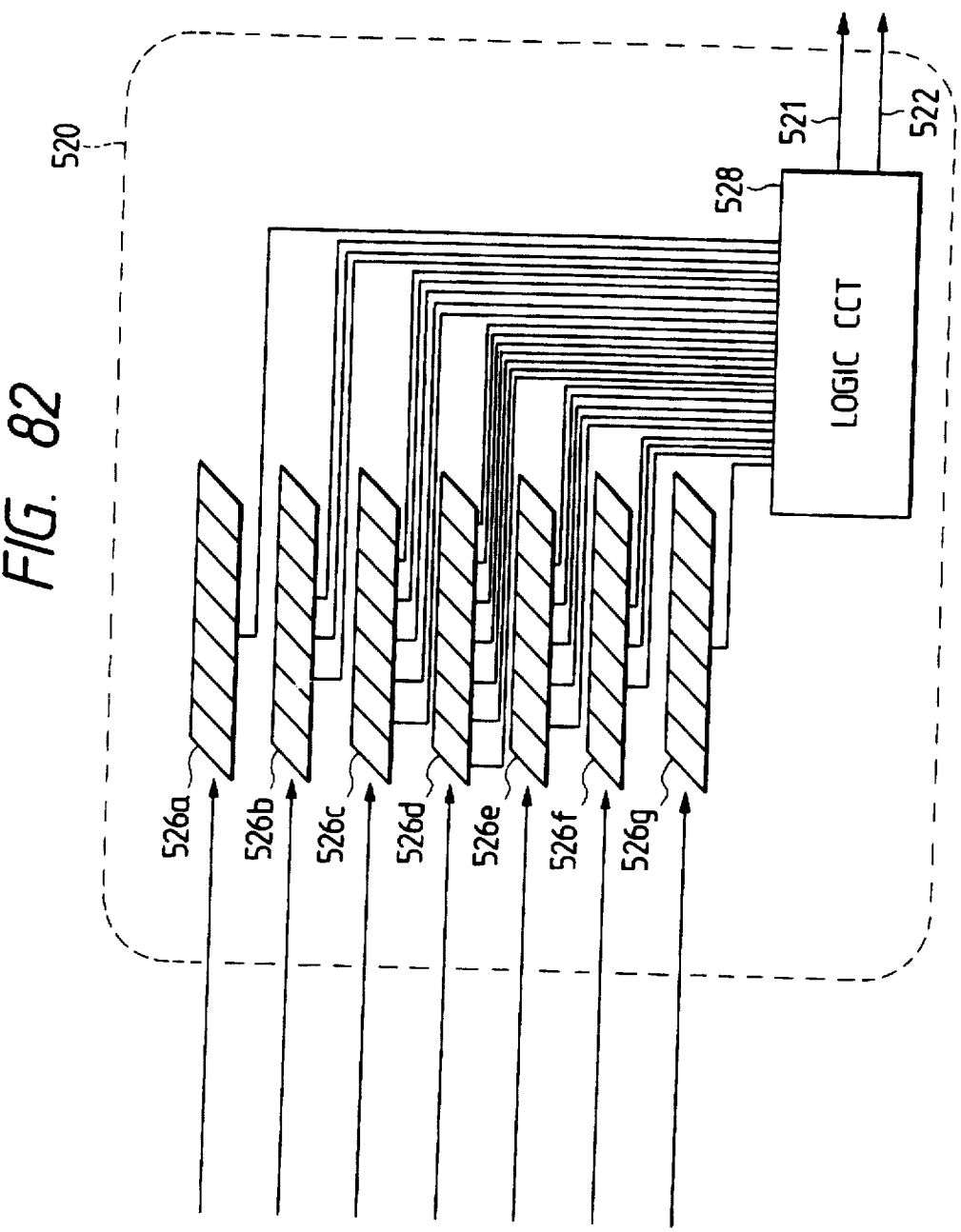

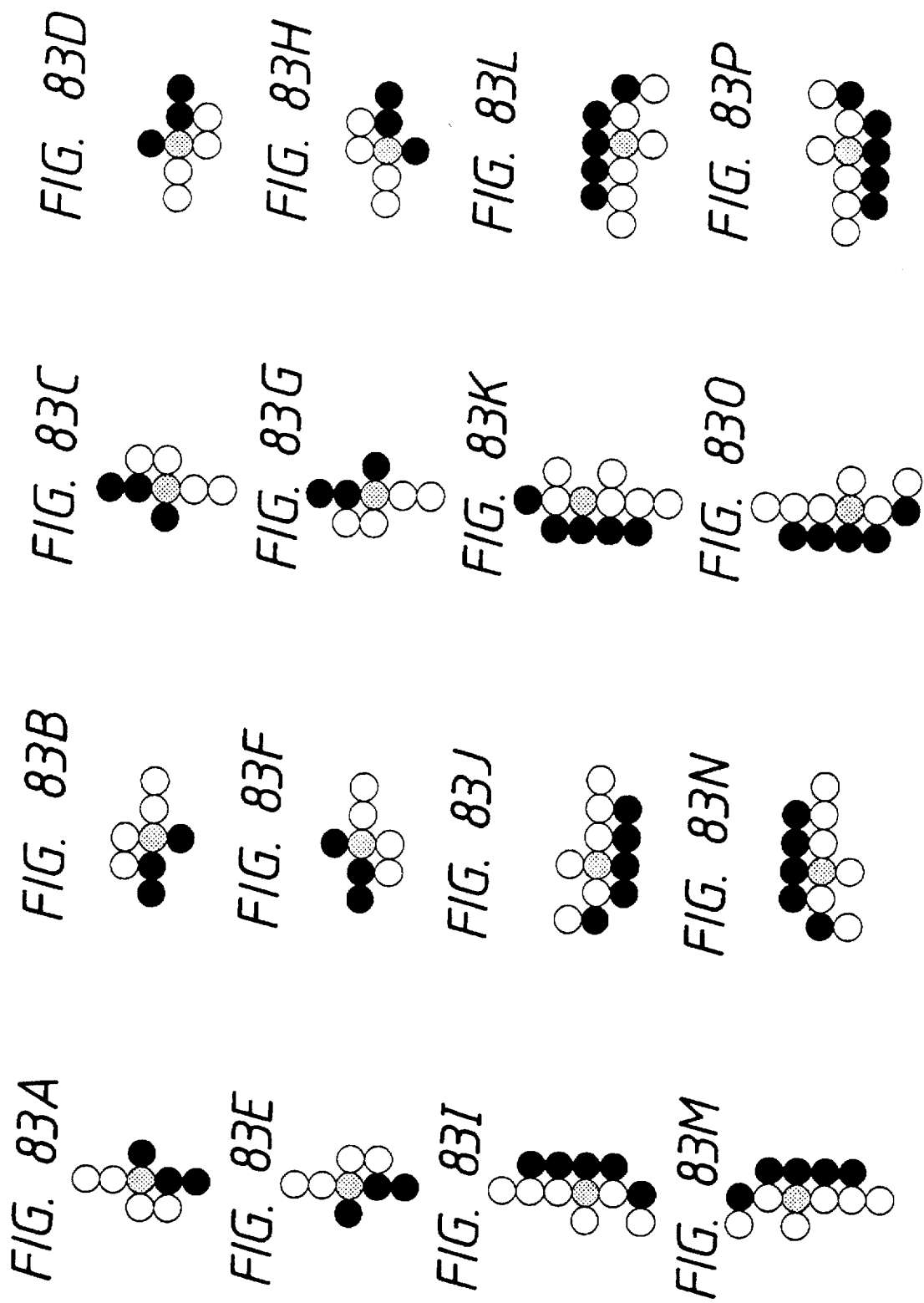

FIG. 84

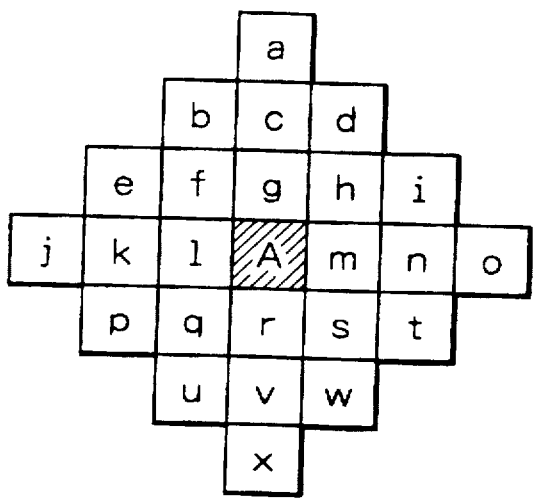

$$= (\overline{c}\cdot\overline{g}\cdot\overline{l}\cdot\overline{q}\cdot m\cdot r\cdot v + \overline{f}\cdot\overline{g}\cdot\overline{m}\cdot\overline{n}\cdot k\cdot l\cdot r + \overline{h}\cdot\overline{m}\cdot\overline{r}\cdot\overline{v}\cdot c\cdot g\cdot l$$
$$+ \overline{k}\cdot\overline{l}\cdot\overline{r}\cdot\overline{s}\cdot g\cdot m\cdot n + \overline{c}\cdot\overline{g}\cdot\overline{m}\cdot\overline{s}\cdot l\cdot r\cdot v + \overline{m}\cdot\overline{n}\cdot\overline{q}\cdot\overline{r}\cdot g\cdot k\cdot l$$
$$+ \overline{f}\cdot\overline{l}\cdot\overline{r}\cdot\overline{v}\cdot c\cdot g\cdot m + \overline{g}\cdot\overline{h}\cdot\overline{k}\cdot\overline{l}\cdot m\cdot n\cdot r + \overline{a}\cdot\overline{c}\cdot\overline{g}\cdot\overline{l}\cdot\overline{r}\cdot\overline{u}\cdot d\cdot h\cdot m\cdot s\cdot v$$
$$+ \overline{e}\cdot\overline{l}\cdot\overline{g}\cdot\overline{m}\cdot\overline{n}\cdot\overline{o}\cdot k\cdot g\cdot r\cdot s\cdot t + \overline{d}\cdot\overline{g}\cdot\overline{m}\cdot\overline{r}\cdot\overline{v}\cdot\overline{x}\cdot c\cdot f\cdot l\cdot q\cdot u$$
$$+ \overline{j}\cdot\overline{k}\cdot\overline{l}\cdot\overline{r}\cdot\overline{m}\cdot\overline{t}\cdot e\cdot f\cdot g\cdot h\cdot n + \overline{b}\cdot\overline{g}\cdot\overline{l}\cdot\overline{r}\cdot\overline{v}\cdot\overline{x}\cdot c\cdot h\cdot m\cdot s\cdot w$$
$$+ \overline{p}\cdot\overline{l}\cdot\overline{r}\cdot\overline{m}\cdot\overline{n}\cdot\overline{o}\cdot k\cdot f\cdot g\cdot h\cdot i + \overline{a}\cdot\overline{c}\cdot\overline{g}\cdot\overline{m}\cdot\overline{r}\cdot\overline{w}\cdot b\cdot f\cdot l\cdot q\cdot v$$
$$+ \overline{j}\cdot\overline{k}\cdot\overline{l}\cdot\overline{g}\cdot\overline{m}\cdot\overline{i}\cdot p\cdot q\cdot r\cdot s\cdot n)\cdot\overline{A}$$

1

DATA PROCESSING APPARATUS

This application is a continuation of application Ser. No. 07/398,822 filed Aug. 22, 1989, now abandoned.

BACKGROUND OF THE INVENTION

(1) Field of the Invention

The present invention relates to a data processing apparatus for processing input data and, more particularly, to a data processing apparatus suitably used for a recording apparatus and the like.

(2) Related Background Art

In recent years, laser beam printers have been widely used as output apparatuses of computers. Especially, a laser beam printer having a low density (e.g., 300 dpi) has been increasingly popular since it is inexpensive and compact.

A laser beam printer for performing a printing operation at a printing density of, e.g., 300 dpi comprises a printer engine 51 for actually performing a printing operation on a photosensitive drum on the basis of dot data, and a printer controller 52, connected to the printer engine 51, for receiving code data supplied from an external host computer 54, generating page information consisting of dot data on the basis of the input code data, and for sequentially transmitting the dot data to the printer engine 51, as shown in FIG. 1. The host computer 54 is loaded with a program from a floppy disk 55 having an application software program, invokes the application software program, and serves as, e.g., a word-processor.

A large number of application software programs have been developed and commercially available. Users create and preserve many data using these application software programs.

On the other hand, the printing density of the printer engine is increasing for the purpose of higher-quality printing. In recent years, printer engines having a printing density of 600 dpi or more have been introduced. Printer controllers connected to these high-density printer engines (600 dpi) must have a data memory having a capacity corresponding to the printing density (600 dpi) (e.g., for 600 dpi, a memory four times that for 300 dpi is required). In addition, application software programs must be developed exclusively for high-density printers, and the above-mentioned many application software programs cannot be used in the high-density printers as they are.

For example, FIGS. 2, 45, and 46 show dot configurations of letters "a", "G", and "t" at a printing density of 300 dpi.

When these characters with the above dot configurations are printed at a printing density of 600 dpi, the characters are reduced in size to ½ in both the vertical and horizontal directions.

As one data interpolation method, the dot configuration is simply doubled in both the vertical and horizontal directions, so that the dot configuration at 300 dpi is applied to 600 dpi. More specifically, when the dot configurations are converted as shown in FIGS. 3, 47, and 48, the characters can be prevented from being reduced in size. However, indentations at the edges of the characters formed at 300 dpi cannot be improved at 600 dpi. Thus, a fine character corresponding to the performance of the 600-dpi printer engine cannot be obtained.

Although conventional printers capable of obtaining outputs with different resolutions (U.S. Pat. Nos. 4,528,561 and 4,393,387) have been proposed, they are required to be further improved.

SUMMARY OF THE INVENTION

It is an object of the present invention to eliminate the conventional drawbacks.

It is another object of the present invention to improve a data processing apparatus.

It is still another object of the present invention to provide a data processing apparatus capable of obtaining a high-quality reproduced image.

It is still another object of the present invention to provide a data processing apparatus capable of obtaining a high-quality recording output when it is applied to a recording apparatus.

It is still another object of the present invention to provide a data processing apparatus capable of obtaining a good image output with a simple arrangement.

It is still another object of the present invention to provide a data processing apparatus which can perform a high-density printing operation directly using many application software programs which are created for a low-printing density.

It is still another object of the present invention to provide a data processing apparatus which can convert printing data developed for a low printing density into high-density printing data and can perform a high-quality printing operation at the high printing density.

It is still another object of the present invention to provide a data processing apparatus which can perform high-quality recording at a high density.

It is still another object of the present invention to provide a data processing apparatus which can perform optimal processing for an image signal.

It is still another object of the present invention to provide a data processing apparatus which can create optimally interpolated dot information.

It is still another object of the present invention to provide a data processing apparatus which can process a pixel signal at low cost.

The above and other objects of the present invention will be apparent from the description taken in conjunction with the accompanying drawing and appended claims.

BRIEF DESCRIPTION OF THE DRAWINGS

FIGS. 26A and 26B show a printing sample of the fifth embodiment;

FIG. 27 is a block diagram of a printing system according to a sixth embodiment of the present invention;

FIGS. 28 to 30 are explanatory views when multi-value image data is expressed by binary data;

FIGS. 52-1 to 52-3 are views for explaining logics of a logic circuit;

FIGS. 54A and 54B show printing samples before and after interpolation processing;

FIGS. 55-1 to 55-3 and FIG. 56 are views for explaining logics of the logic circuit;

FIGS. 60, 61 and 62-1 to 62-6 are views for explaining logics according to a 13th embodiment of the present invention;

FIGS. 65 and 66-1 to 66-3 are views for explaining logics according to a 14th embodiment of the present invention;

FIG. 69 is a block diagram showing an image processing apparatus according to a 15th embodiment of the present invention;

FIG. 82 is a circuit diagram of a discriminator circuit 520;

FIGS. 83A to 83P, and 84 are views for explaining a discriminate operation;

DETAILED DESCRIPTION OF THE PREFERRED EMBODIMENTS:

(First Embodiment)

Embodiments of the present invention will now be described in detail with reference to the accompanying drawings.

Figure 4A:
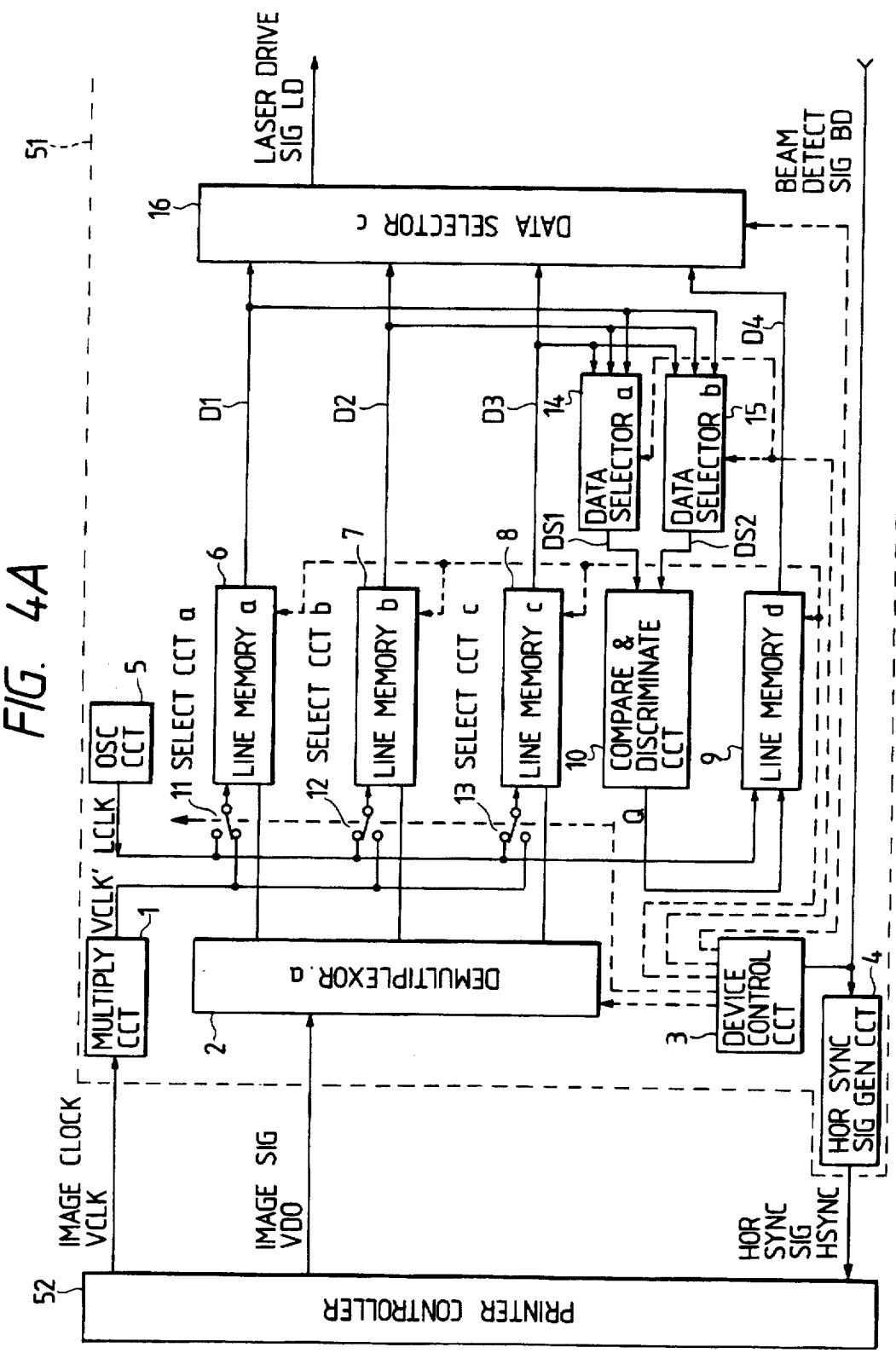
FIG. 4A is a block diagram showing a data conversion circuit according to a first embodiment of the present invention.

FIG. 4A shows a first embodiment of the present invention. A circuit shown in FIG. 4A is a data conversion circuit inserted between a printer controller 52 and a printer engine 51 shown in FIG. 1, and is arranged as a part of the printer engine 51 (or may be arranged as a part of the printer controller). The data conversion circuit of FIG. 4A is constituted under conditions that the printer controller outputs an image signal (dot data) for 300 dpi, and the printer engine has a printing density of 600 dpi. Note that the printer engine comprises a laser driver for modulating a laser beam on the basis of an image signal (dot data), a scanner for scanning the beam, a photosensitive drum, and the like, as is well known.

The printer controller 52 supplies a 300-dpi image signal VDO and an image clock signal VCLK to the printer engine 51 in accordance with a horizontal sync signal HSYNC output from a horizontal sync signal generation circuit 4. Note that the horizontal sync signal generation circuit 4 outputs the horizontal sync signal on the basis of a known beam detect signal (to be referred to as a BD signal hereinafter) as a sync signal in a main scan direction.

The printer engine causes the data conversion circuit to form a 600-dpi laser drive signal LD on the basis of the 300-dpi image signal VDO and the image clock signal VCLK, and performs printing.

The data conversion circuit will be described in more detail below with reference to FIG. 4A.

A frequency multiply circuit 1 multiplies the frequency of the image clock signal VCLK to obtain a clock signal VCLK' having a doubled frequency.

An oscillation circuit 5 generates a clock signal LCLK having a frequency four times that of the image clock signal VCLK.

Select circuits a (11), b (12), and c (13) select the clock signal VCLK' or LCLK and supply the selected clock signal as write or read clock signal for lines memories a to c.

A demultiplexer a (2) has a function of selectively supplying the image signal VDO to the line memories a (6), b (7), and c (8).

The horizontal sync signal generation circuit 4 counts the beam detect signal (BD signal), and outputs one horizontal sync signal HSYNC every two BD signals.

The image signal VDO is written in one of the line memories a to c in response to the clock signal VCLK' by the demultiplexer a (2), the select circuits a (11), b (12), and c (13), and a device control circuit 3 for controlling these circuits on the basis of the BD signal in units of lines, and image signals are read out from the two remaining line memories on the basis of the clock signal LCLK. This operation is performed in turn. That is, when image signal write access of the line memory a (6) is performed, image signal read access of the line memories b (7) and c (8) is performed. At the next timing, image signal write access of the line memory b and image signal read access of the line memories c and a is performed. At the next timing, image signal write access of the line memory c and image signal read access of the line memories a and b is performed. Thus, such control operations are repeated.

Note that each of the line memories a, b, and c has a memory capacity twice that for 300-dpi data in the main scan direction, i.e., a memory capacity of 600-dpi data in the main scan direction. Image signals read out from the line memories a, b, and c are respectively represented by D1, D2, and D3.

Data selectors a (14) and b (15) select two signals, which are actually being subjected to read access, of the readout signals D1, D2, and D3 of the line memories a to c. For example, when the line memory a is subjected to image signal write access and the line memories b and c are subjected to image signal read access, the data selector a selects the readout data D2 of the line memory b and outputs a signal DS1, and the data selector b selects the readout data D3 of the line memory c and outputs a signal DS2. A compare and discriminate circuit 10 compares and discriminates these data, and outputs an output signal Q according to the comparison and discrimination results. A line memory d (9) stores the output signal Q, and has the same memory capacity as those of the line memories a to c. The line memory d uses the clock signal LCLK as write and read clock signals.

Image signal read/write access control of the line memories a to c and the line memory d and selection control of the data selectors a and b are executed by the device control circuit 3.

A data selector c (16) selects one of the signals D1, D2, and D3 read out from the line memories a to c, and a signal D4 read out from the line memory d, and outputs the selected signal as the laser drive signal LD. Selection control of the selector c is executed by the device control circuit 3.

Figure 5:
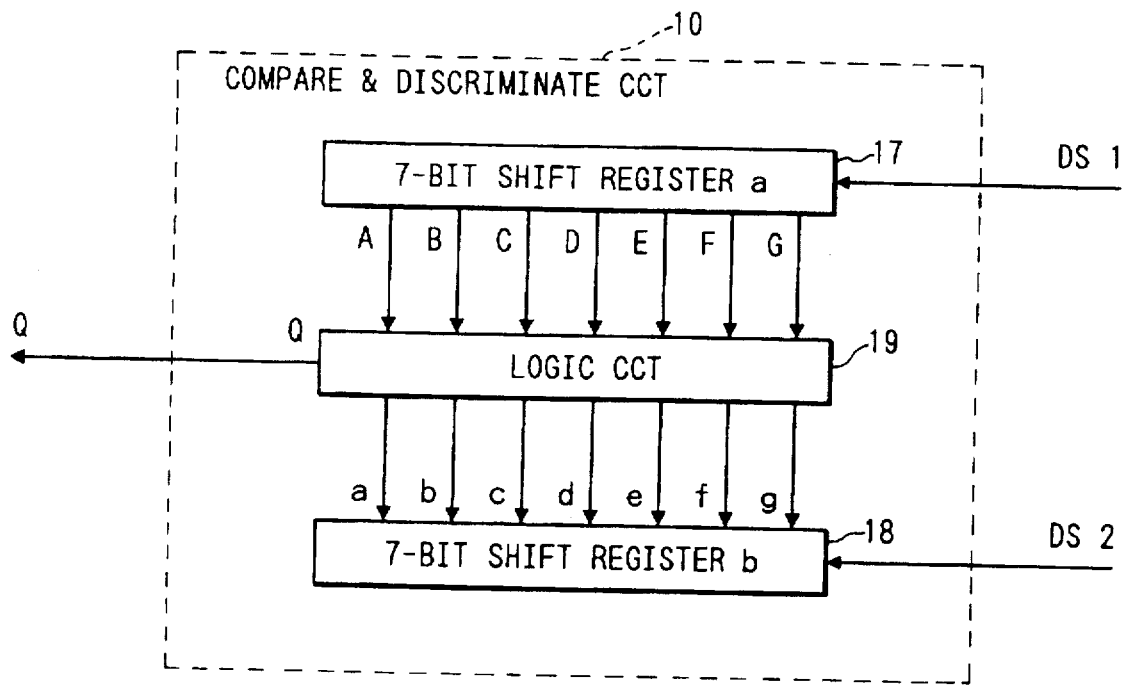
FIG. 5 is a block diagram showing a compare & discriminate circuit 10 of the first embodiment.

The compare and discriminate circuit 10 has an arrangement as shown in FIG. 5.

More specifically, the input signals DS1 and DS2 are respectively input to 7-bit shift registers a (17) and b (18). Shift outputs A, B, C, D, E, F, and G, and a, b, c, d, e, f, and g of the shift registers are input to a logic circuit 19.

Figure 6:
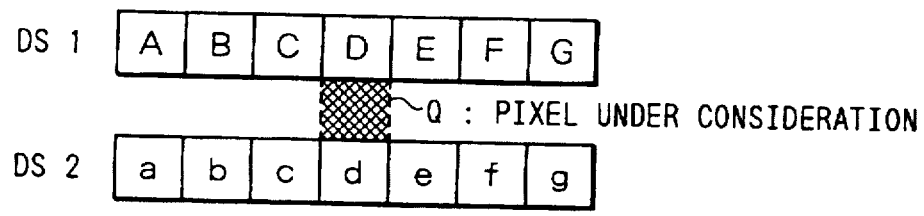
FIG. 6 shows a logical expression of a logic circuit 19.
Figure 7:
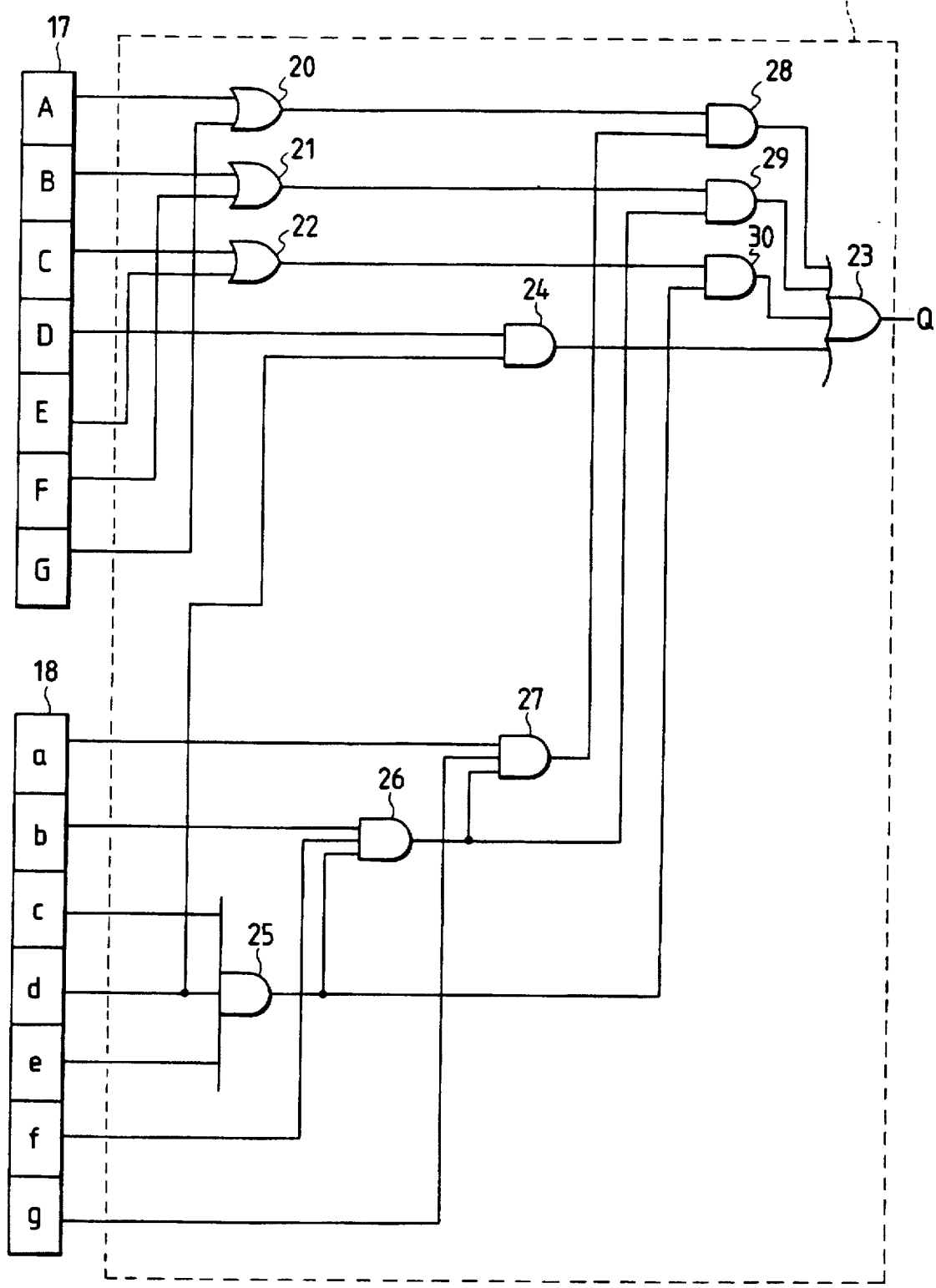
FIG. 7 is a circuit diagram showing the logic circuit 19.

The logic circuit 19 has a circuit arrangement shown in FIG. 7, and sets an output signal Q in units of pixels in accordance with the logical expression shown in FIG. 6.

The circuit shown in FIG. 7 includes OR gates 20 to 23 and AND gates 24 to 30. That is, the circuit shown in FIG. 7 execute the Q output logic shown in FIG. 6. Note that in the logical expressions in FIG. 6 and subsequent figures, symbol "*" represents an AND logic, and symbol "+" represents an OR logic.

Figure 8:
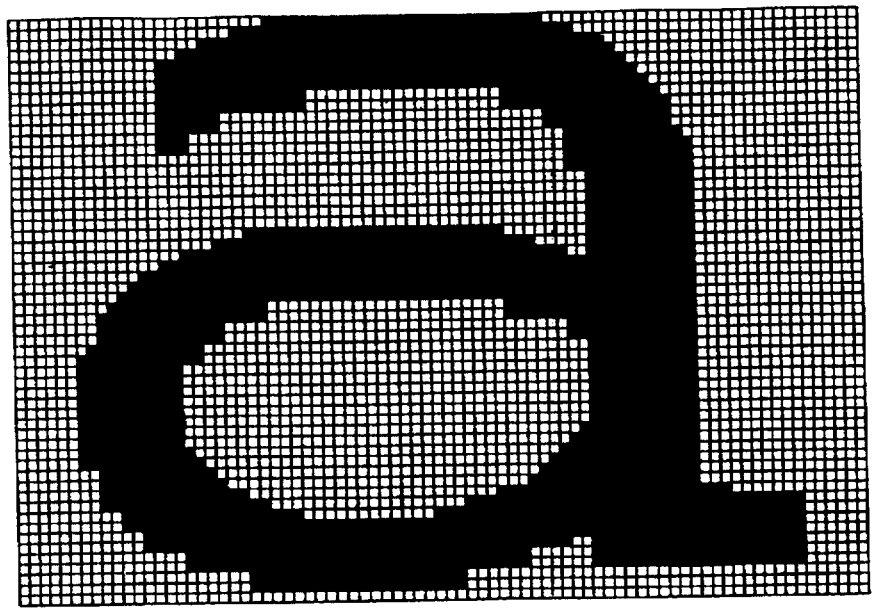
FIG. 8 shows a printing sample of the first embodiment.

FIG. 8 shows a dot image formed on the basis of the laser drive signal obtained by the circuit shown in FIG. 7 and the logical expression shown in FIG. 6.

Figure 3:
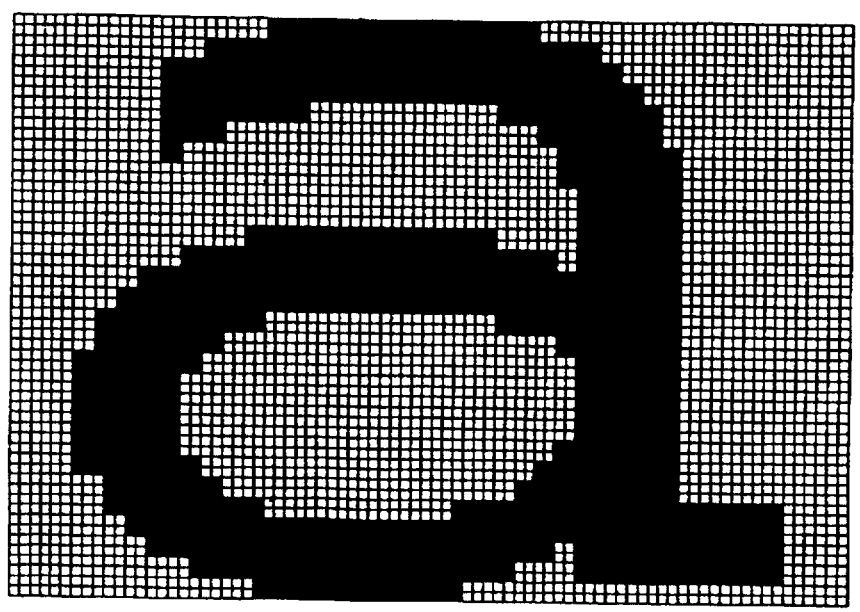
FIG. 3 shows a printing sample of density-converted dot information.

As can be understood from FIG. 8, inclined portions of letter "a" are improved as compared to that shown in FIG. 3.

Figure 4B:
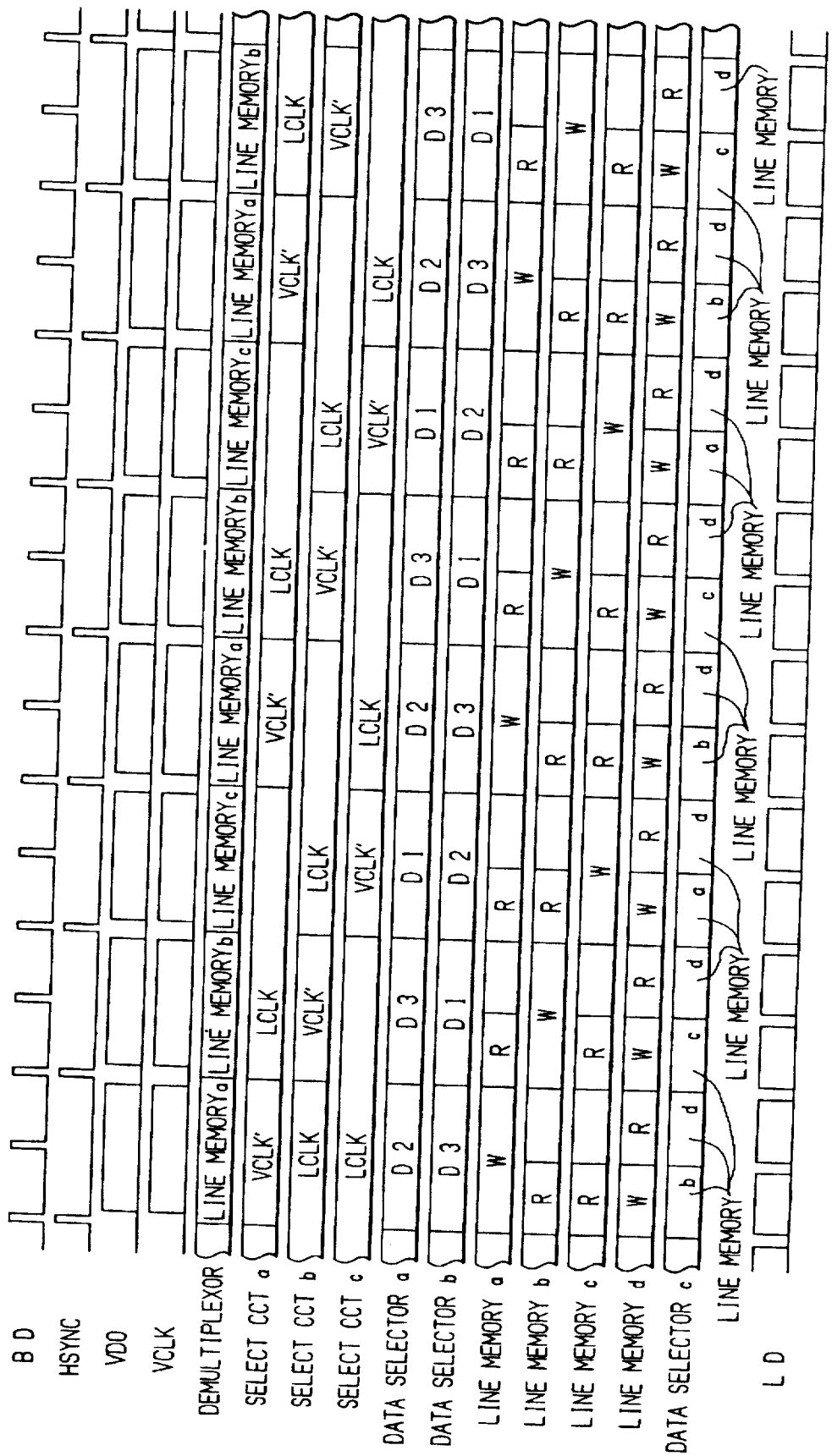
FIG. 4B is a timing chart of the circuit shown in FIG. 4A.

FIG. 4B shows a timing chart of the circuit shown in FIG. 4A.

In the circuit shown in FIG. 4A, in the main scan direction, the frequency of the write clock of each line memory is set to be twice that of a transfer clock of the image signal to increase a data volume of an image signal, thus forming a 600-dpi image signal. In a sub-scan direction, the compare and discriminate circuit 10 performs interpolation in the sub-scan direction to double the number of lines, thus forming a 600-dpi image signal.

(Second Embodiment)

Figure 9:
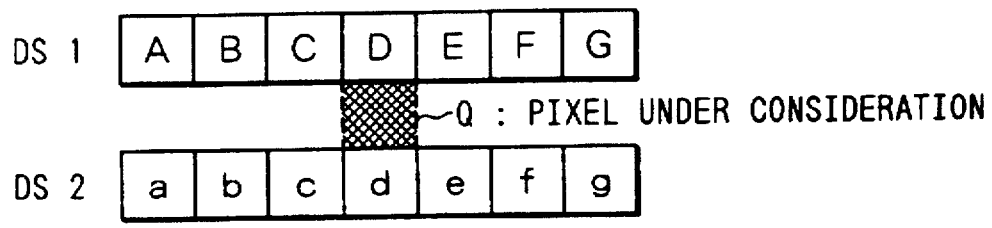
FIG. 9 shows a logical expression according to a second embodiment of the present invention.
Figure 10:
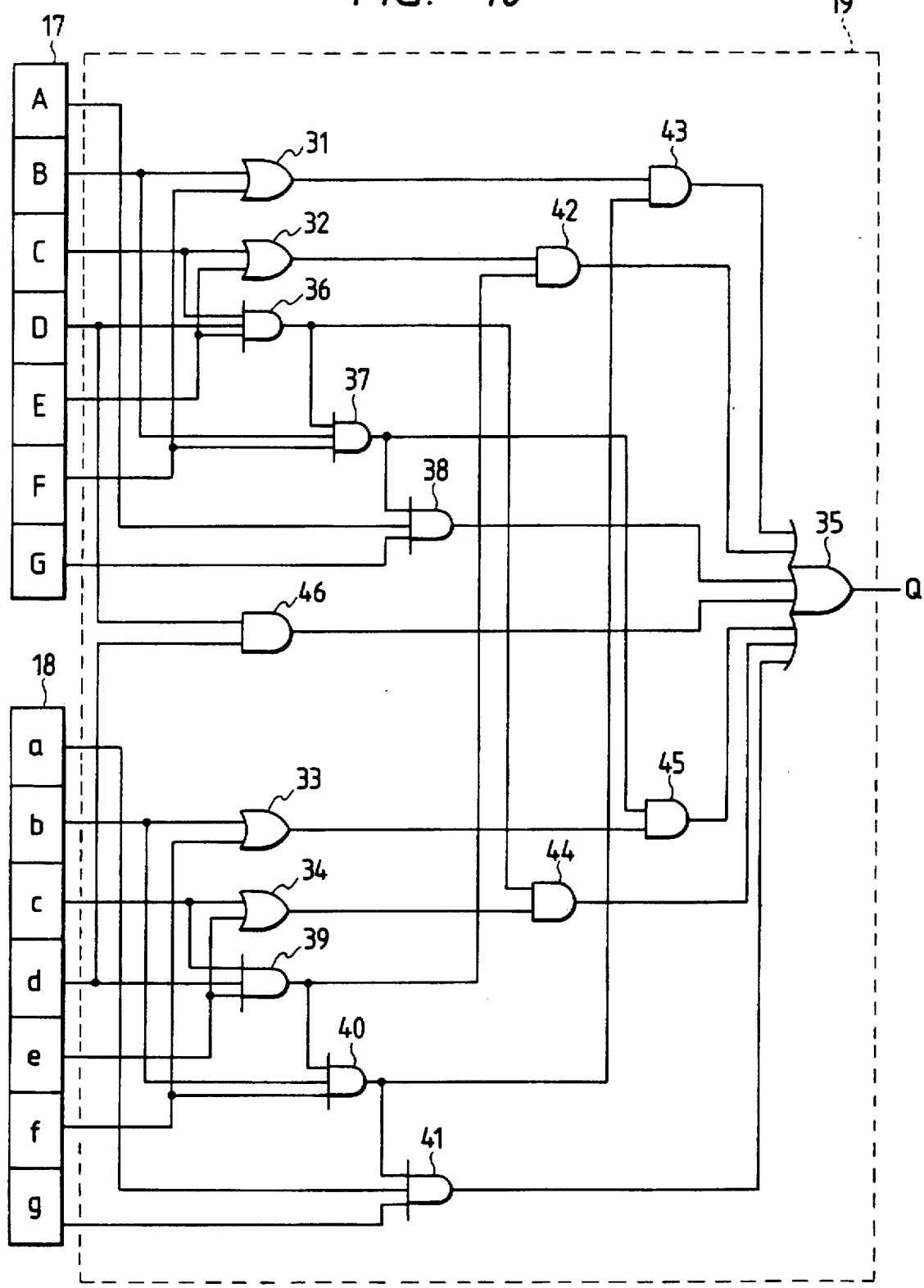
FIGS. 10 and 11 are circuit diagrams showing a logic circuit 19 of the second embodiment.

FIG. 10 shows a second embodiment of a logic circuit 19 having a circuit arrangement and logic different from those in the first embodiment. The circuit shown in FIG. 10 includes OR gates 31 to 35 and AND gates 36 to 46. The Q output logic of the circuit shown in FIG. 10 is as shown in FIG. 9.

Figure 12:
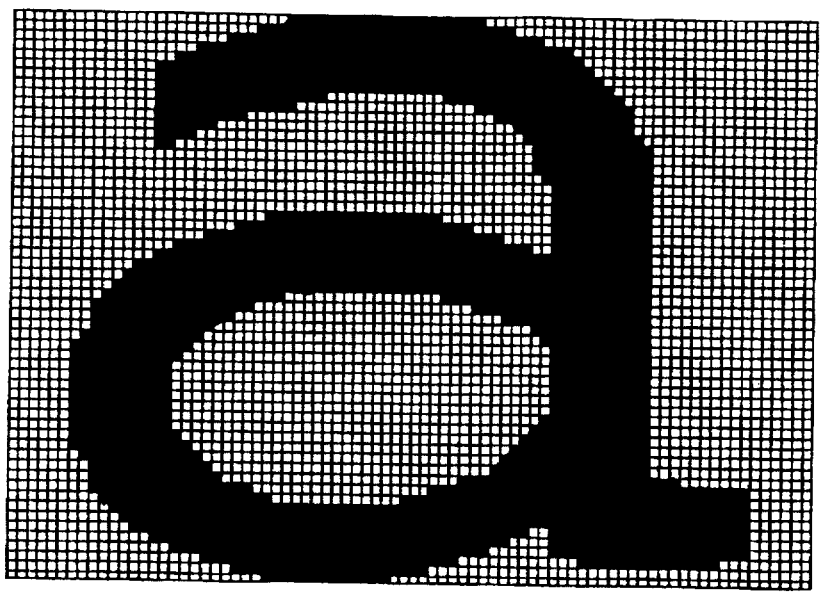
FIG. 12 shows a printing sample of the second embodiment.

A dot image formed on the basis of a laser drive signal LD in this case is as shown in FIG. 12.

As can be seen from FIG. 12, inclined portions of letter "a" are considerably improved.

Figure 11:
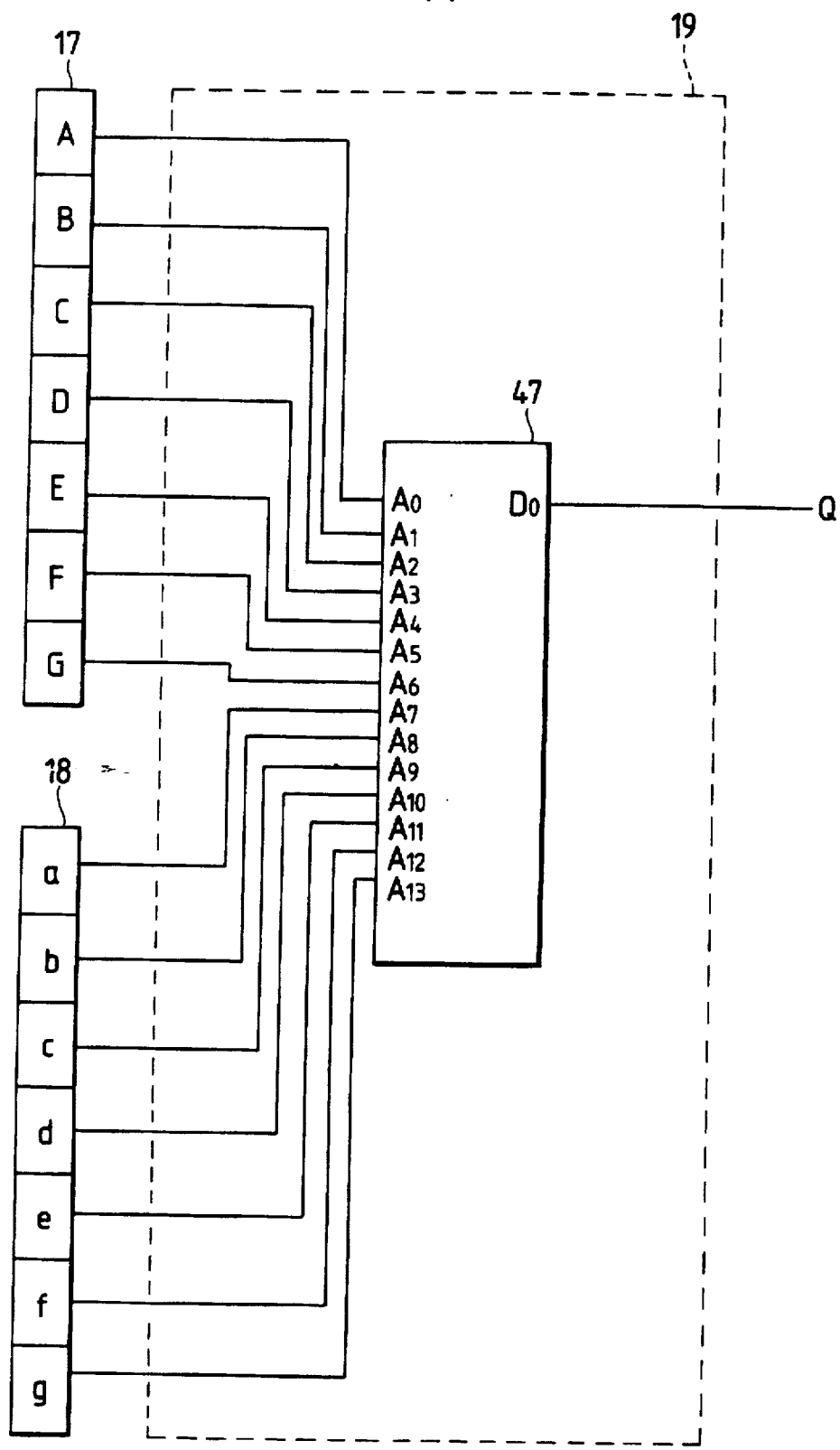

FIG. 11 shows a circuit arrangement having the same function as in FIG. 10 and constituted by a memory PROM 47. Input signals A to G and a to g are input to input terminals $A_0$ to $A_{13}$ as address signals of the PROM 47, and an output Q is obtained from a data $D_0$ terminal.

Data according to the logical expression shown in FIG. 9 can be written in advance in the PROM 47.

(Third Embodiment)

Figure 13:
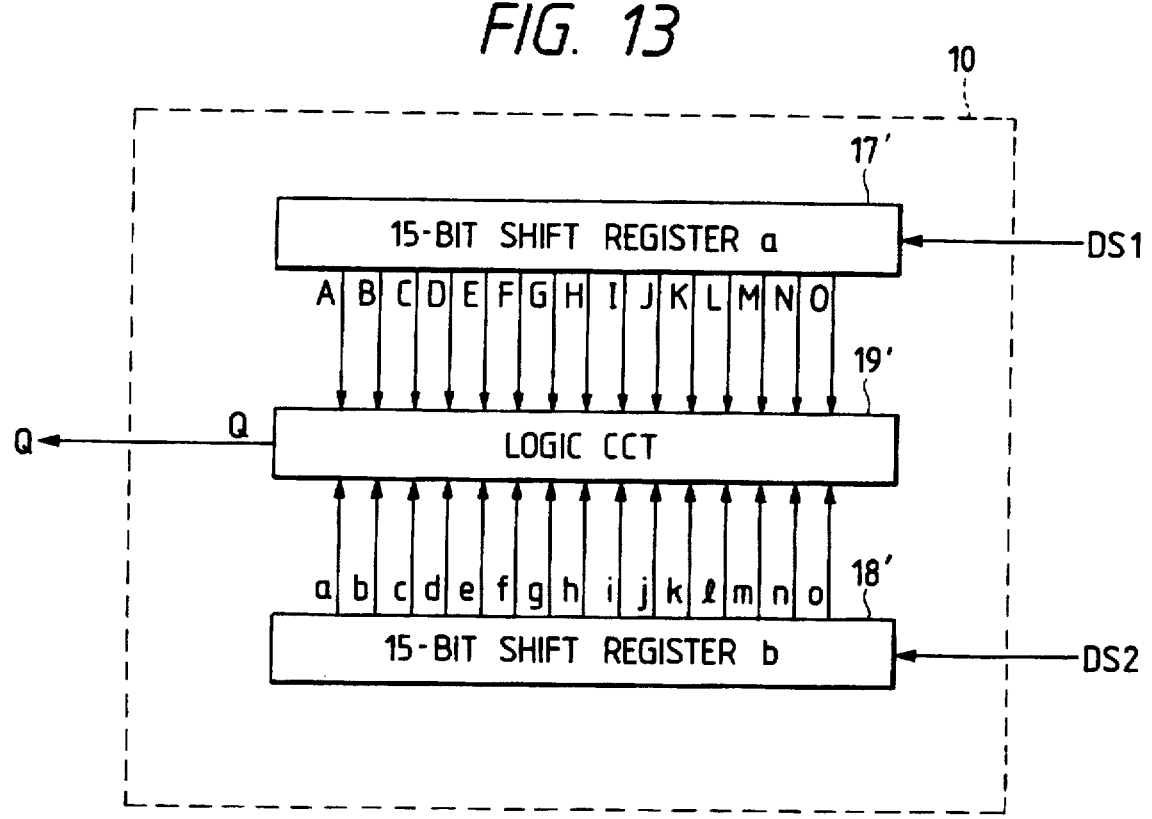
FIG. 13 is a block diagram showing a compare & discriminate circuit according to a third embodiment of the present invention.

FIG. 13 shows a third embodiment of the present invention, and a modification of a circuit arrangement of the compare & discriminate circuit 10 in the first embodiment.

Input signals DS1 and DS2 are respectively input to 15-bit shift registers a (17') and b (18'). Shift outputs A to O and a to o of the 15-bit shift registers a and b are input to a logic circuit 19'.

Figure 14:
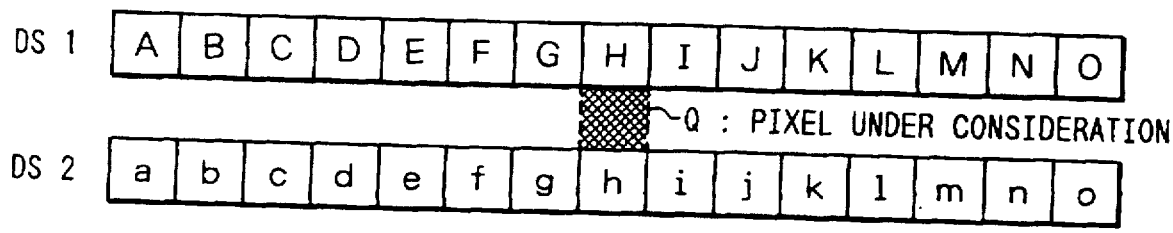
FIG. 14 shows a logical expression of the third embodiment.

The logic circuit 19' outputs a Q signal according to a logical expression shown in FIG. 14.

Since a circuit for executing the logical expression shown in FIG. 14 can be configured in the same manner as in FIGS. 10 and 11, a description of its arrangement will be omitted.

Figure 15:
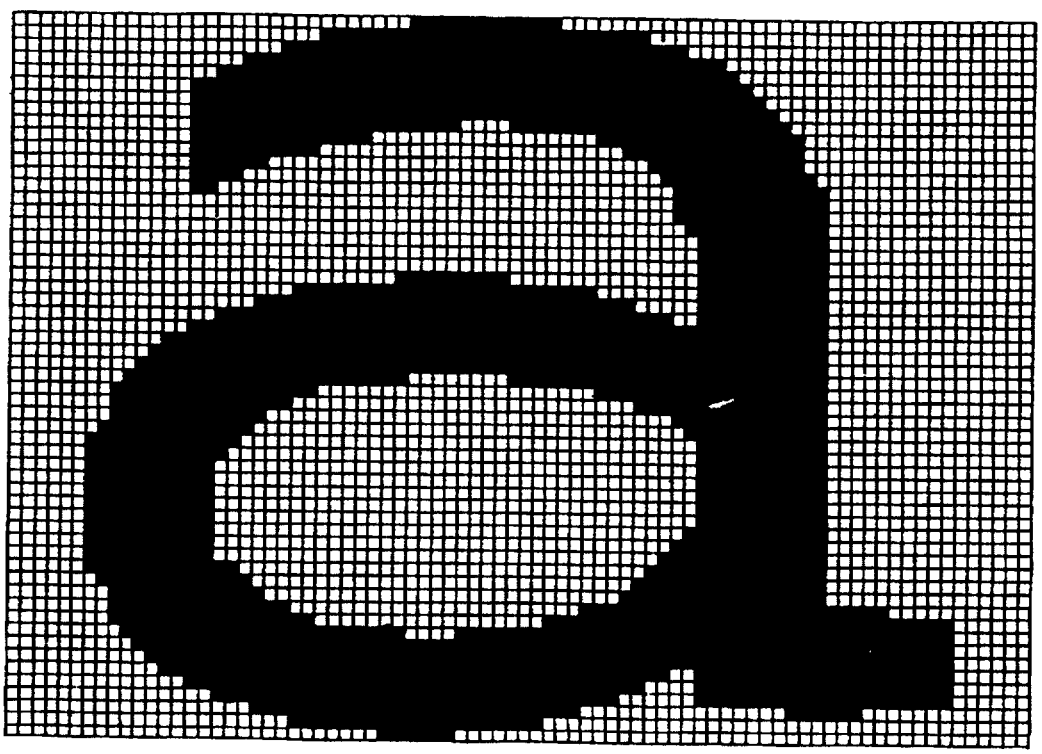
FIG. 15 shows a printing sample of the third embodiment.

A dot image formed on the basis of a laser drive signal LD obtained by the logical expression is as shown in FIG. 15.

In the above embodiments, the combination of the printer controller having a printing density of 300 dpi and the printer engine having a printing density of 600 dpi has been exemplified. However, the present invention may be applied to a combination of a printer controller having a printing density of 400 dpi and a printer engine having a printing density of 800 dpi.

The printer engine is not limited to a laser beam printer, but may be an LED printer, an ink-jet printer, or the like.

(Fourth Embodiment)

A fourth embodiment will be described below wherein the laser drive signal LD output from the circuit shown in FIG. 4A is input as an image signal 2, and the image signal 2 is processed by an oblique line processing circuit (to be described later) to obtain a higher-quality image output.

According to the fourth embodiment, oblique line portions of an image can be especially improved.

The fourth embodiment provides a method wherein when pixel data around a pixel under consideration satisfy a predetermined condition according to an algorithm (to be described later), the pixel under consideration is interpolated as multi-value dot data. In the fourth embodiment, a case will be described below wherein brightness modulation is performed on the basis of the multi-value dot data to interpolate the pixel under consideration.

Figure 16:
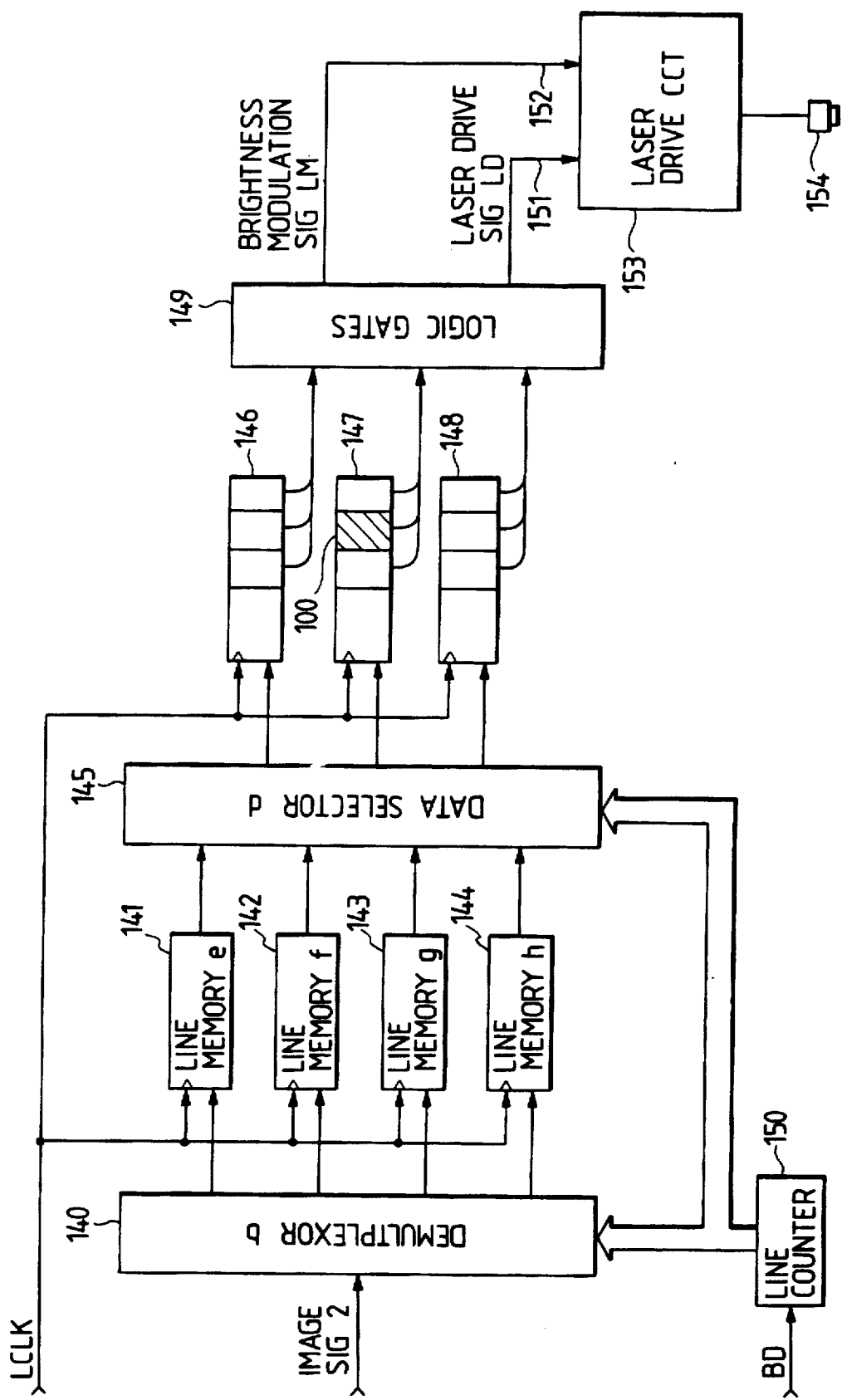
FIG. 16 is a block diagram of an oblique line processing circuit according to a fourth embodiment of the present invention.

FIG. 16 shows a block diagram of an oblique line processing circuit. The data selector c (16) shown in FIG. 4A outputs a 1-line image signal 2 in the main scan direction in synchronism with the BD signal, and outputs the next 1-line image signal in synchronism with the next BD signal. The 1-line image signals sequentially input every main scan line are sequentially written in one of line memories e to h which is designated by a demultiplexer b (140) in accordance with a value of a line counter 150 which performs a count operation in response to the BD signals.

Read access of image signals for three lines is performed from the line memories which are not subjected to write access simultaneously with the write access. The readout image data for three lines are input to shift registers 146 to 148 in a FIFO manner by a data selector d (145) which is controlled by the line counter 150. Logical gates 149 make a predetermined decision for image data of eight pixels around a pixel under consideration 100 in accordance with an algorithm (to be described later) on the basis of the outputs from the shift registers 146 to 148, and output a laser drive signal LD (151) for controlling the output of a semiconductor laser 154 and a brightness modulation signal LM (152) to a laser drive circuit 153. The laser drive signal LD (151) for the pixel under consideration 100 is supplied to the laser drive circuit 153. The laser drive circuit 153 changes the brightness of the laser 154 under the control (to be described later) in accordance with the brightness modulation signal LM (152). Note that the operations of the line memories 141 to 144 and the shift registers 146 to 148 are performed in synchronism with a clock signal LCLK (output from the oscillation circuit 5 shown in FIG. 4A) for controlling a timing in units of pixels.

Figure 17:
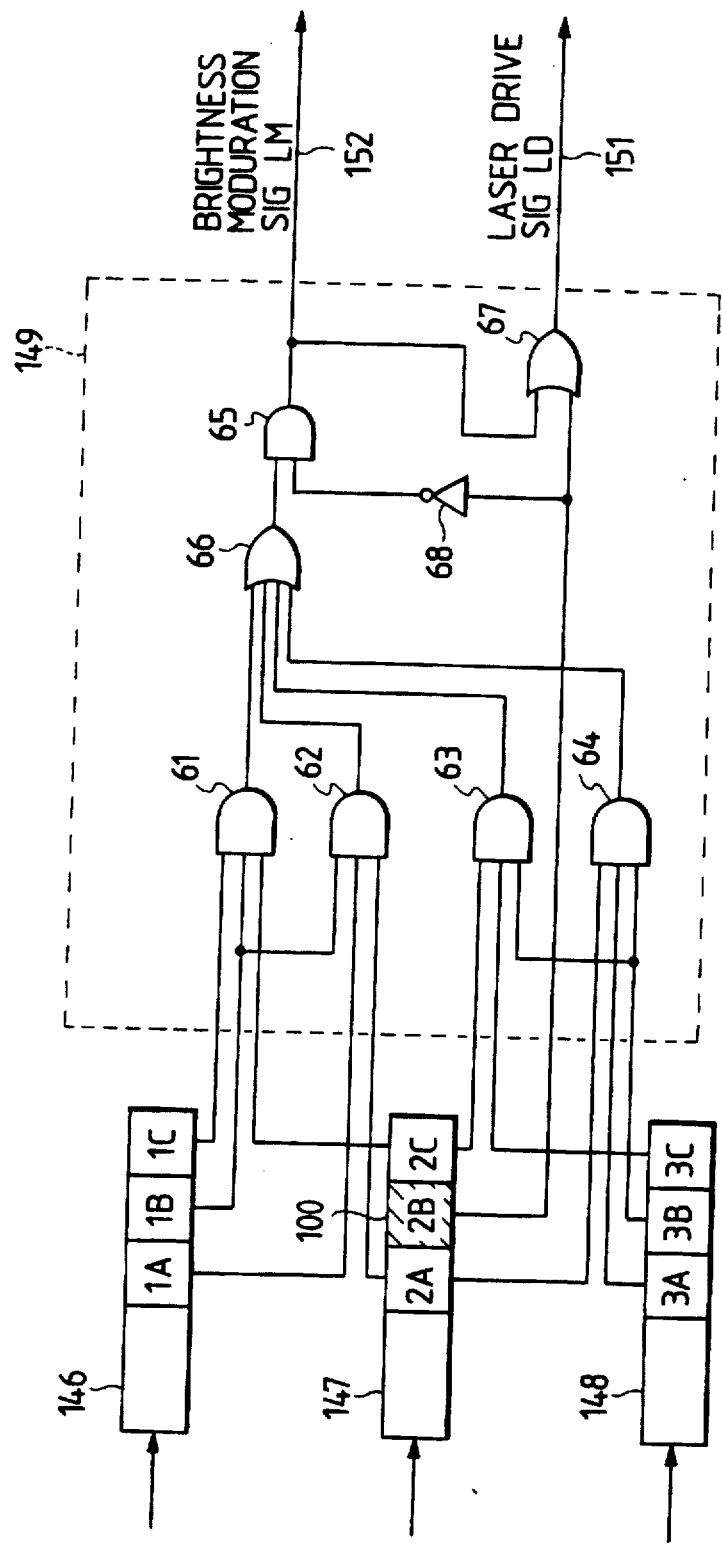
FIG. 17 is a circuit diagram of logical gates.

An algorithm for controlling a dot printing density will be described below with reference to FIGS. 17 to 18E. FIG. 17 is a circuit diagram of the logical gates 149 shown in FIG. 16, and the same reference numerals in FIG. 17 denote the same parts as in FIG. 16. The circuit shown in FIG. 17 includes AND gates 61 to 65, OR gates 66 and 67, and an inverter 68.

Figure 18A:
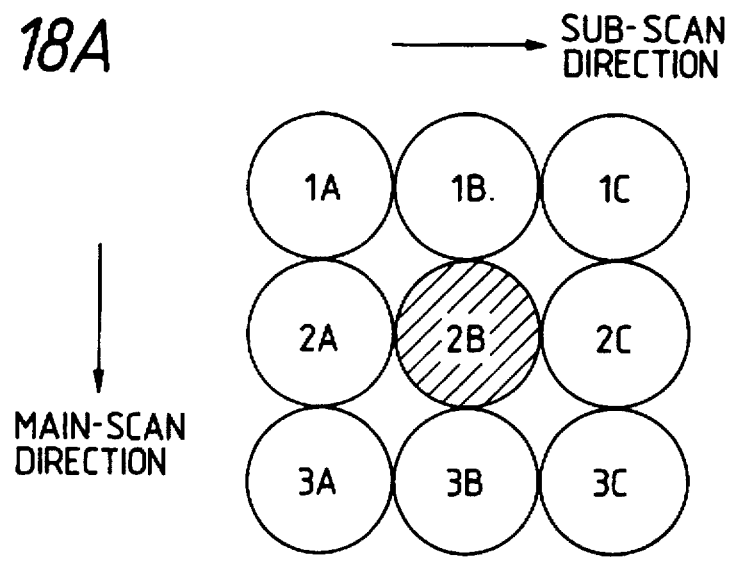
FIGS. 18A to 18E are views for explaining conditions of oblique line processing.
Figure 18B:
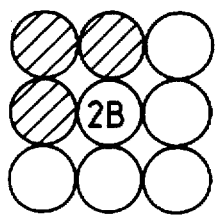
Figure 18C:
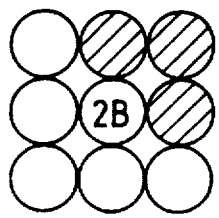
Figure 18D:
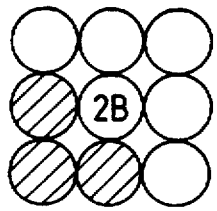
Figure 18E:
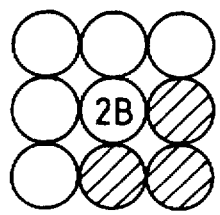

As shown in FIGS. 17 to 18E, the pixel under consideration 100 is named 2B. FIG. 18A shows printing positions of the shift registers 1A to 3C. A condition for adding a new laser beam with a decreased light amount in the above arrangement and for printing small dots will be described below. Of eight pixels adjacent to the pixel under consideration 2B, when one of four sets each consisting of three pixels, i.e., an upper left pixel 1A, or an upper left pixel 1C, or a lower left pixel 3A, or a lower right pixel 3C of the pixel 2B, and two pixels adjacent thereto serves as an illuminating portion, and the pixel under consideration 2B does not fall within the illuminating portion, a laser beam with a decreased light amount is added to print the pixel under consideration as a small dot. More specifically, such cases are shown in FIGS. 18B to 18E. In these cases, the pixel under consideration 2B is printed as a small dot. The conditions described above can be expressed by the following logical expression:

$$\overline{2B} \cdot \{(1A \cdot 1B \cdot 2A) + (1B \cdot 1C \cdot 2C) + (2A \cdot 3A \cdot 3B) + (2C \cdot 3B \cdot 3C)\} = 1$$

Reference symbols denote the pixel under consideration, and surrounding pixels, and when a pixel designated by the symbol is illuminating data, it is set to be "1". Symbol "·" indicates an AND logic, and symbol "+" indicates an OR logic.

FIG. 17 shows an arrangement of a logic circuit for performing the above-mentioned decision. The logic circuit makes a predetermined decision. Thereafter, the logic circuit calculates a logical sum of new dot data to be added as described above and the image signal 2, outputs the logical sum as a laser drive signal LD (151), and also outputs a brightness modulation signal LM (152) in synchronism with the output timing of the added dot data. When the brightness modulation signal LM is effective (when its output is "1"), the laser 154 decreases its light amount and radiates a laser beam with the decreased light amount.

Figure 19:
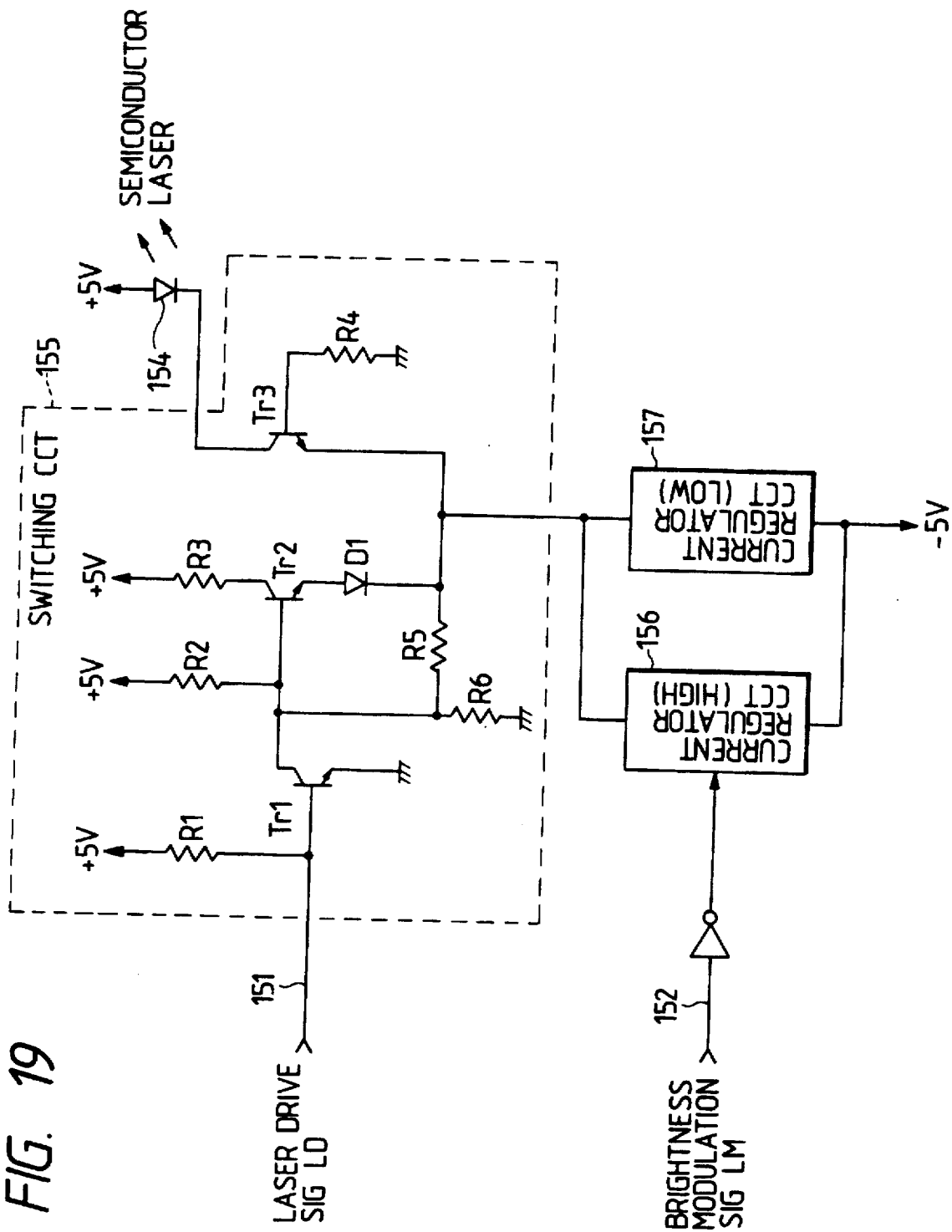
FIG. 19 is a circuit diagram of a laser drive circuit.

FIG. 19 is a circuit diagram of the laser drive circuit 153. In FIG. 19, a switching circuit 155 is constituted by resistors R1 to R6, transistors Tr1 to Tr3, and a diode D1. When the laser drive signal LD (151) is "positive", the laser 154 is turned on; when it is "negative", the laser 154 is turned off. The transistors Tr2 and Tr3 constitute a differential amplifier, and perform current switching. The brightness of the laser is determined by current regulator circuits 156 and 157 connected to the switching circuit 155. When the brightness modulation signal LM (152) is "positive", i.e., when the conditions of FIGS. 18B to 18E are satisfied and a new dot is printed with a decreased light amount, the current regulator circuit (high) 156 is not driven but only the current regulator circuit (low) 157 is driven. In a normal printing mode, since the brightness modulation signal LM becomes "negative", the current regulator circuits 156 and 157 are driven, so that a sum of currents from these circuits flows through the semiconductor laser 154, thus turning on the laser 154.

Figure 20:
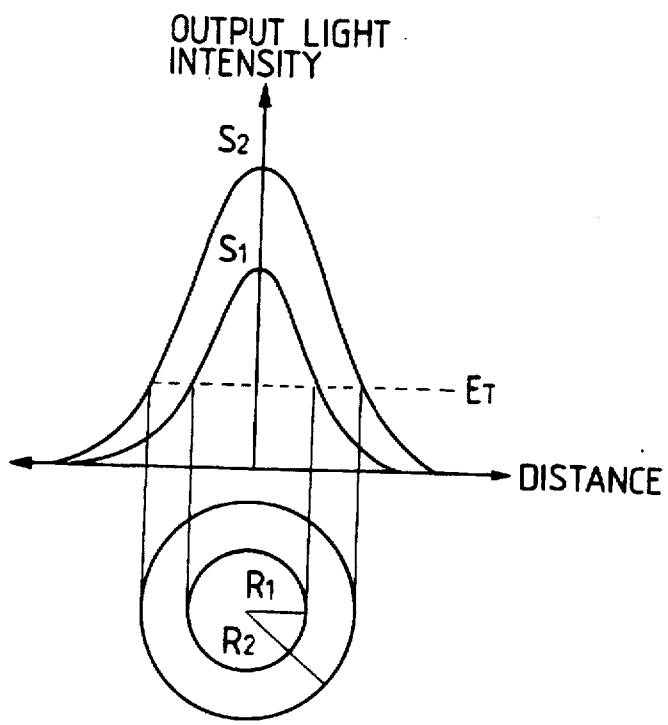
FIG. 20 is a graph for explaining an output light intensity distribution.
Figure 21A:
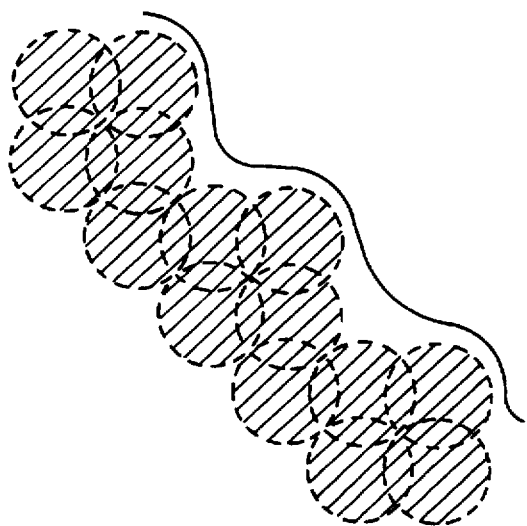
FIGS. 21A and 21B and FIG. 22 show printing samples of the fourth embodiment.
Figure 21B:
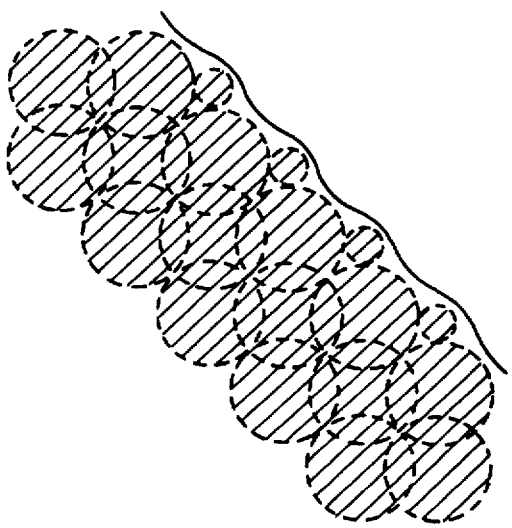

An output light intensity distribution corresponds to a Gaussian distribution, as shown in FIG. 20. For example, if an output light intensity is changed from $S_1$ to $S_2$ when a visualization threshold level of a photosensitive body irradiated with a laser beam is represented by $E_T$, a beam spot size can be changed from $R_1$ to $R_2$. FIG. 21A shows a state when a dot configuration for a printing density of 300 dpi is printed at a printing density of 600 dpi, and FIG. 21B shows a state when the 300-dpi dot configuration is printed after the processing of the fourth embodiment. According to the fourth embodiment, data can be printed at a printing density of 600 dpi using a 600-dpi printer using many existing 300-dpi application software programs. In addition, as can be seen from FIG. 21B, indentations of an oblique line can be improved, and a smooth oblique line can be expressed.

Figure 2:
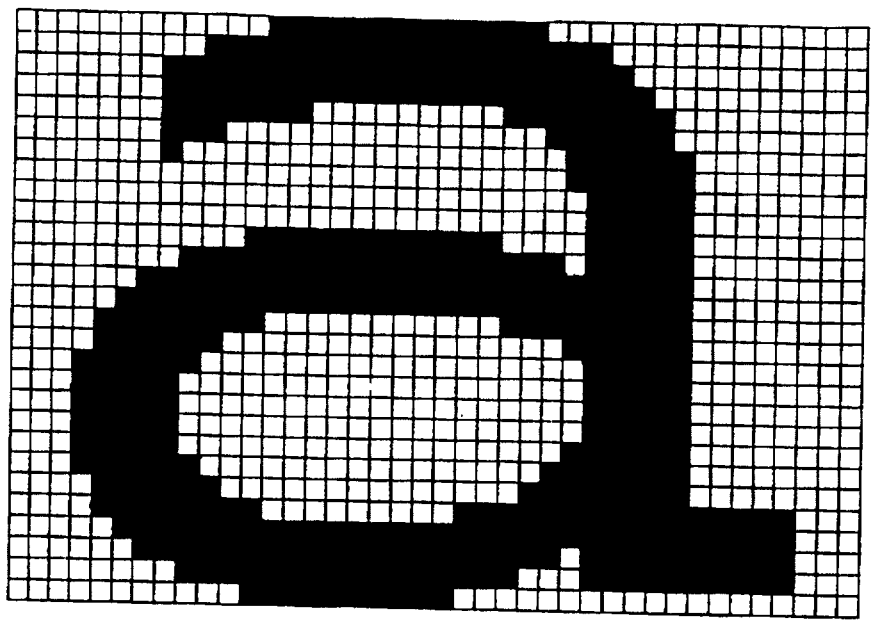
FIG. 2 shows a low-density printing sample.
Figure 22:
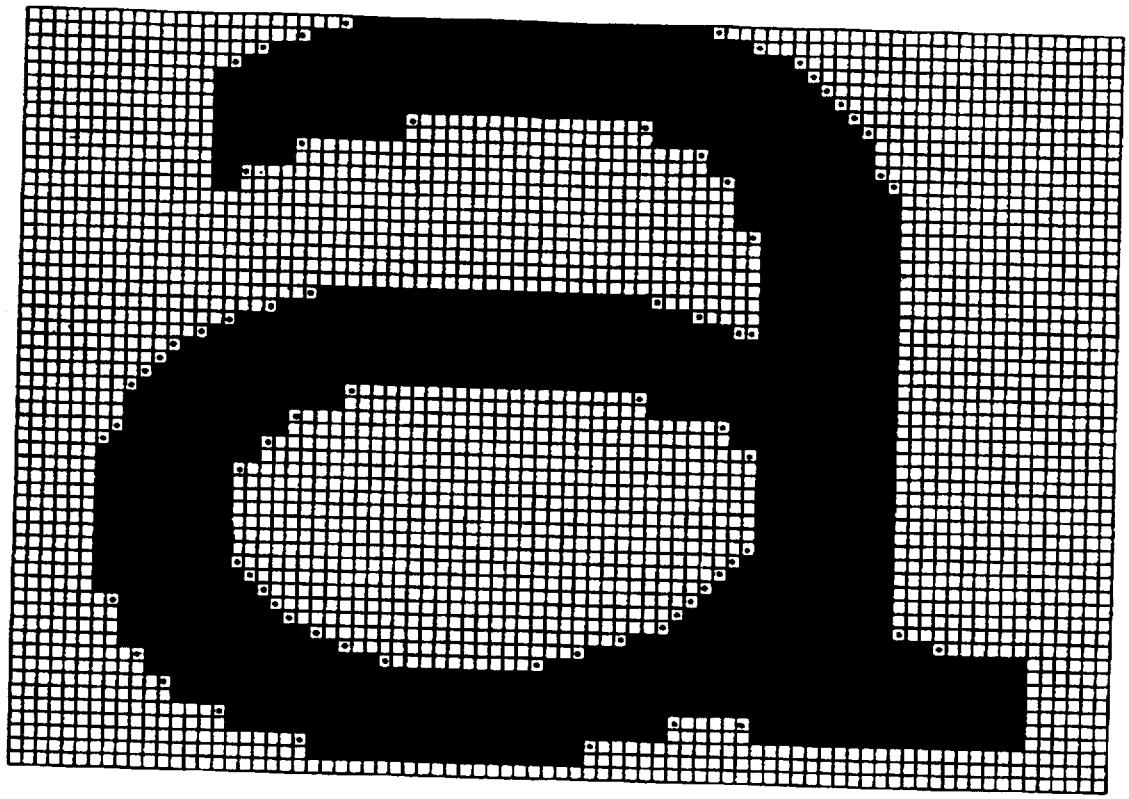

FIG. 22 shows a printing sample obtained when letter "a" shown in FIG. 2 is subjected to the processing of the fourth embodiment.

In this embodiment, a pixel under consideration is interpolated using two levels of a laser light amount, i.e., a normal power and a decreased power. However, the pixel under consideration may be interpolated using three or more levels.

(Fifth Embodiment)

Figure 23:
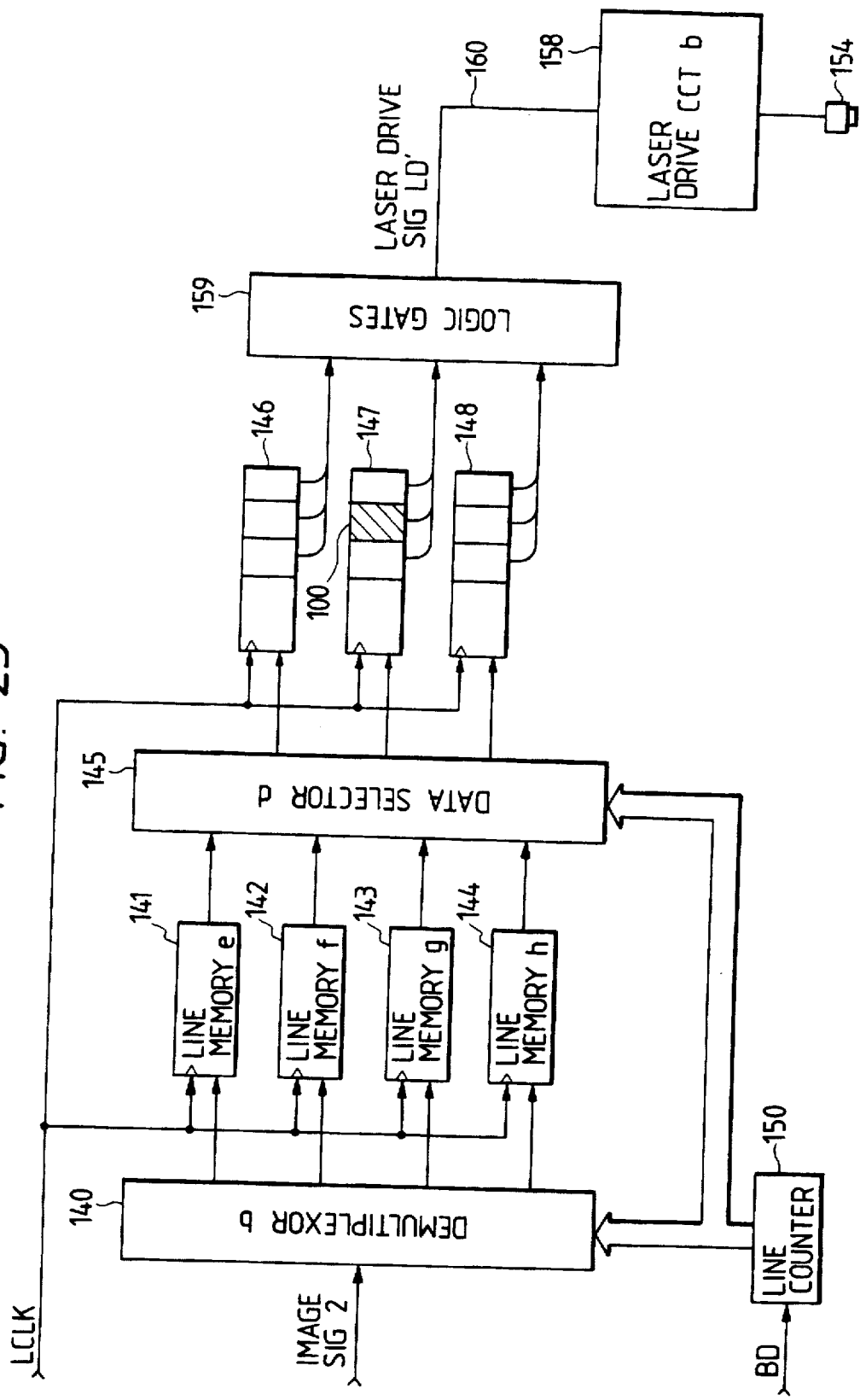
FIG. 23 is a block diagram of an oblique line processing circuit according to a fifth embodiment of the present invention.
Figure 24:
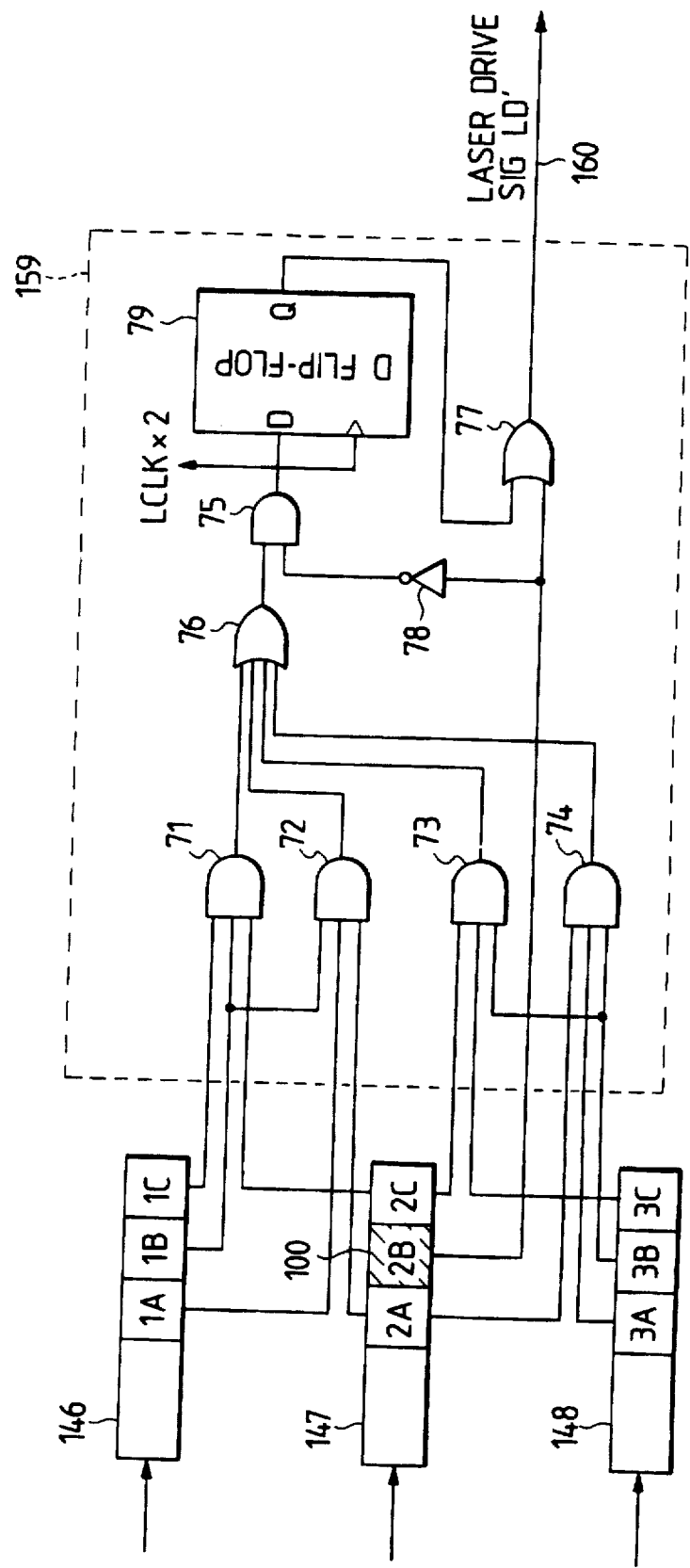
FIG. 24 is a circuit diagram of a logic gate circuit.

In the fourth embodiment, a low-density dot brightness-modulated by the logical gates 149 shown in FIG. 16 is added to interpolate the pixel under consideration. However, interpolation processing may be performed by adding a pulse-width modulated dot with a small width. FIG. 23 is a block diagram of an oblique line processing circuit of the fifth embodiment. Note that the same reference numerals denote parts having the same functions as in FIG. 16. FIG. 24 shows a detailed arrangement of logical gates 159, i.e., an algorithm for controlling a pulse width.

The circuit shown in FIG. 24 includes AND gates 71 to 75, OR gates 76 and 77, an inverter 78, and a flip-flop 79.

When printing conditions shown in FIG. 18 are satisfied, the logical gates 159 shown in FIG. 24 calculate a logical sum of an image signal 2 and a pulse having a pulse width ½ that for printing one dot, and output the logical sum as a laser drive signal LD' (160). In order to obtain the signal having the ½ pulse width, a clock signal twice the 600-dpi image clock signal LCLK output from the oscillation circuit 5 shown in FIG. 4A and the D flip-flop 79 are used.

Figure 25:
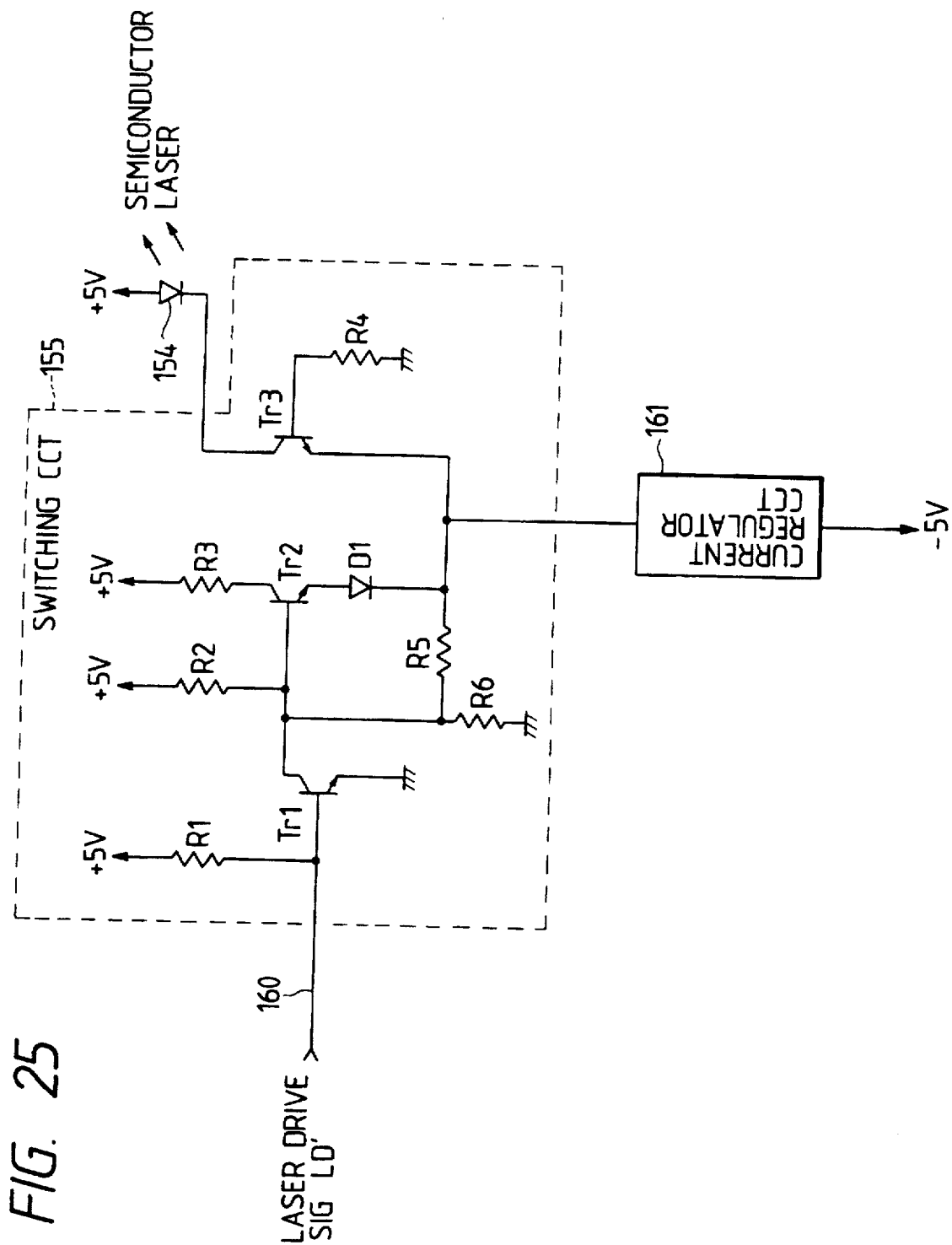
FIG. 25 is a circuit diagram of a laser drive circuit.

FIG. 25 shows a circuit diagram of a laser drive circuit b (158). Note that the same reference numerals denote parts having the same functions as that of the drive circuit shown in FIG. 19.

Since the laser drive circuit b (158) shown in FIG. 25 receives no brightness modulation signal LM shown in FIG. 19, and is driven based on the pulse width, a current regulator circuit 161 is arranged.

FIG. 26A shows a state when a dot configuration for a printing density of 300 dpi is printed at a printing density of 600 dpi, and FIG. 26B shows a state when the 300-dpi dot configuration is printed after the processing of the fifth embodiment.

According to the fifth embodiment, a smooth oblique line portion can be obtained, as shown in FIG. 26B, by the laser drive circuit constituted only by the switching circuit and the current regulator circuit.

(Sixth Embodiment)

FIG. 27 is a block diagram of a print system according to a sixth embodiment of the present invention.

An image signal from a host computer 54 is input to a printer controller 52. In this case, character data is input as code data such as JIS codes, ASCII codes, vector fonts, or the like, and picture image data is input as an ON-OFF binary signal. The input image signal is discriminated to code data (character portion) or bit map data (picture portion) by an image discriminator circuit 56. When the code data is input, the image discriminator circuit 56 refers to a character generator (not shown), and outputs a corresponding bit pattern. The bit pattern or the binary signal is supplied to an image development circuit 57 for developing image data into bit map data. The image signal developed as dot data is then supplied to an interpolate circuit 58. The interpolate circuit 58 selects an optimal interpolation method in accordance with the character or picture portion on the basis of data from the image discriminator circuit 56.

The interpolate circuit 58 uses the interpolation method in the first or second embodiment described above for the character portion, and simply doubles data in both the vertical and horizontal directions for the picture portion. That is, the circuit 58 simply doubles 300-dpi pixels. A laser of a printer engine 51 is driven by a laser drive signal output from the interpolate circuit 58. The interpolation method is changed according to the character or picture portion since character and picture images have different dot distribution characteristics. For example, when all the image signals are interpolated to smooth indentations of a character, the picture portion may suffer from omissions of gradation levels or picture data.

The host computer 24 may sometimes supply a multi-value signal for only a picture portion. In this case, a multi-value image signal or a binary image signal is discriminated, and a signal for a character portion is converted from a 300-dpi signal to a 600-dpi image signal using the above-mentioned method. For a picture portion, the multi-value signal may be directly doubled and output as a 600-dpi signal. When a 3-, 4-, or 5-value signal is input, a method as shown in FIG. 28, 29, or 30 may be used. In FIGS. 28, 29, and 30, a white portion represents that a laser is OFF, and a hatched portion represents that the laser is ON. FIGS. 28, 29, and 30 respectively correspond to 3-, 4-, and 5-value signals. In this manner, multi-value recording can be realized by ON/OFF operations of the laser without controlling a light-emission time or light amount of the laser. For a multi-value signal of 6 or more values, the above-mentioned methods can be combined, so that the light-emission time or light amount of the laser can be easily controlled.

In the above embodiment, the combination of the printer controller having a printing density of 300 dpi and the printer engine having a printing density of 600 dpi has been exemplified. However, the present invention may be applied to a combination of a printer controller having a printing density of 400 dpi and a printer engine having a printing density of 800 dpi.

The printer engine is not limited to a laser beam printer, but may be an LED printer, an ink-jet printer, or the like.

(Seventh Embodiment)

A seventh embodiment of the present invention will be described below with reference to FIG. 31 wherein an operation mode selection means is added to the above-mentioned data conversion circuit to switch an operation mode in accordance with command data from a printer controller 52.

The same reference numerals as in the data conversion circuit shown in FIG. 4A denote the parts having the same functions.

Figure 31:
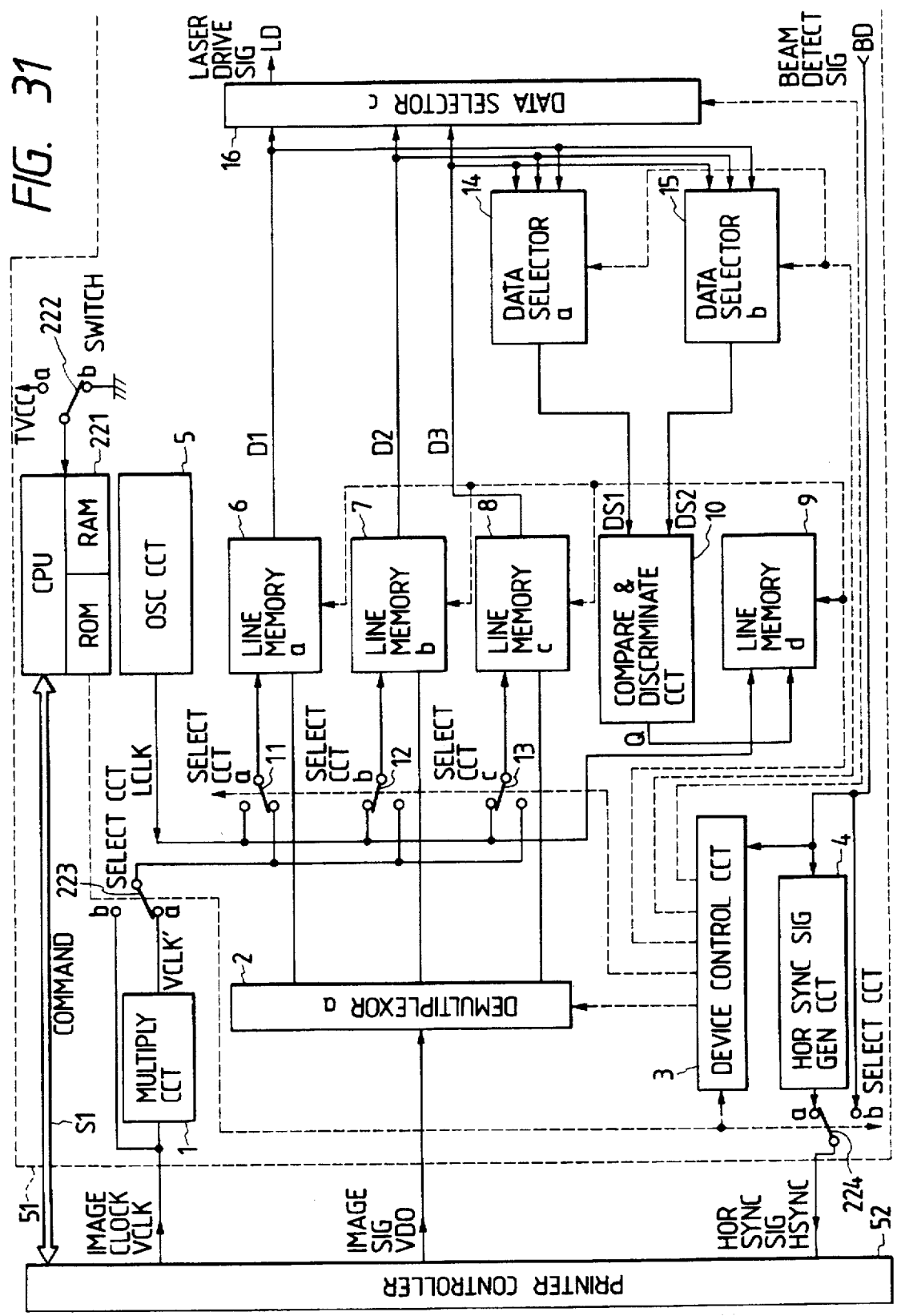
FIG. 31 is a block diagram showing a data conversion circuit comprising an operation mode selection means according to a seventh embodiment of the present invention.

In FIG. 31, a CPU 221 performs device control of a printer engine 51 of a laser beam printer through I/O ports (not shown), e.g., performs rotation/stop control of a photosensitive drum motor and control of printing process operations. In addition, the CPU 221 has a function of reading a setup state of a switch 222, a function for receiving a command by serial communication with a printer controller 52, a function of switching select circuits 223 and 224, and a function of controlling a device control circuit 3. A ROM stores control programs (shown in the flow chart of FIG. 33), and a RAM is a memory serving as various tables and work areas when the CPU 221 performs control operations.

The switch 222 is normally set at a "b" terminal side. The CPU 221 connects the select circuits 223 and 224 to an "a" terminal side immediately after the power switch is turned on. In this state, the circuit shown in FIG. 31 has the same functions as that in FIG. 4A. That is, the circuit shown in FIG. 31 can receive image data from the 300-dpi printer controller 52, and interpolates 300-dpi image data to perform a 600-dpi printing operation, as described above.

When the CPU 221 receives a mode select command from the printer controller 52 through a serial communication line S1, it switches the select circuits 223 and 224 to a "b" terminal side, and instructs the device control circuit 3 to input image data at 600 dpi. As a result, an image clock signal VCLK is directly input, and a BD signal is directly output as a horizontal sync signal HSYNC. The device control circuit 3 controls line memories a (6) and b (7) as a double buffer memory. More specifically, when nth data in the main scan direction is received, the circuit 3 instructs a demultiplexer a (2) to write a 600-dpi image signal VDO in the line memory a (6), and simultaneously instructs a data selector c (16) to select an output D2 of the line memory b (7). In addition, the circuit 3 instructs a select circuit b (12) to select a signal LCLK as a read clock, and controls the data selector c (16) to output data read out from the line memory b (7) as a laser drive signal LD.

Similarly, when (n+1)th data in the main scan direction is received, the circuit 3 instructs the demultiplexer a (2) to supply the image signal VDO to the line memory b (7), to select the signal VCLK as a write clock of the line memory b (7), and to write data in the line memory b (7). Simultaneously, the circuit 3 instructs the data selector c (16) to select an output DI of the line memory a (6), and instructs the select circuit a (11) to select the signal LCLK as a read clock, so that data read out from the line memory a (6) is output as the laser drive signal LD. When (n+2)th data in the main scan direction is received, the same operation as for the n th data is repeated.

As described above, when no command is input from the printer controller after the power switch is turned on, the circuit of this embodiment serves as a printer for receiving 300-dpi image data, and when a command is input from the printer controller, it serves as a printer for receiving 600-dpi image data. Therefore, both an existing 300-dpi printer controller and a 600-dpi printer controller which will be developed in the near future can be connected to the circuit of this embodiment. A command can be input to the printer engine immediately after the power switch is turned on, so that the circuit can be operated as the 600-dpi printer engine.

When the switch 222 is set at an "a" terminal side, the circuit of this embodiment can serve as a printer for receiving a 600-dpi image signal without receiving a command from the printer controller.

Figure 33:
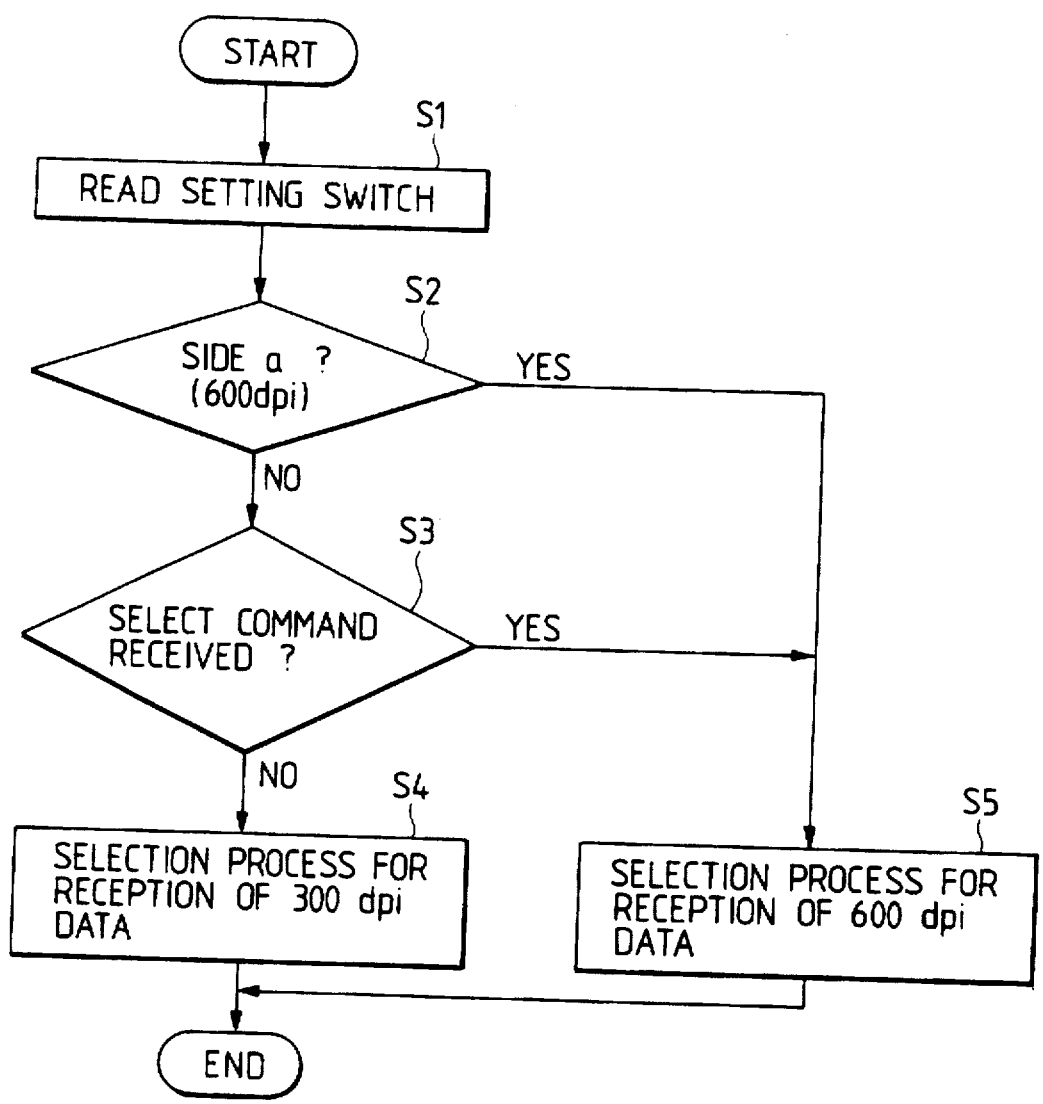
FIG. 33 is a flow chart showing a processing sequence in the seventh embodiment.

The flow chart of FIG. 33 shows the above-mentioned control operation of the CPU 221.

Another arrangement of the operation mode selection means will be described below with reference to FIG. 32.

The same reference numerals as in FIG. 31 denote parts having the same functions.

Figure 32:
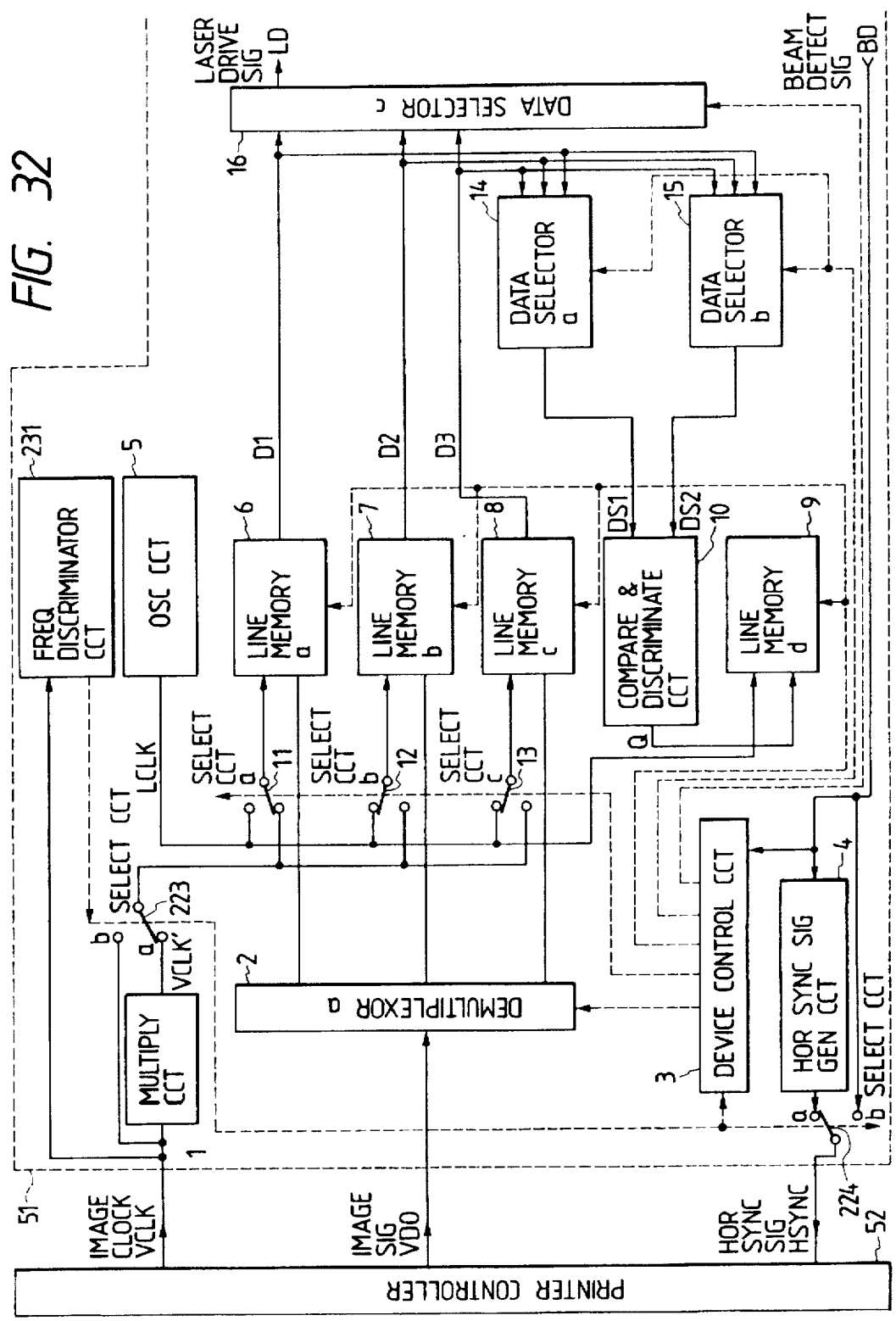
FIG. 32 is a block diagram showing another arrangement of the operation mode selection means.

As shown in FIG. 32, a frequency discriminator circuit 231 discriminates a frequency of the input image clock signal VCLK to determine a 300- or 600-dpi image clock signal. This discrimination utilizes the fact that the frequency of the 600-dpi image clock signal is four times that of the 300-dpi image clock signal. The frequency discriminator circuit 231 controls the select circuits 223 and 224 and the device control circuit 3 in accordance with the frequency discrimination result in the same manner as in the CPU 221 described above. When a 300-dpi image clock signal is input, processing for a 300-dpi image signal is performed; when a 600-dpi image clock signal is received, a 600-dpi image signal is received and printed.

In this embodiment, recording densities of 300 dpi and 600 dpi have been exemplified. However, the present invention may be applied to a combination of 400 dpi and 800 dpi.

(Eighth Embodiment)

Figure 34:
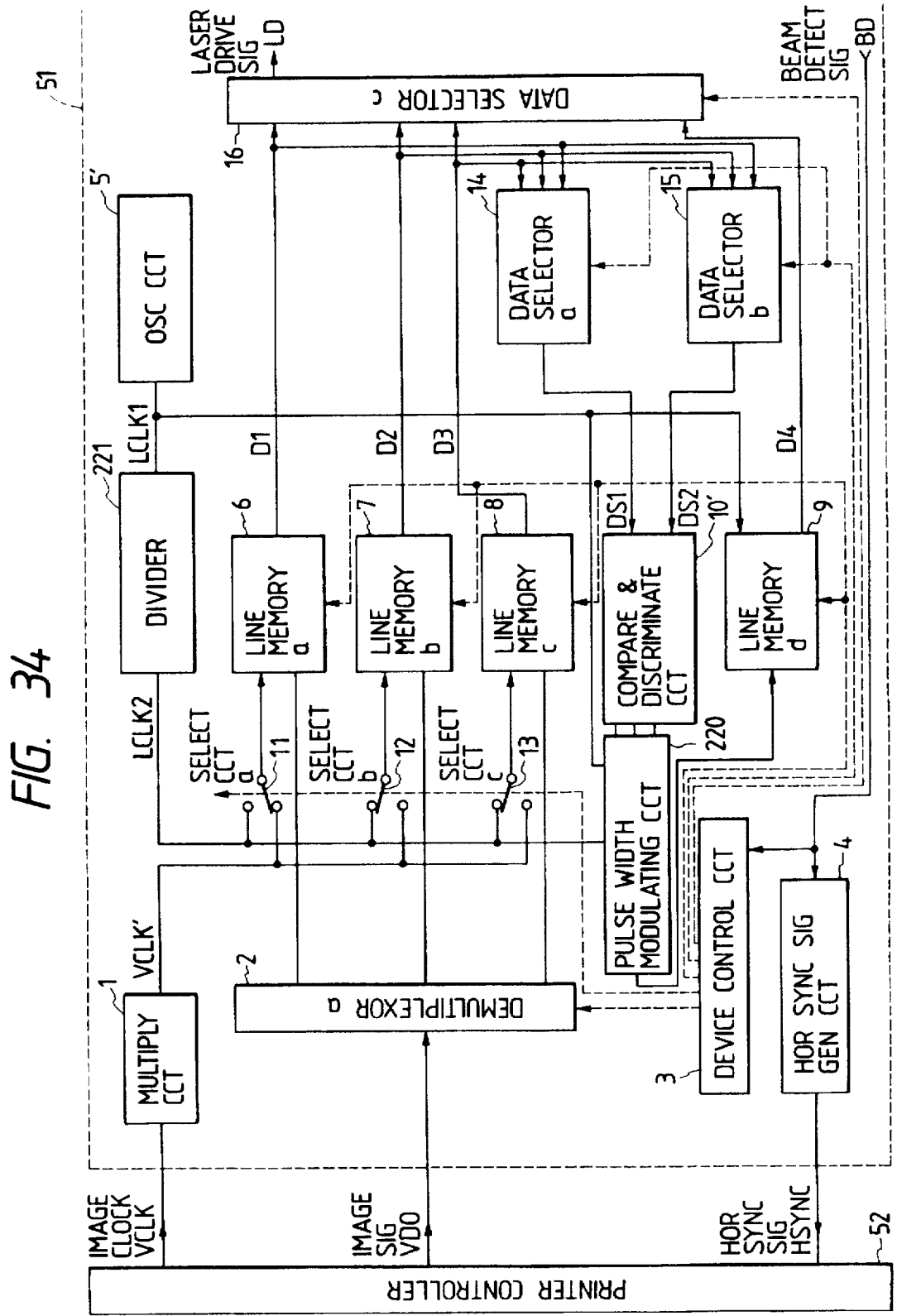
FIG. 34 is a block diagram of a data conversion circuit according to an eighth embodiment of the present invention.

FIG. 34 is a block diagram of a data conversion circuit according to an eighth embodiment of the present invention. The same reference numerals denote the parts having the same functions as in the data conversion circuit shown in FIG. 4A.

A frequency multiply circuit 1 multiplies a frequency of an image clock signal VCLK to obtain a clock signal VCLK' having a doubled frequency. An oscillator circuit 5' generates a clock signal LCLK1 having a frequency 12 times that of the image clock signal VCLK. A frequency divider 221 frequency-divides the signal LCLK1 by three to output a clock signal LCLK2 having a frequency four times that of the signal VCLK. Select circuits a (11), b (12), and c (13) select the clock signal VCLK' or LCLK2, and supply the selected signal as a write or read clock signal for line memories a to c (6 to 8).

A demultiplexer 2 has a function of selectively supplying an image signal VDO to the line memories 6 to 8. A horizontal sync signal generation circuit 4 counts beam detect signals (BD signals) and outputs a horizontal sync signal HSYNC every two BD signals.

A device control circuit 3 controls write or read access in units of lines on the basis of the BD signals together with the demultiplexer 2, the select circuits 11 to 13, and data selectors 14 to 16 (to be described later). Under the control of the device control circuit 3, the image signal VDO is written in one of the line memories 6 to 8 in response to the clock signal VCLK', and image signals read out from the two remaining line memories on the basis of the clock signal LCLK2. This operation is performed in turn. When write access of the line memory a (6) is performed, read access of the line memories b (7) and c (8) is performed. At the next timing, the line memory b (7) is subjected to the write access, and the line memories a (6) and c (8) are subjected to the read access. Similarly, at the next timing, the line memory c (8) is subjected to the write access, and the line memories a (6) and b (7) are subjected to the read access. The above-mentioned control operation is repeated.

Note that each of the line memories 6 to 8 has a memory capacity twice that for 300-dpi data in the main scan direction, i.e., a memory capacity of 600-dpi data in the main scan direction. In the following description, image signals read out from the line memories 6 to 8 are respectively represented by D1, D2, and D3.

Data selectors a (14) and b (15) select two signals, which are being subjected to read access, of the readout signals D1, D2, and D3 of the line memories 6 to 8. For example, when the line memory 6 is subjected to write access and the line memories 7 and 8 are subjected to read access, the data selector 14 selects the readout data D2 of the line memory 7 and outputs a signal DS1 to a compare & discriminate circuit 10'. In this case, the data selector 15 selects the readout data D3 of the line memory 8 and outputs a signal DS2 to the compare and discriminate circuit 10'. The compare and discriminate circuit 10' which received the signals DS1 and DS2 compares these data, and supplies output signals $x_1$, $x_2$, and $x_3$ according to the comparison result to a pulse width modulating circuit 220.

Figure 35:
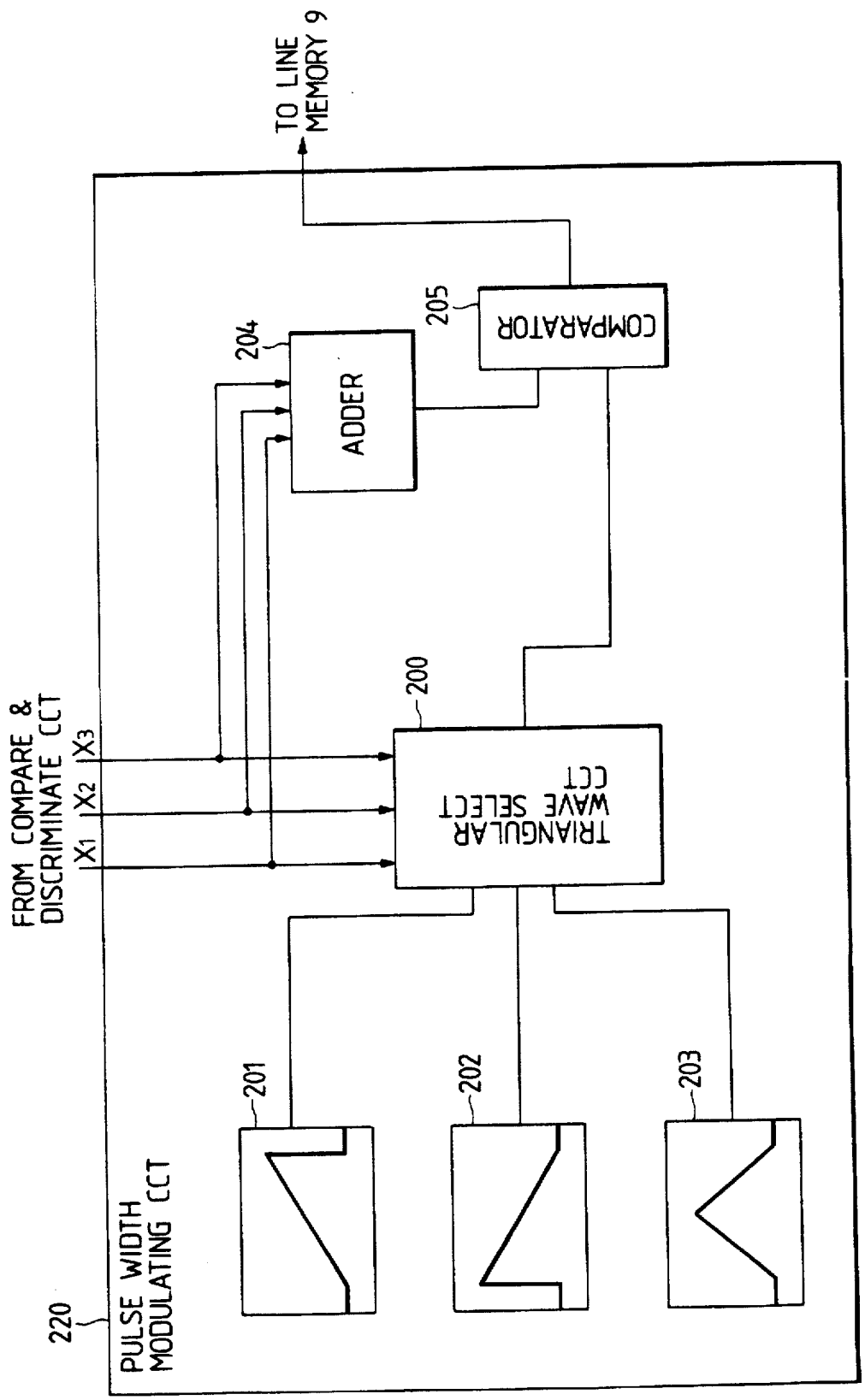
FIG. 35 is a block diagram showing a pulse width modulating circuit of the eighth embodiment.

As shown in FIG. 35, the pulse width modulating circuit 220 corrects the "3"-bit input signal consisting of bits $x_1$, $x_2$, and $x_3$ using counters 201 to 203, and outputs a resultant signal to a line memory 9. A triangular wave select circuit 200 comprises, e.g., a switch. When the circuit 200 receives the output bits $x_1$, $x_2$, and $x_3$, it selects one of the counters 201 to 203 taking three different output formats in accordance with a predetermined logic (for example, when the bit $x_1$ is "1" even if a plurality of ones of "3" bits $x_1$ to $x_3$ are "1", the waveform of the counter 202 is selected; when $x_1$="1" and $x_3$="0", the waveform of the counter 201; or when only $x_2$="1", the waveform of the counter 203 is selected). The counters 201 to 203 taking triangular wave output formats are respectively an up counter, a down counter, and an up-down counter. An adder 204 outputs a value obtained by uniquely adding the input $x_1$ to $x_3$ bits. A comparator 205 compares the output from the adder 204 and the output of the selected counter, and outputs a comparison result to the line memory 9. Note that the clock signal LCLK2 is used as an input clock of data to the pulse width modulating circuit 220, and the signal LCLK1 is used as an output clock.

The memory capacity of the line memory d (9) for storing the output signal from the comparator 205 is three times those of the line memories 6 to 8. As a read/write clock for the line memory 9, the signal LCLK1 is used. Read/write control of the line memories 6 to 8 and the line memory 9 and selection control of the data selectors 14 and 15 are executed by the device control circuit 3.

The data selector c (16) selects one of the signals D1 to D3 read out from the line memories 6 to 8 and a signal D4 read out from the line memory 9, and outputs the selected signal as a laser drive signal LD. The selection control of the selector 16 is also performed by the device control circuit 3.

An arrangement of the compare and discriminate circuit 10' will be described below with reference to the diagram of FIG. 36.

Figure 36:
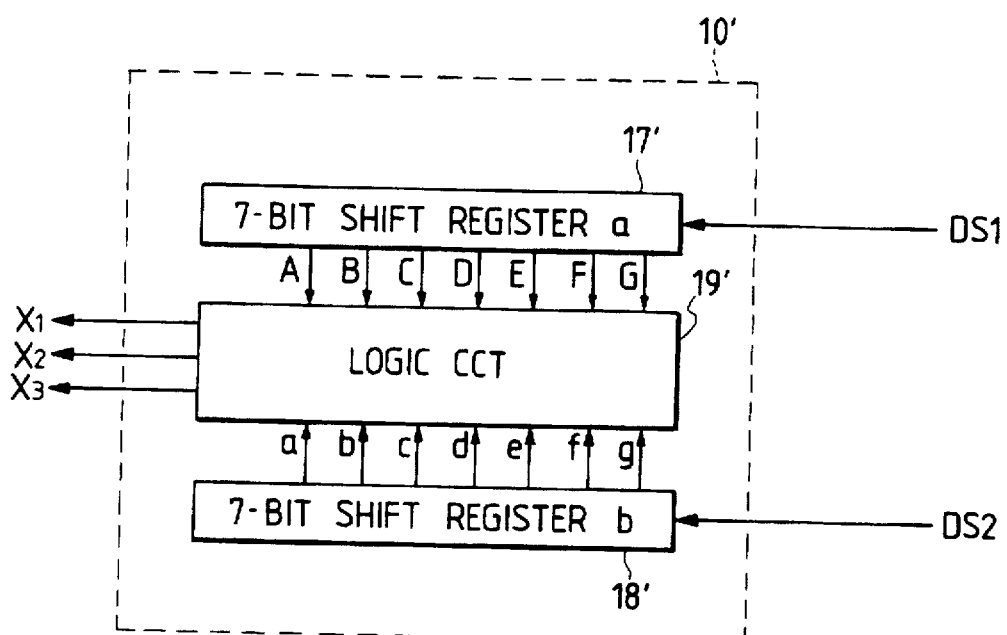
FIG. 36 is a block diagram showing a compare & discriminate circuit of the eighth embodiment.
Figure 37:
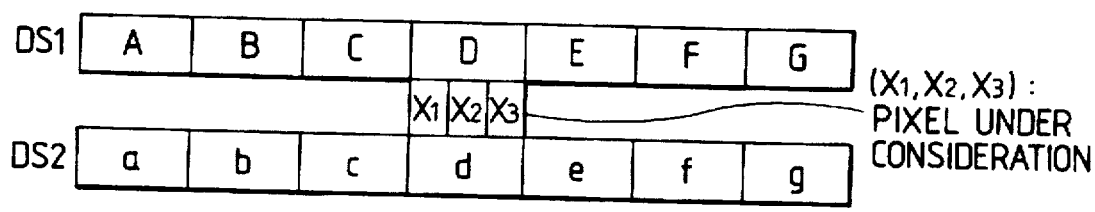
FIG. 37 is a view showing the relationship between a pixel under consideration and bits in the eighth embodiment.

As shown in FIG. 36, the input signals DS1 and DS2 are respectively input to 7-bit shift registers a (17') and b (18'). Shift outputs A, B, C, D, E, F, and G, and a, b, c, d, e, f, and g of the shift registers are input to a logic circuit 19'. A pixel under consideration is divided into three sections in the main scan direction, as shown in FIG. 37, and each section is subjected to a logic operation given by the following logic expression. As a result, a "3-bit" signal as the output signals $x_1$ to $x_3$ is set.

$$
\begin{aligned}
x_1 &= A \cdot a \cdot b \cdot c \cdot d \cdot e \cdot f + F \cdot a \cdot b \cdot c \cdot d \cdot e \cdot f + \\
&\quad B \cdot b \cdot c \cdot d \cdot e + E \cdot b \cdot c \cdot d \cdot e + \\
&\quad C \cdot c \cdot d + D \cdot d + \\
&\quad A \cdot B \cdot C \cdot D \cdot E \cdot F + a \cdot b \cdot c \cdot d \cdot e \cdot f \\
&= (A+F) \cdot a \cdot b \cdot c \cdot d \cdot e \cdot f + \\
&\quad (B+E) \cdot b \cdot c \cdot d \cdot e + \\
&\quad (C \cdot c + D) \cdot d + \\
&\quad A \cdot B \cdot C \cdot D \cdot E \cdot F + a \cdot b \cdot c \cdot d \cdot e \cdot f \\
x_2 &= A \cdot a \cdot b \cdot c \cdot d \cdot e \cdot f \cdot g + G \cdot a \cdot b \cdot c \cdot d \cdot e \cdot f \cdot g + \\
&\quad B \cdot b \cdot c \cdot d \cdot e \cdot f + F \cdot b \cdot c \cdot d \cdot e \cdot f + \\
&\quad C \cdot c \cdot d \cdot e + E \cdot c \cdot d \cdot e + \\
&\quad D \cdot d + B \cdot C \cdot D \cdot E \cdot F + b \cdot c \cdot d \cdot e \cdot f \\
&= (A+G) \cdot a \cdot b \cdot c \cdot d \cdot e \cdot f \cdot g + \\
&\quad (B+F) \cdot b \cdot c \cdot d \cdot e \cdot f + \\
&\quad (C+E) \cdot c \cdot d \cdot e + \\
&\quad D \cdot d + B \cdot C \cdot D \cdot E \cdot F + b \cdot c \cdot d \cdot e \cdot f \\
x_3 &= B \cdot b \cdot c \cdot d \cdot e \cdot f \cdot g + G \cdot b \cdot c \cdot d \cdot e \cdot f \cdot g + \\
&\quad C \cdot c \cdot d \cdot e \cdot f + F \cdot c \cdot d \cdot e \cdot f + \\
&\quad D \cdot d + E \cdot d \cdot e + \\
&\quad B \cdot C \cdot D \cdot E \cdot F \cdot G + b \cdot c \cdot d \cdot e \cdot f \cdot g \\
&= (B+G) \cdot b \cdot c \cdot d \cdot e \cdot f \cdot g + \\
&\quad (C+F) \cdot c \cdot d \cdot e \cdot f + \\
&\quad (D+E \cdot e) \cdot d + \\
&\quad B \cdot C \cdot D \cdot E \cdot F \cdot G + b \cdot c \cdot d \cdot e \cdot f \cdot g
\end{aligned}
$$

Note that symbol "·" indicates an AND logic, and symbol "+" indicates an OR logic.

Figure 38:
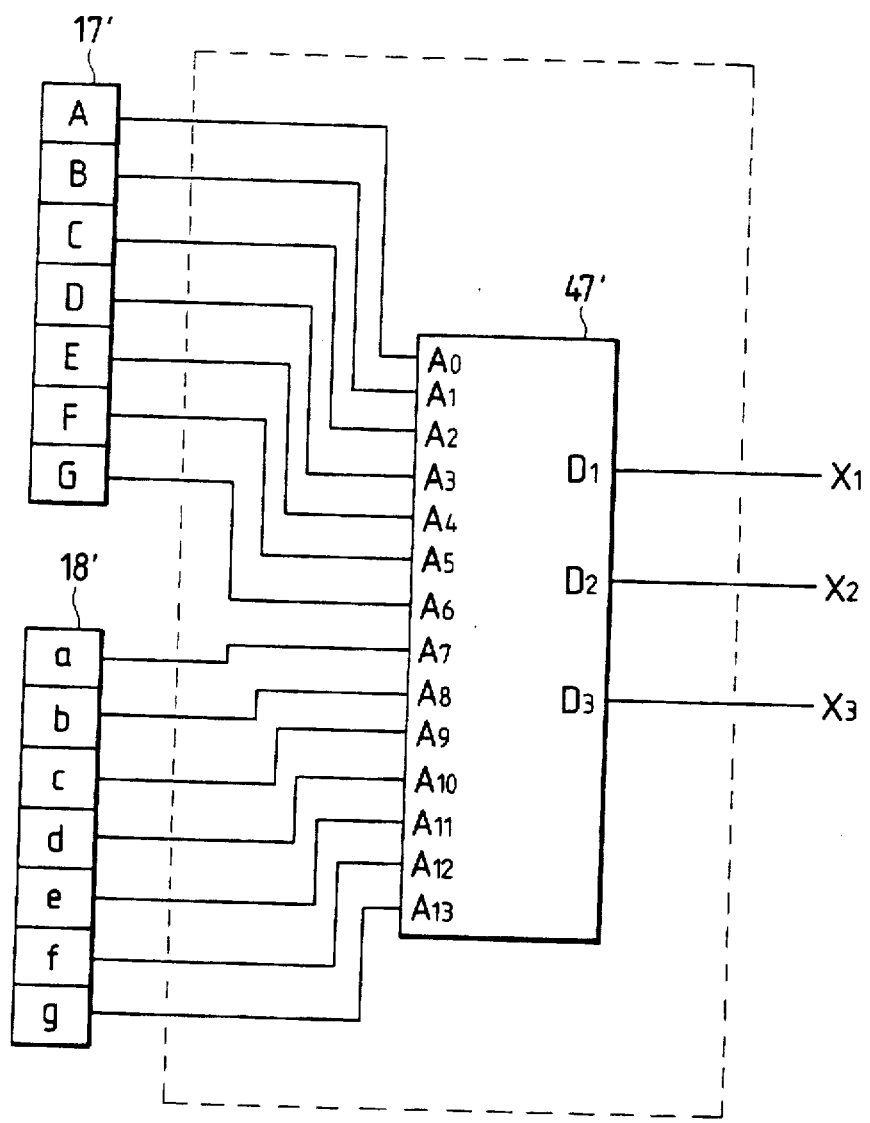
FIG. 38 is a diagram showing an arrangement of a logic circuit of the eighth embodiment.
Figure 39:
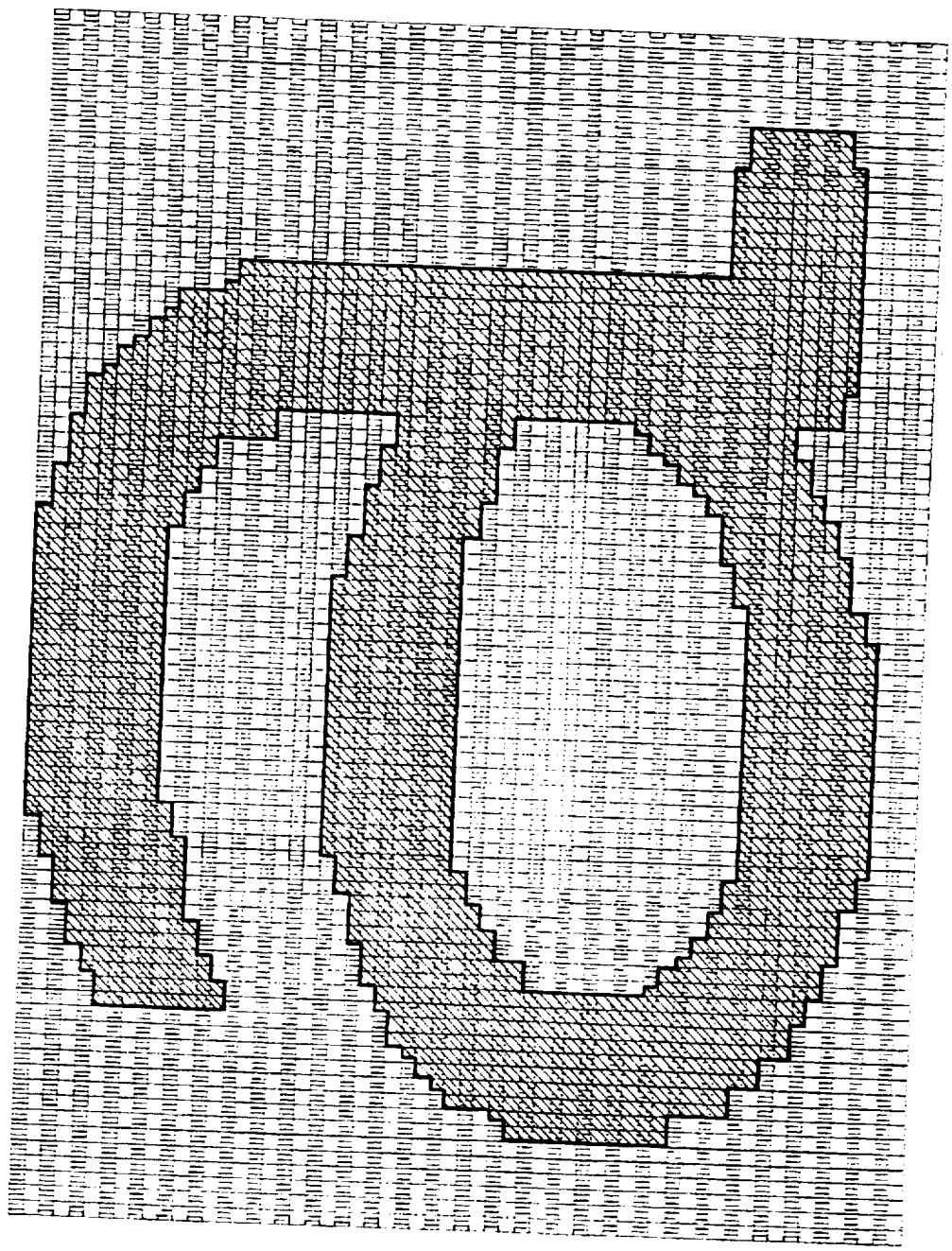
FIG. 39 shows a dot configuration of the eighth embodiment.

In order to realize the above-mentioned logical expressions, the logic circuit 19' can comprise a memory PROM 47', as shown in FIG. 38. As shown in FIG. 38, the input signals A to G and a to g are input to input terminals $A_0$ to $A_{13}$ as address signals of the PROM 47', and the output signals $x_1$ to $x_3$ are output from terminals $D_1$ to $D_3$. In this case, data is written in advance in the PROM 47' in accordance with the above-mentioned logical expressions. FIG. 39 shows a printed result according to the method of the eighth embodiment. As can be seen from FIG. 39, indentations of letter "a" can be improved as compared to FIG. 3.

FIG. 4B described above can also be used as the timing chart of the data conversion circuit of the eighth embodiment.

Figure 40:
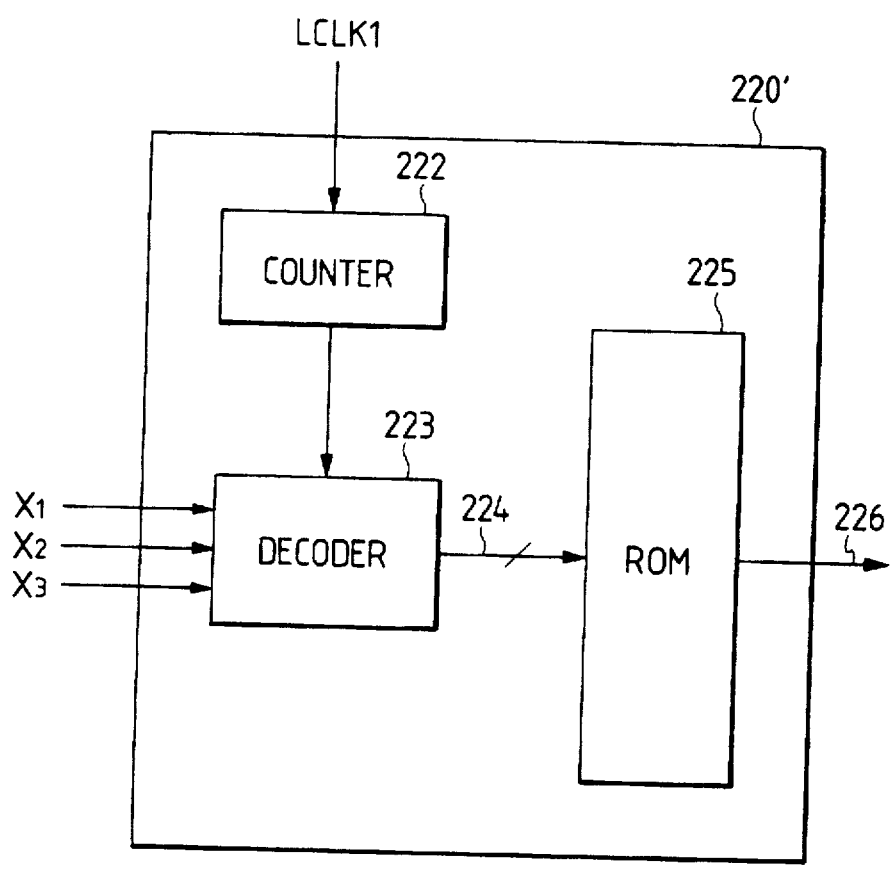
FIG. 40 is a diagram showing an arrangement of another pulse width modulating circuit.

FIG. 40 shows an embodiment wherein the pulse width modulating circuit 220 is arranged as a look-up table.

Figure 41:
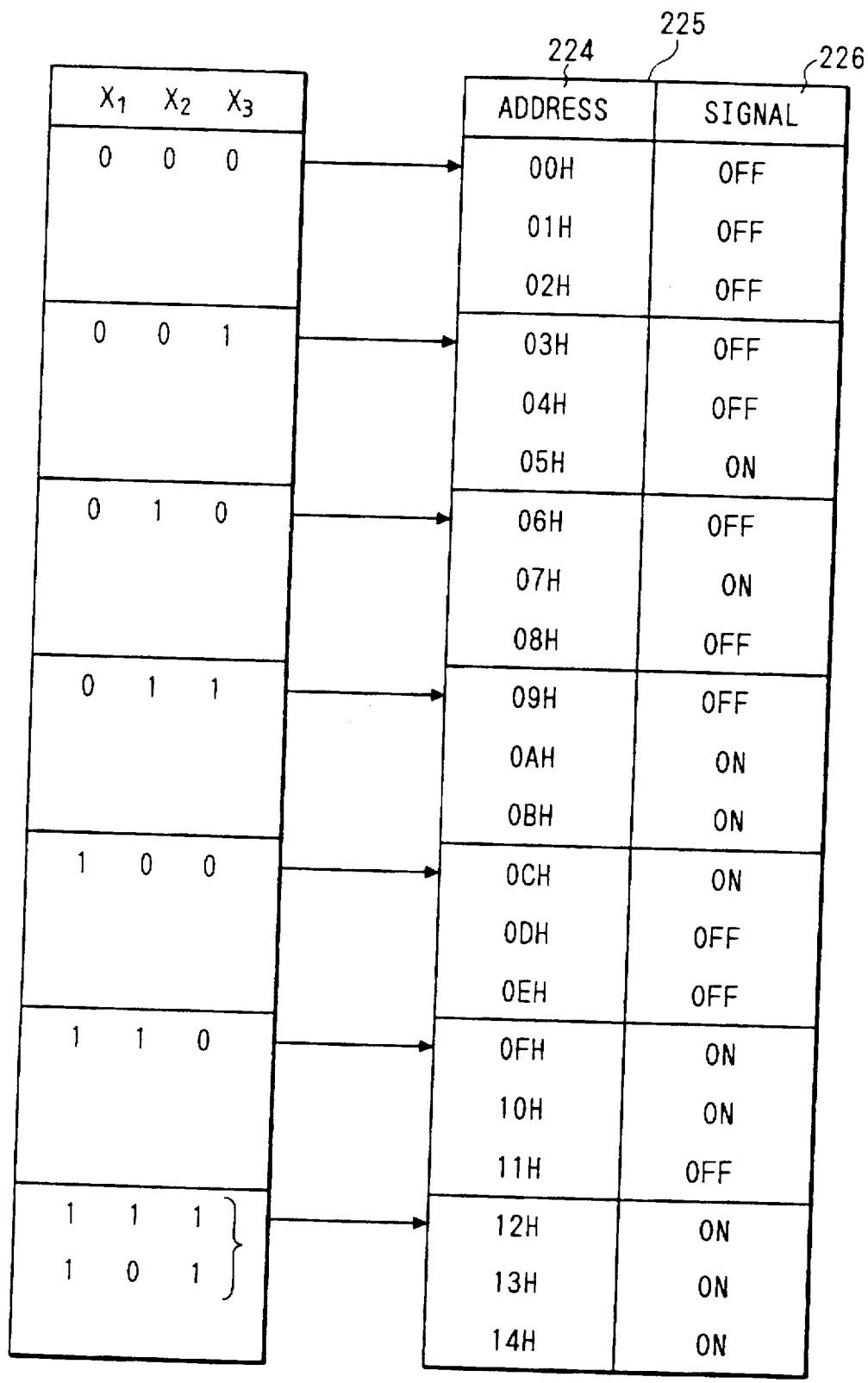
FIG. 41 is a view showing the relationship between addresses and output signals in FIG. 40.

In FIG. 40, a counter 222 outputs, to a decoder 223, a counter value for determining an address 224 (to be described later) in accordance with the clock signal LCLK1 output from the oscillation circuit 5'. The decoder 223 determines the address 224 in a ROM 225 in accordance with the output value from the counter 222 and the results of the output signals $x_1$ to $x_3$ output from the compare and discriminate circuit 10'. The ROM 225 has a content, as shown in FIG. 41. As shown in FIG. 41, the ROM 225 outputs a signal 226 corresponding to the address 224 determined by the signals $x_1$ to $x_3$ and the counter 222.

In the eighth embodiment, the combination of 300 dpi and 600 dpi has been exemplified. However, the present invention may be applied to a combination of 400 dpi and 800 dpi.

In this embodiment, as the printer engine, the laser beam printer has been exemplified. However, the printer engine may comprise an LED printer, an ink-jet printer, or the like.

In this embodiment, interpolation data is determined by the logical expressions for 14 pixels surrounding a pixel under consideration. However, the logical expressions are not limited to those of this embodiment. The pixel under consideration is divided into three sections in the main scan direction but may be divided into four or more sections.

(Ninth Embodiment)

Figure 42:
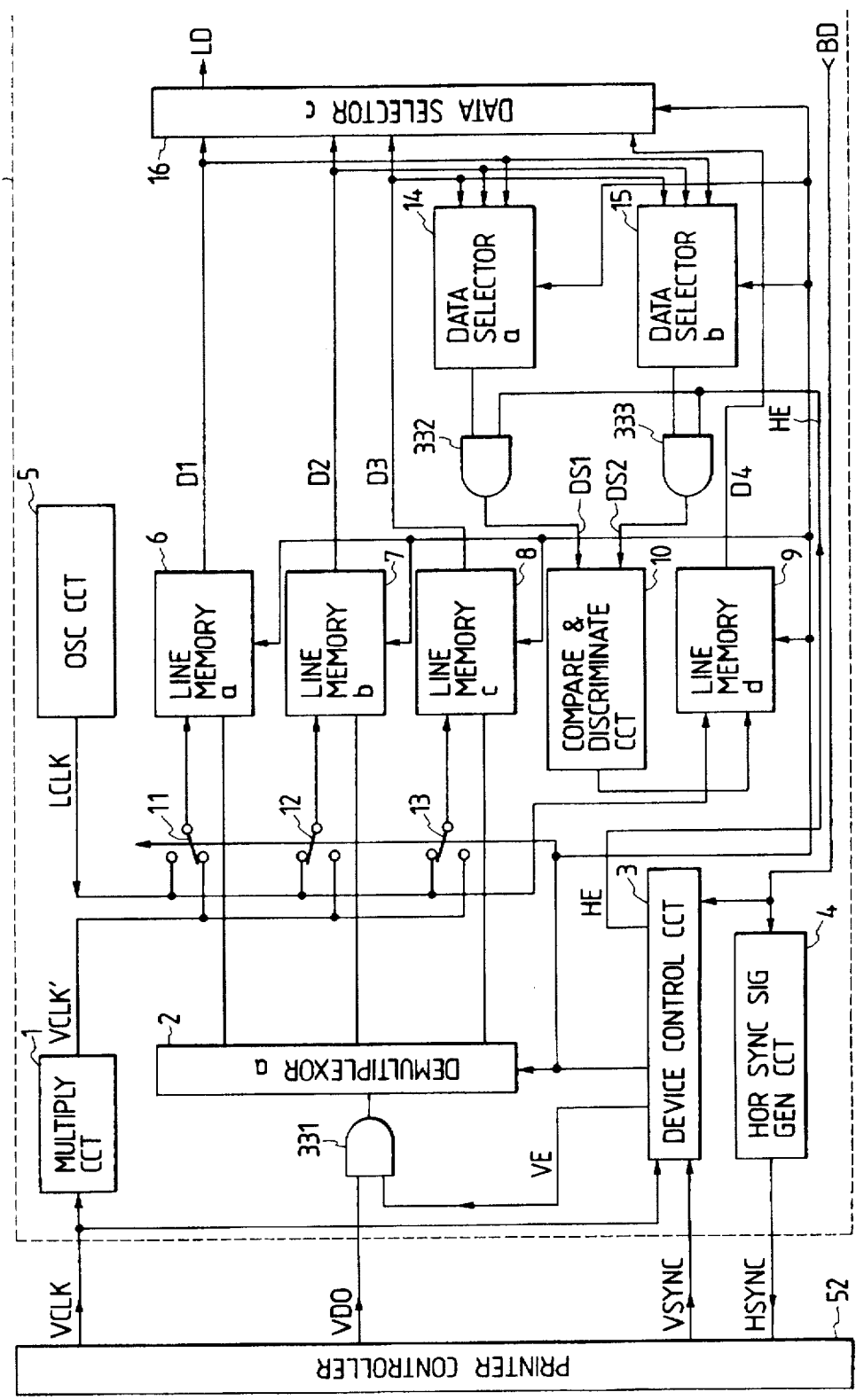
FIG. 42 is a block diagram showing a data conversion circuit according to a ninth embodiment of the present invention.

FIG. 42 is a block diagram showing an arrangement of a data conversion circuit of a laser beam printer according to a ninth embodiment of the present invention. Note that the same reference numerals denote the parts having the same functions as in FIG. 4A.

In this embodiment, a 300-dpi (dots/inch) image signal output from a printer controller 52 is converted to 600-dpi data by interpolation, and the 600-dpi data is printed by a printer engine 51. This will be described in detail below.

As has been described in the first embodiment, a device control circuit 3 executes read/write control of line memories 6 to 9 and selection control of data selectors 14 and 15. The circuit 3 controls these circuits in units of lines on the basis of a BD signal, a vertical sync signal VSYNC for defining a write timing of an image in a sub-scan direction, and an image clock signal VCLK.

Other basic operations of the data conversion circuit in FIG. 42 has already been described with reference to FIG. 4A, and a repetitive description is avoided.

In the above-mentioned operation, when processing is performed at end portions (leading end, trailing end, left end, and right end) of an image, reference data input to a compare and discriminate circuit 10 includes data in a non-image region. In this embodiment, AND gates 331 to 333 are used to process such non-image portion data as "white".

The AND gate 331 is used to write "white" image data in the line memories 6 to 8 for a non-image region. One input terminal of the AND gate 331 receives an image signal VDO from the controller 52, and the other input terminal receives a vertical enable signal VE.

The vertical enable signal VE is output from the device control circuit 3, and goes to "1" level during only an output period of image data in the sub-scan direction.

When the controller 52 outputs the image signal VDO after at least four horizontal sync signals are counted after outputting of the vertical sync signal, "0"="white" data are written in all the line memories 6 to 8.

The AND gates 332 and 333 are used to output "white" data in a non-image region in the main scan direction. One input terminal of each of the AND gates 332 and 333 receives output data from the data selector 14 or 15, and the other input terminal receives a horizontal enable signal HE. The horizontal enable signal HE is output from the device control circuit 3, and goes to "1" level during only a period of one main scan line in which image data from the data selectors are valid. Therefore, the compare and discriminate circuit 10 processes data right and left non-image regions as "0"="white".

As described above, at timings of non-image regions before the leading end of an image and after its trailing end, "white" data are written in the line memories 6 to 8. At timings to the left of the left end of the image and to the right of the right end, "white" data is input to the compare & discriminate circuit 10. Therefore, processing using data in the non-image regions as "white" is performed. Thus, data in the non-image regions can be prevented from becoming unstable, and a pixel under consideration can be optimally processed.

In this embodiment, data in the non-image region is processed as "white" but may be processed as "black". An image signal is not limited to a binary signal but may be a multi-value signal. Furthermore, the present invention may be applied to printers which perform a printing operation based on dot data, such as an LED printer, an LCD printer, and the like.

(10th Embodiment)

Figure 43:
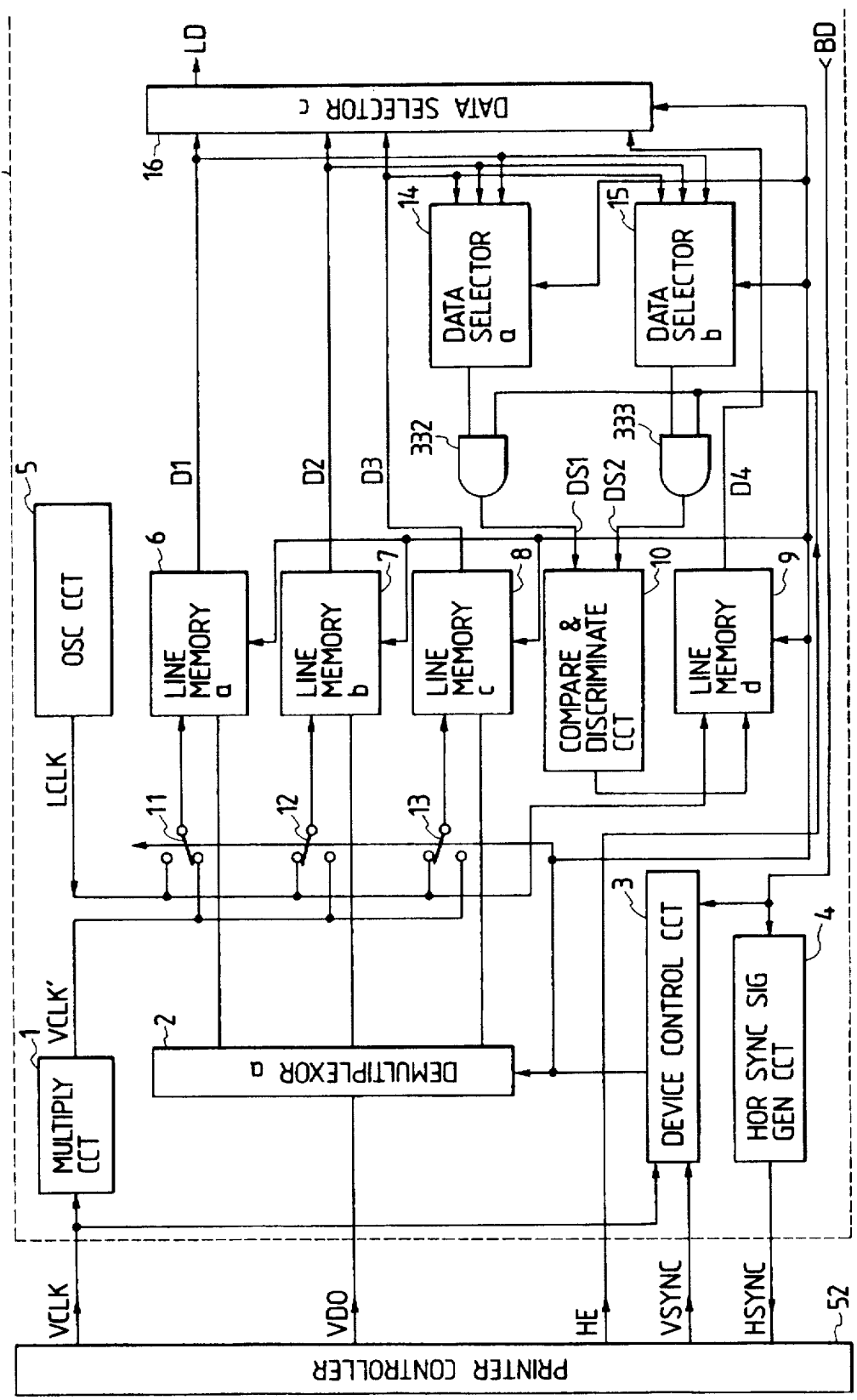
FIG. 43 is a block diagram showing a data conversion circuit according to a 10th embodiment of the present invention.

FIG. 43 is a block diagram showing a data conversion circuit according to a 10th embodiment of the present invention. In the description of the 10th embodiment, the same reference numerals denote the same parts as in the ninth embodiment.

In the ninth embodiment, data in the non-image region is processed as "white" by the device control circuit 3. In the 10th embodiment, the above-mentioned control is performed by a printer controller 52.

More specifically, the printer controller 52 outputs "white" data at timings other than a timing when an image signal VDC is valid. In a non-image region, "white" data are written in line memories 6 to 9.

In the main scan direction, a horizontal enable signal HE is supplied from the controller 52 side, so that the same control operation as in the ninth embodiment can be performed.

In this embodiment, the controller 52 controls output timings of "white" data, so that the arrangement of the printer engine can be simplified.

(11th Embodiment)

Figure 44:
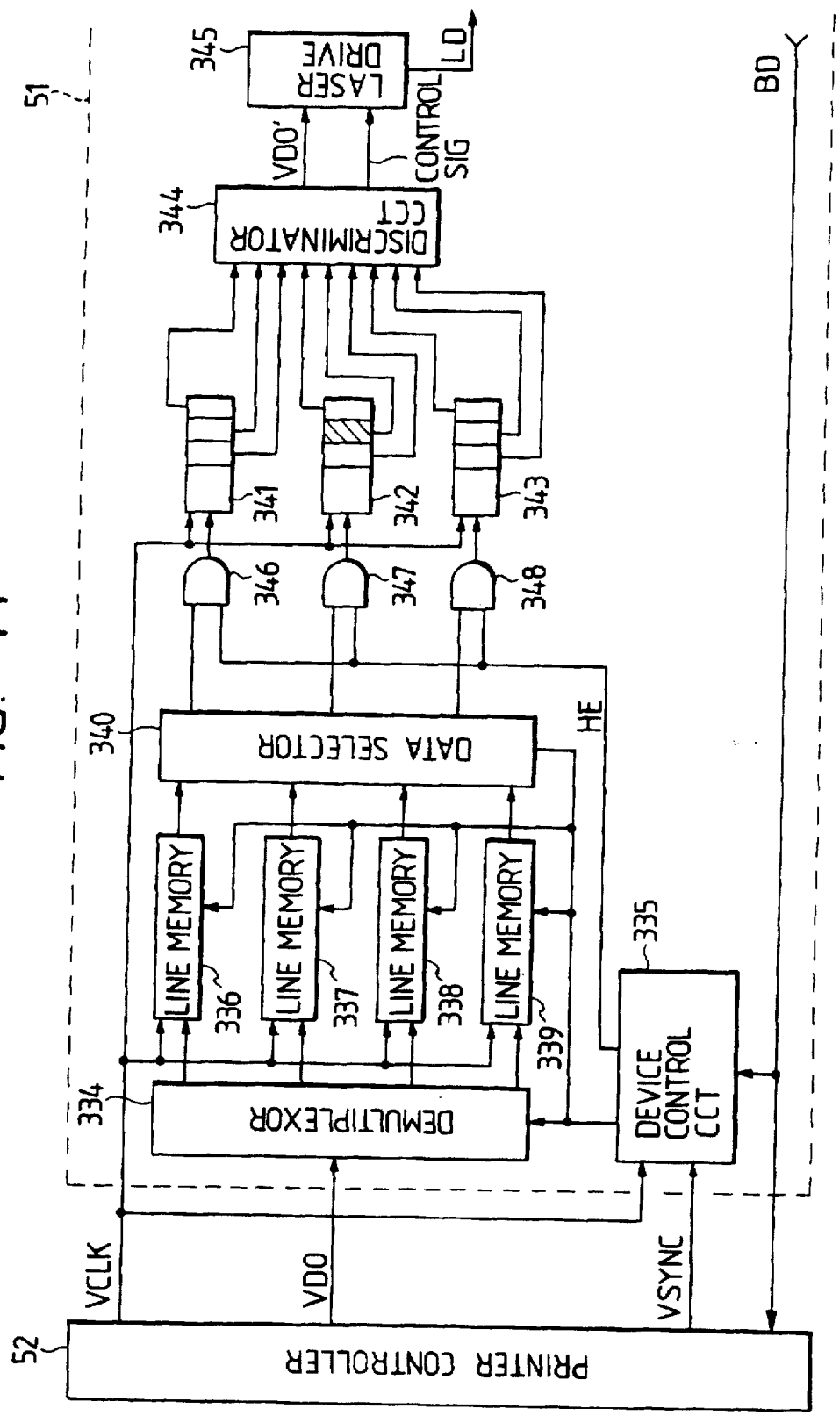
FIG. 44 is a block diagram showing an image quality correction processing circuit according to an 11th embodiment of the present invention.

FIG. 44 is a block diagram showing an 11th embodiment of the present invention.

In the ninth and 10th embodiment, a "white" data generation circuit is added to the data conversion circuit in order to convert input image data into data having a doubled density. In the 11th embodiment, a "white" data generation circuit is added to a so-called image quality correction processing circuit for performing given processing of a pixel under consideration in accordance with surrounding dot data while a printing density is left unchanged.

In the 11th embodiment, the image quality correction processing circuit is included in a printer engine 51. Signal exchange between the printer controller 52 and the printer engine 51 is performed in the same manner as in the ninth and 10th embodiments. In this embodiment, a BD signal is directly output as a horizontal sync signal from the printer engine 51 side to the controller 52 side. A demultiplexer 334 selectively supplies an image signal VDO to line memories 336 to 339.

The image signal VDO is written in one of the line memories 336 to 339 by the demultiplexer 334 and a device control circuit 335, and already written image signals VDO are read out from the three remaining line memories. This operation is repeated as in the above embodiments.

A data selector 340 supplies the image signals read out from the line memories 336 to 339 to shift registers 341 to 343 in a FIFO manner.

The shift register 342 receives data of a line which is being printed. The shift register 341 receives data of an immediately succeeding line of the presently printing line. The shift register 343 receives data of an immediately preceding line of the presently printing line. These shift outputs are input to a discriminator circuit 344. The discriminator circuit 344 discriminates dot data around a pixel under consideration (printing pixel) on the basis of the input data, performs predetermined processing, and outputs pixel data VDO' of the pixel under consideration and a control signal to a laser driver 345. The laser driver 345 drives a laser by a laser drive signal LD on the basis of an input signal from the discriminator circuit 344. The printer controller 52 always outputs "white" data at timings other than a timing obtained when the image signal VDO is valid. Thus, in a non-image region, "white" data are written in the line memories 336 to 339. The device controller 335 outputs a horizontal enable signal HE which goes to "1" level during a valid period of an image signal in the main scan direction, and supplies it to one input terminal of each of AND gates 346 to 348. Therefore, by the horizontal enable signal HE and the AND gates 346 to 348, "white" data is input to the discriminator circuit 344 in the non-image region in the main scan direction. Thus, the discriminator circuit 344 performs processing assuming that data in a non-image region is "white".

Processing performed by the discriminator circuit 344 includes processing for detecting that a pixel under consideration is part of a solid black image, and outputting a control signal for increasing a laser light amount to eliminate pitch nonuniformity of a solid black image portion, processing for detecting that a pixel under consideration is an intersection of lines, and outputting a control signal for decreasing a laser light amount to eliminate an increase in dot size of the intersection, processing for detecting that a pixel under consideration is an oblique line portion of an image and performing smoothing processing, and the like.

In the 11th embodiment, data around a pixel under consideration are read from image data of three lines including a presently printing line. If the number of line memories is increased, an image range to be referred can be widened. The same processing may be performed if a RAM is used in place of the demultiplexer, the plurality of line memories, and the data selector.

(12th Embodiment)

Figure 49:
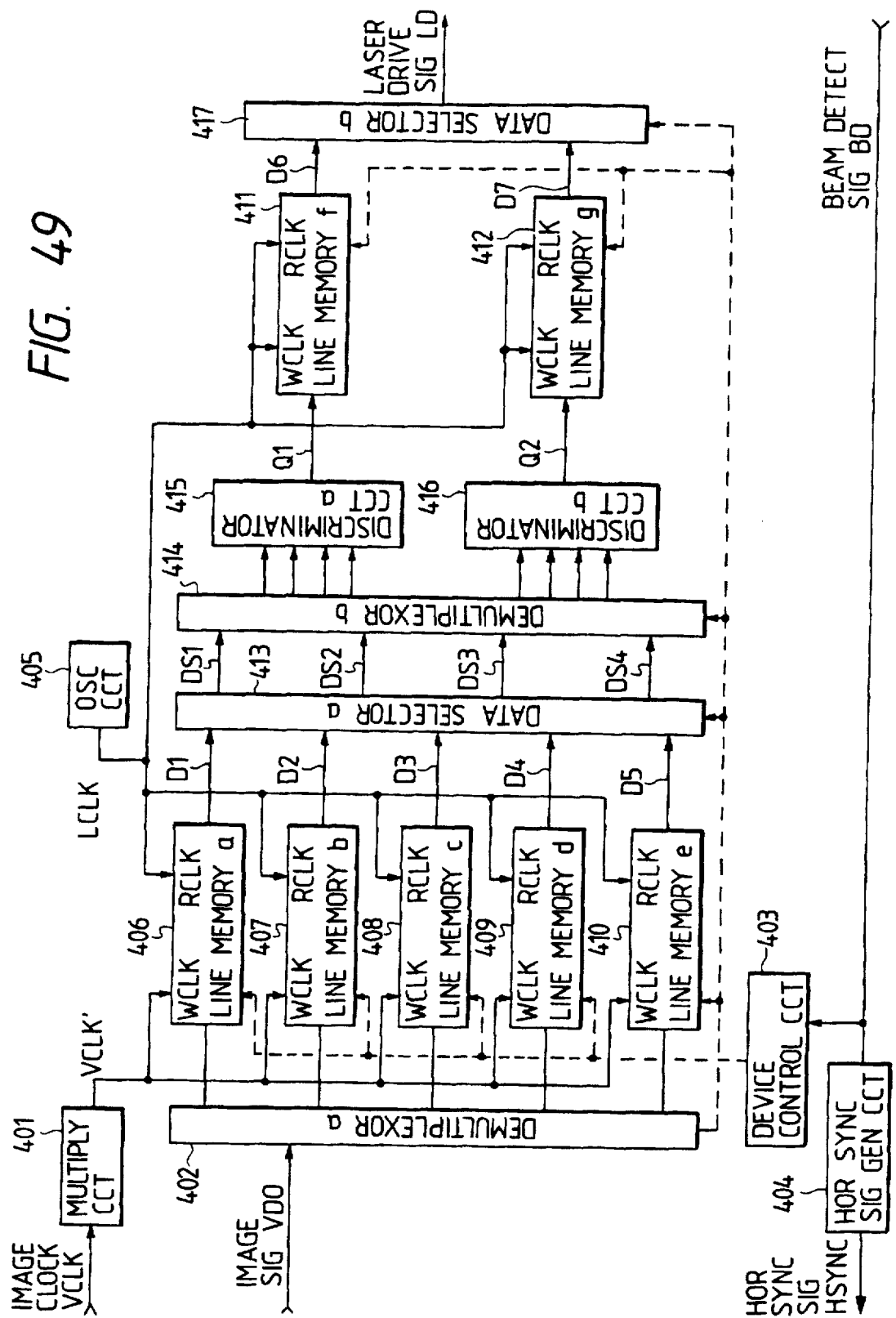
FIG. 49 is a block diagram showing a data conversion circuit according to a 12th embodiment of the present invention.

FIG. 49 shows a 12th embodiment. A circuit shown in FIG. 49 is a data conversion circuit inserted between the printer controller 52 and the printer engine 51 shown in FIG. 1. In this embodiment, the data conversion circuit is arranged as part of the printer engine 51 (of course, it may be arranged as part of the printer controller). The data conversion circuit is configured under a condition that the printer controller outputs a 300-dpi image signal, and the printer engine is for a printing density of 600 dpi. Note that the printer engine comprises a laser driver for modulating a laser beam on the basis of an image signal (dot data), a scanner for scanning the beam, a photosensitive drum, and the like, as is well known.

The printer controller 52 supplies a 300-dpi image signal VDO and an image clock VCLK to the printer engine 51 in accordance with a horizontal sync signal HSYNC output from a horizontal sync signal generation circuit 404. Note that the horizontal sync signal generation circuit 404 outputs the horizontal sync signal on the basis of known BD signals as sync signals in the main scan direction.

The printer engine causes the data conversion circuit to form a 600-dpi laser drive signal LD on the basis of the 300-dpi image signal VDO and the image clock signal VCLK, and performs printing at 600 dpi.

The data conversion circuit will be described in more detail below with reference to FIG. 49.

A frequency multiply circuit 401 multiplies a frequency of the image clock signal VCLK to obtain a clock signal VCLK' having a doubled frequency.

An oscillator circuit 405 generates a clock signal LCLK having a frequency four times that of the image clock signal VCLK.

A demultiplexer 402 has a function of selectively supplying an image signal VDO to line memories a (406), b (407), c (408), d (409), and e (410).

The horizontal sync signal generation circuit 404 counts beam detect signals (BD signals) to output one horizontal sync signal HSYNC every two BD signals. The image signal VDO is written in one of these line memories a to e by the clock signal VCLK' under the control of a device control circuit 403 which controls write/read access based on the BD signals in units of lines, and data are read out from the four remaining line memories on the basis of the clock signal LCLK. During write access of one line memory, data are read out from the four remaining line memories twice. This operation is performed in turn. When the line memory a is subjected to write access, the line memories b, c, d, and e are subjected to read access. At the next timing, the line memory b is subjected to write access and the line memories c, d, e, and a are subjected to read access. At the next timing, the line memory c is subjected to write access, and the line memories d, e, a, and b are subjected to read access.

Each of the line memories a to e has a memory capacity twice that of 300-dpi data in the main scan direction, i.e., 600-dpi data in the main scan direction. Signals read out from the line memories a, b, c, d, and e are respectively represented by D1, D2, D3, D4, and D5.

A data selector a (413) selects four data, which are being read out, of the readout signals D1 to D5 from the line memories a to e, and distributes them to predetermined outputs DS1 to DS4. A 4-bit demultiplexer b (414) alternately outputs the four output signals DS1 to DS4 to discriminator circuits a (415) and b (416) (to be described later) in units of the BD signals. The discriminator circuits a (415) and b (416) compare and discriminate the input four-line data, and output output signals Q1 and Q2 in accordance with the discrimination results. A line memory f (411) stores the output signal Q1, and a line memory g (412) stored the output signal Q2. Each of these line memories f and g has the same memory capacity as those of the line memories a to e. As a read/write clock signal for the line memories f and g, the clock signal LCLK is used. A data selector b (417) selects one of a signal D6 read out from the line memory f and a signal D7 read out from the line memory a, and outputs the selected signal as a laser drive signal LD.

Read/write control of the line memories a to e and the line memories f and g and selection control of the demultiplexers a and b and the data selectors a and b are executed by the device control circuit 403.

Figure 50:
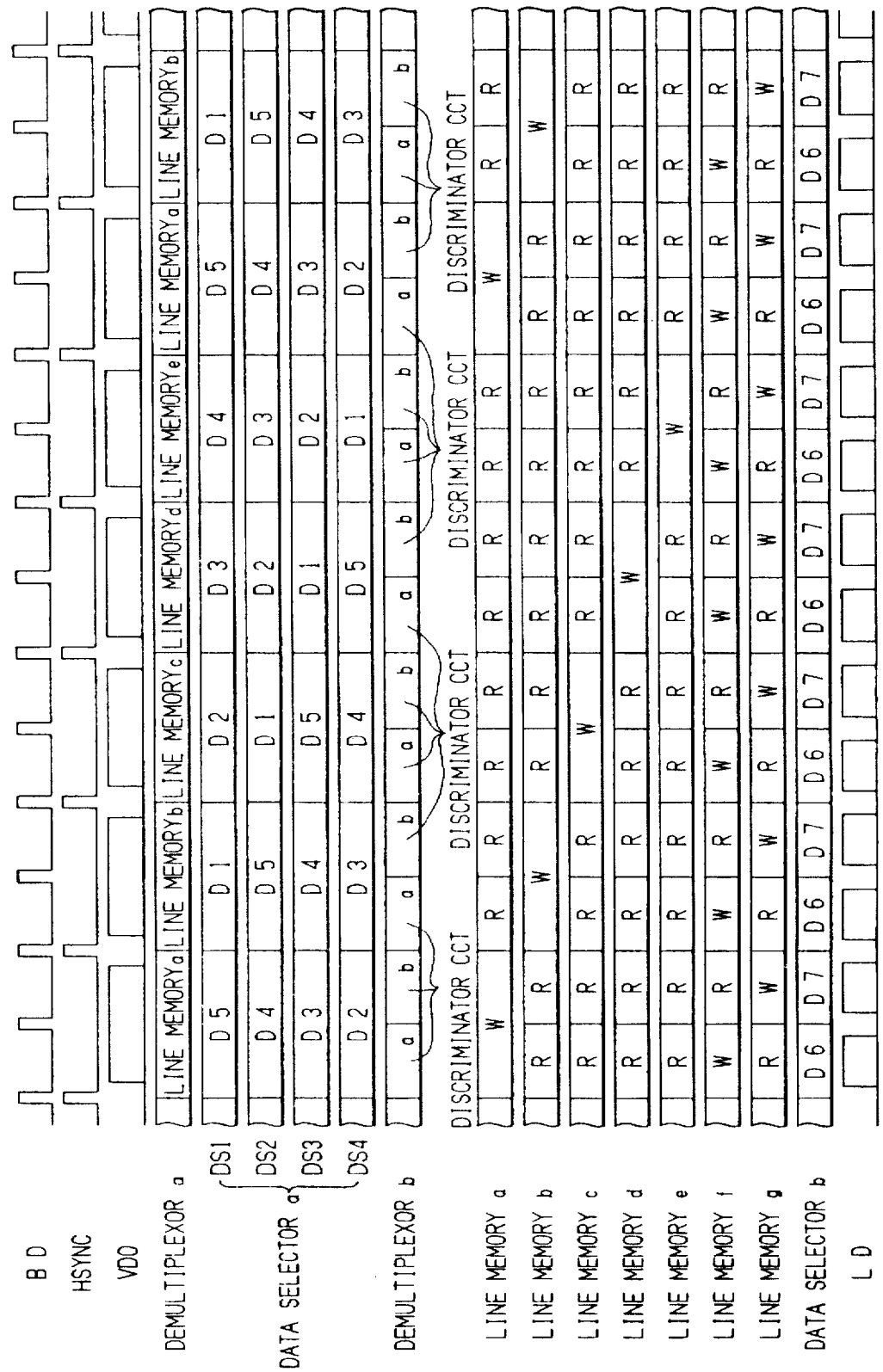
FIG. 50 is a timing chart of the circuit shown in FIG. 49.

FIG. 50 is a timing chart of the operation of the above arrangement.

The operation will be described below with reference to FIG. 50.

As described above, when the line memory a is selected by the demultiplexer a, the line memory a is subjected to write access. While 1-line image signal data is written in the line memory a on the basis of the clock signal VCLK', already stored 1-line data are respectively read out from the line memories b to e twice in response to the clock signal LCLK. In this case, the outputs DS1 to DS4 of the data selector a respectively correspond to D5, D4, D3, and D2. The first readout data DS1 to DS4 are input to the discriminator circuit a by the demultiplexer b, and are written in the line memory f as the data Q1 after predetermined processing. The line memories f and g are alternately subjected to write and read access operations. When the line memory f is subjected to write access, the line memory g is subjected to read access. The readout data D7 is output from the data selector b as the laser drive signal LD.

In the second read access of the line memories b to e, the data DS1 to DS4 are input from the demultiplexer b to the discriminator circuit b, and are written as the data Q2 in the line memory g after predetermined processing.

Figure 51:
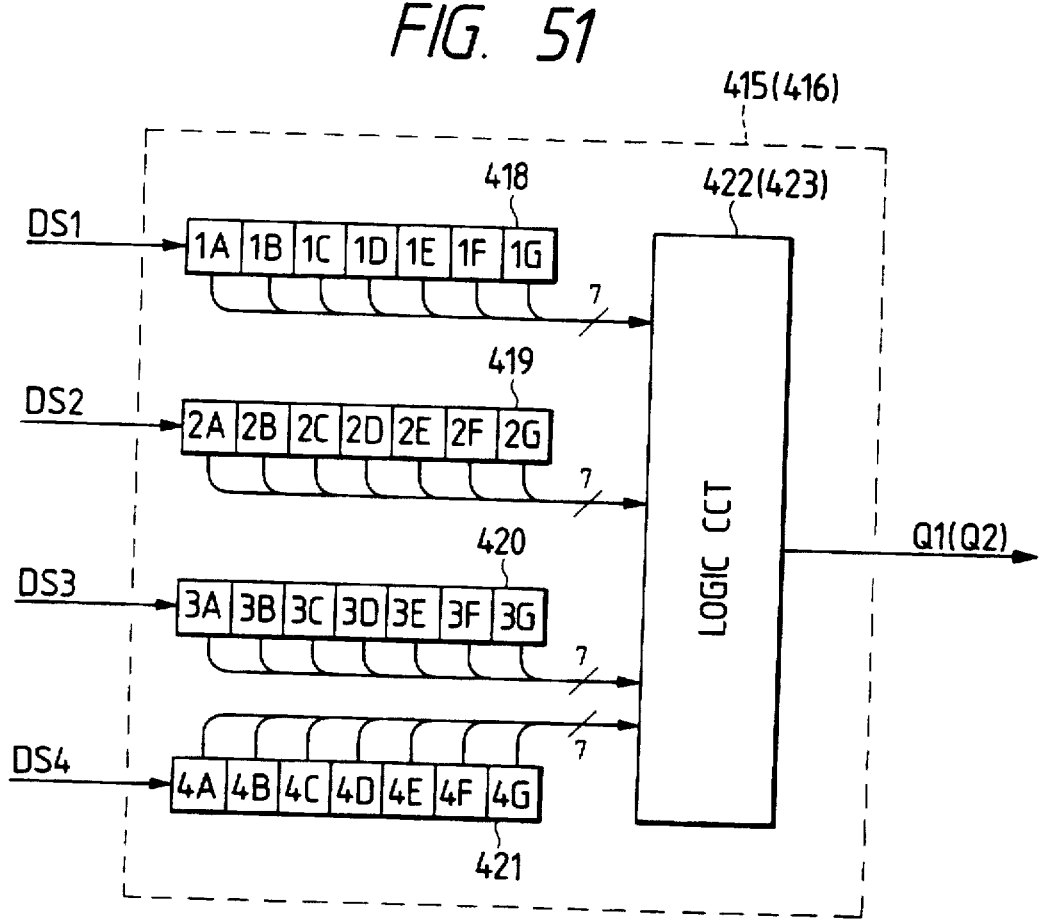
FIG. 51 is a circuit diagram of a discriminator circuit.

The discriminator circuit a (b) is arranged as shown in FIG. 51. The input signals DS1 to DS4 are input to 7-bit shift registers 418 to 421, and shift outputs of the shift registers are input to a logic circuit 422 (423), and are subjected to predetermined processing (to be described later). The logic circuit 422 (423) outputs the output signal Q1 (Q2).

The discriminator circuits a and b perform different processing operations in their logic circuits.

The processing contents in the discriminator circuits a and b will be described below.

Figure 1:
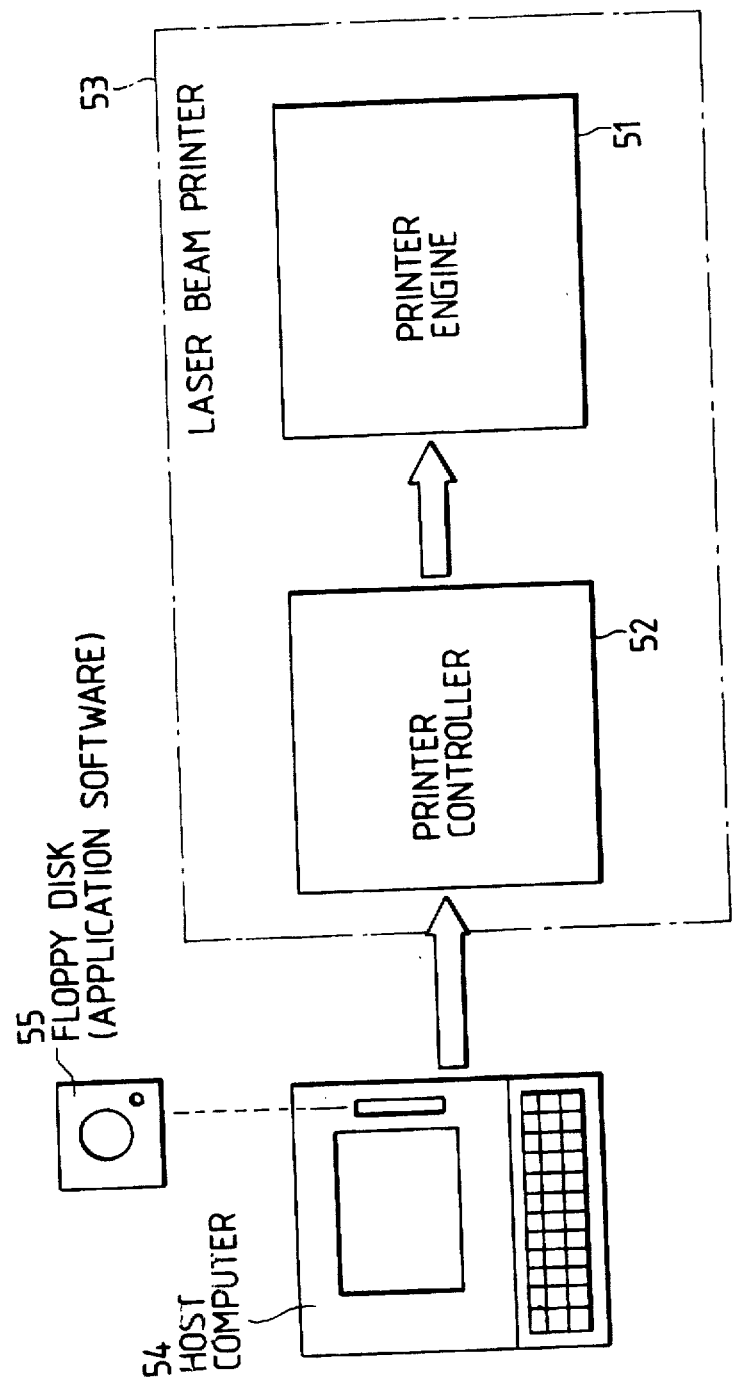
FIG. 1 is a diagram for explaining a laser beam printer system.

In the discriminator circuit b, an output signal Q is set in accordance with a logical expression shown in FIG. 52-1 to form interpolation data in the sub-scan direction.

In the discriminator circuit a, new 3D data is set in accordance with a logical expression shown in FIG. 52-2 to form interpolation data in the main scan direction.

These logics will be described below.

First, the logic of the discriminator circuit b will be described.

In FIG. 53-1, if surrounding pixels 2G and 3B to 3F are black printing data and a pixel 2A is white printing data, it is determined that an input pattern is a stepped pattern, and a pixel under consideration Q is set to be "black" to smooth the step.

In FIGS. 53-2 and 53-3, the presence of a step is determined, and the pixel under consideration Q is set to be "black". In combination of these logics, a pattern having a step in 300-dpi printing as shown in FIG. 54A is smoothed to a pattern in 600-dpi printing as shown in FIG. 54B.

Similarly, cases of right-left symmetry and upside down patterns are combined to smooth a step in the main scan direction.

Figures 3, 55:
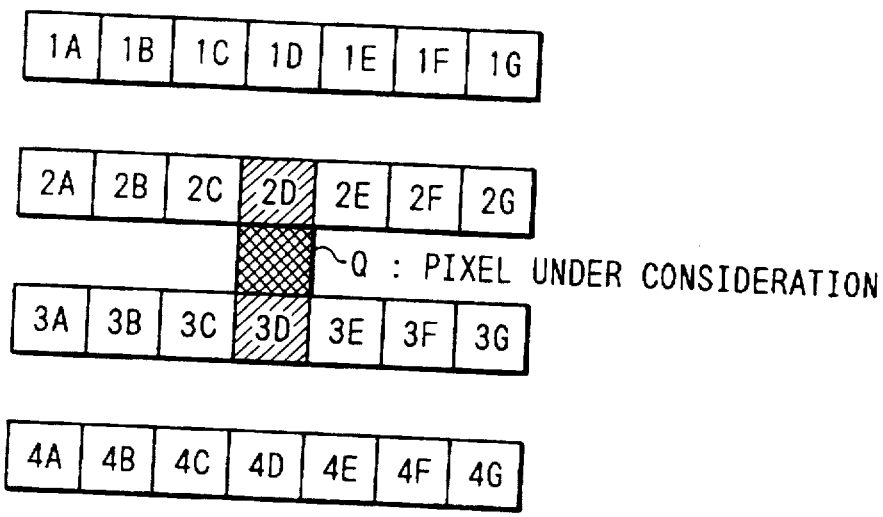

For the vertical direction, as shown in FIG. 55-1, when surrounding pixels 4C and 1E, 2E, and 3E are "black" and a pixel 1C is "white", it is determined that a pattern has a vertical step. In order to smooth the step, the pixel under consideration Q is set to be "black". Also, in FIGS. 55-2 and 55-3, the data is interpolated as described above. For the cases of right-left symmetry and upside down patterns, interpolation is made in accordance with a similar logic.

The logic of the discriminator circuit a will be described below.

Figure 56:
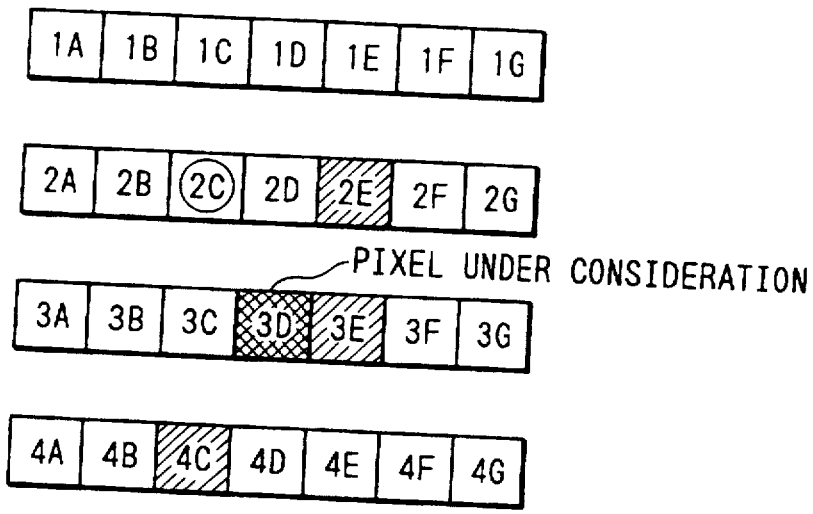
Figure 57A:
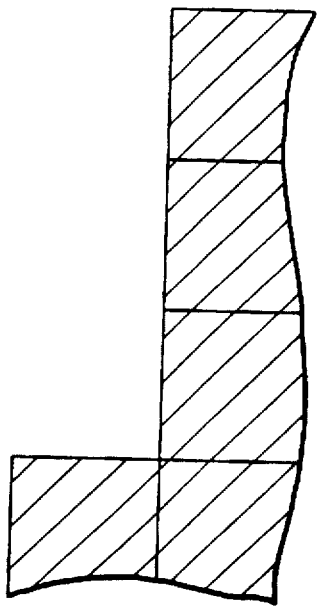
FIGS. 57A and 57B show the result of interpolation process.
Figure 57B:
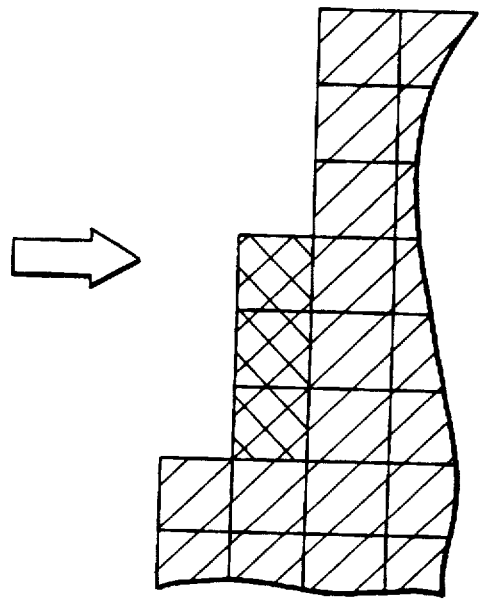

For a line of a pixel under consideration 3D, only when a vertical step is detected, as shown in, e.g., FIG. 56, the pixel 3D is set to be "black". However, if the 3D data is initially "black", it is left unchanged. This logic also applies to the cases of right-left symmetry and upside down patterns. As shown in FIGS. 57A and 57B, a step can be smoothed when 300-dpi printing is switched to 600-dpi printing.

Figure 46:
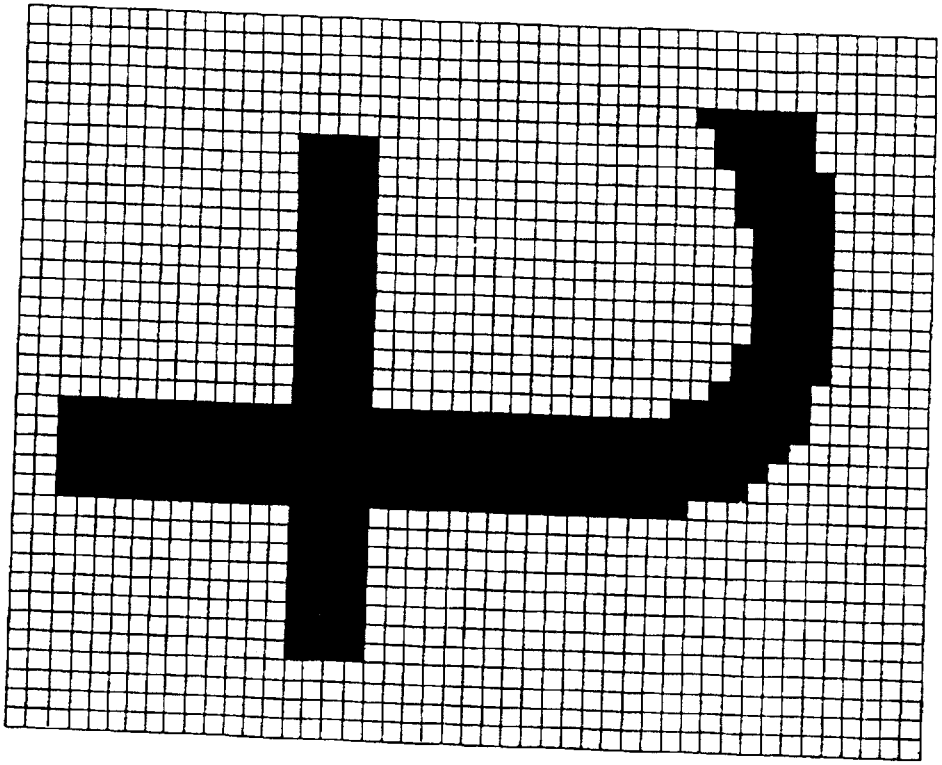
FIGS. 45 and 46 show low-density printing samples.
Figure 59:
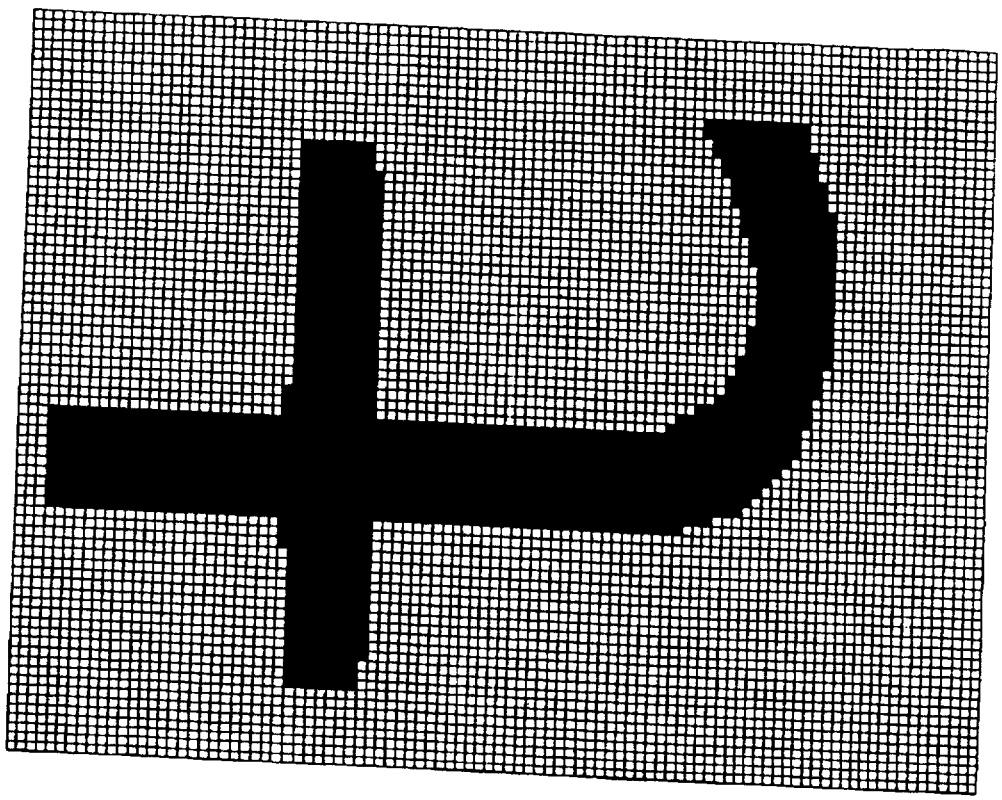
FIGS. 58 and 59 show printing samples subjected to interpolation processing.
Figure 58:
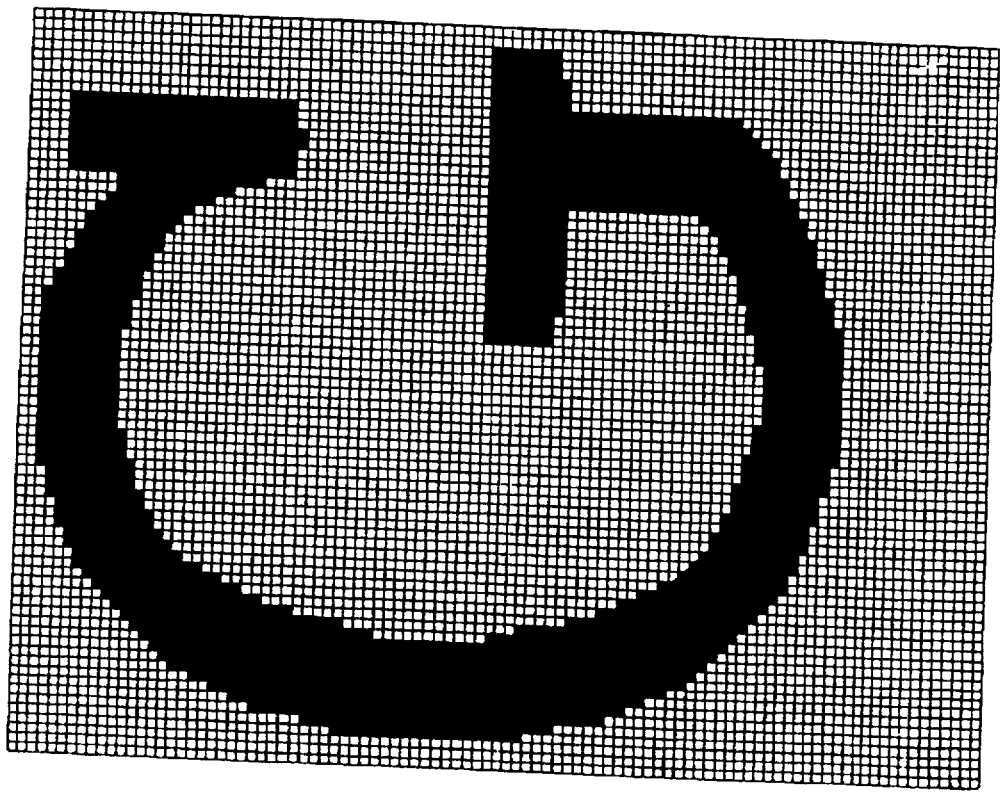

FIGS. 52-1 and 52-2 described above include all the above-mentioned logics. When letter "G" shown in FIG. 45 and letter "t" shown in FIG. 46 are interpolated on the basis of these logics, arc portions are smoothed, as shown in FIGS. 58 and 59, thus exhibiting the feature of 600-dpi printing.

(13th Embodiment)

The logics in the 12th embodiment are further developed to set logics shown in FIGS. 60 and 61, thus obtaining a clearer image.

When the logics in the 12th embodiment are executed, it is simultaneously checked if a portion subjected to the logics is a right-angle portion. If it is determined that the portion subjected to the logics is the right-angle portion, a pixel under consideration is not set to be "black".

As shown in FIG. 62-1, detection of a step is performed in the same manner as in the 12th embodiment. At the same time, a right angle is judged. If it is determined that a surrounding pixel 1G is "black" and other conditions are satisfied, the pixel under consideration is not set to be "black". This applies to the logics shown in FIGS. 62-2 and 62-3.

The logics shown in FIGS. 62-4 and 62-5 correspond to right-angle judgement for a vertical step, and the logic shown in FIG. 62-6 corresponds to right-angle judgement when a pixel under consideration is 3D. The logical expressions shown in FIGS. 60 and 61 are obtained when logics shown in FIGS. 62-1 to 62-3 take a case of right-left symmetry into consideration and the logics shown in FIGS. 62-4 to 62-6 take cases of right-left symmetry and upside down patterns into consideration.

Figure 45:
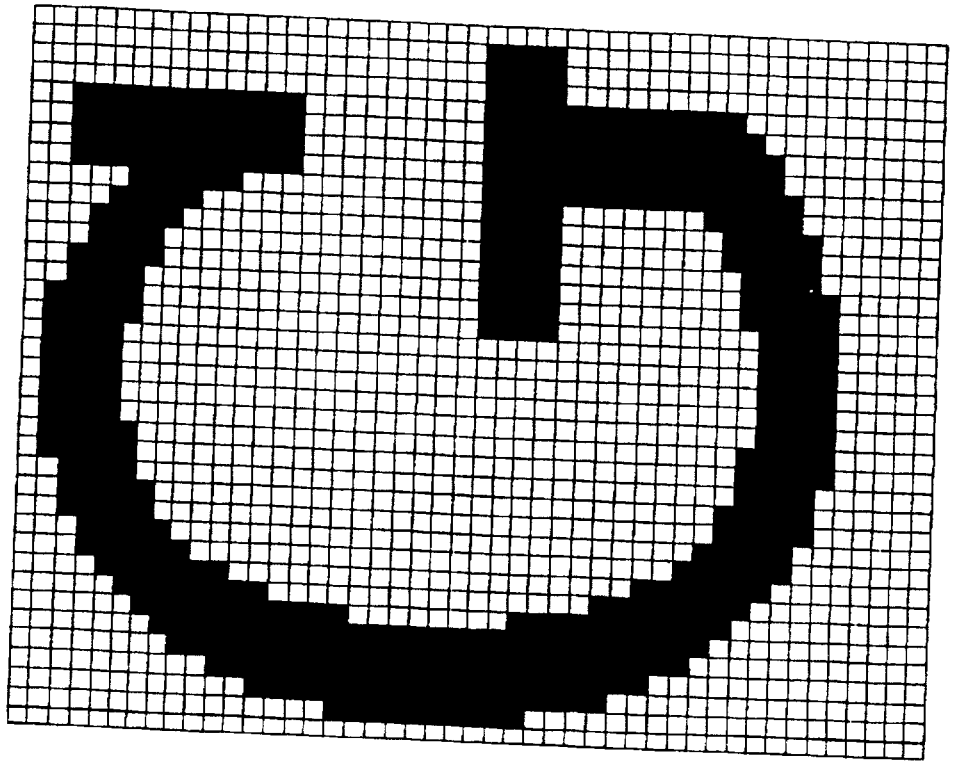
Figure 48:
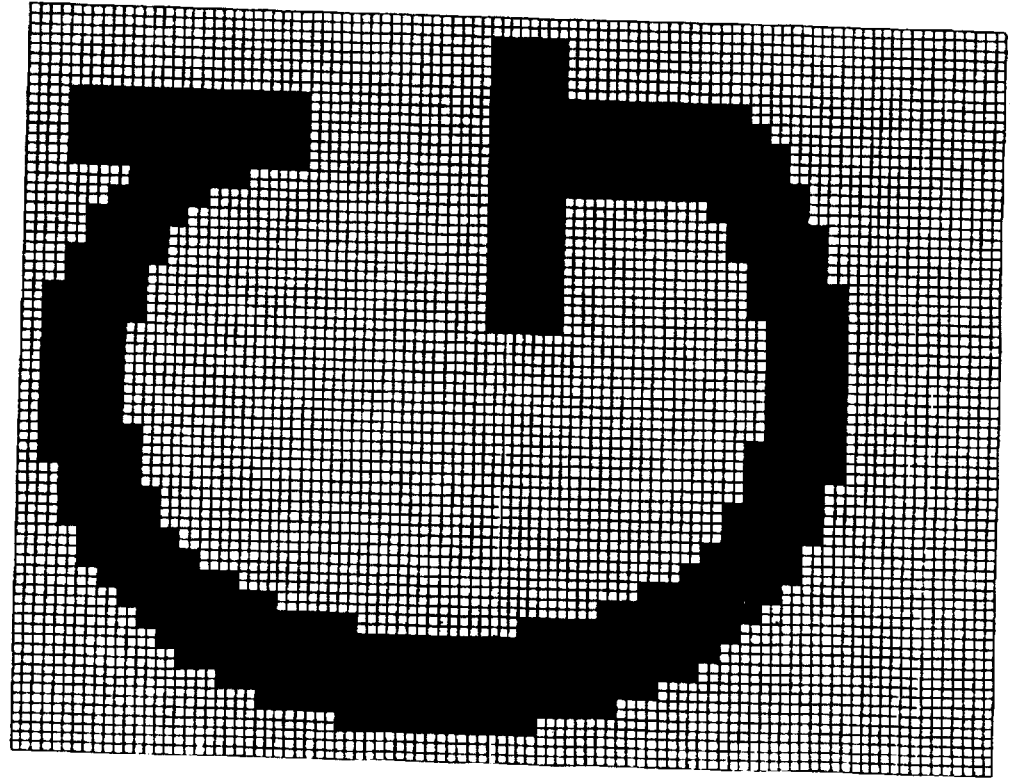
FIGS. 47 and 48 show printing samples of density-converted dot information.
Figure 47:
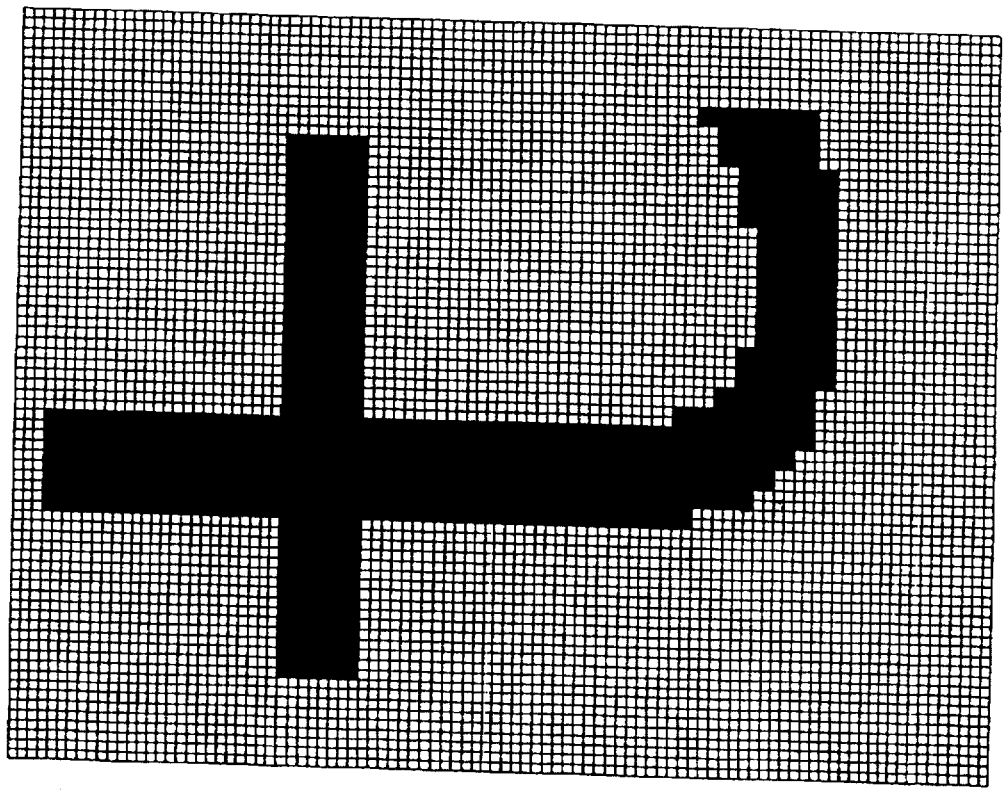
Figure 64:
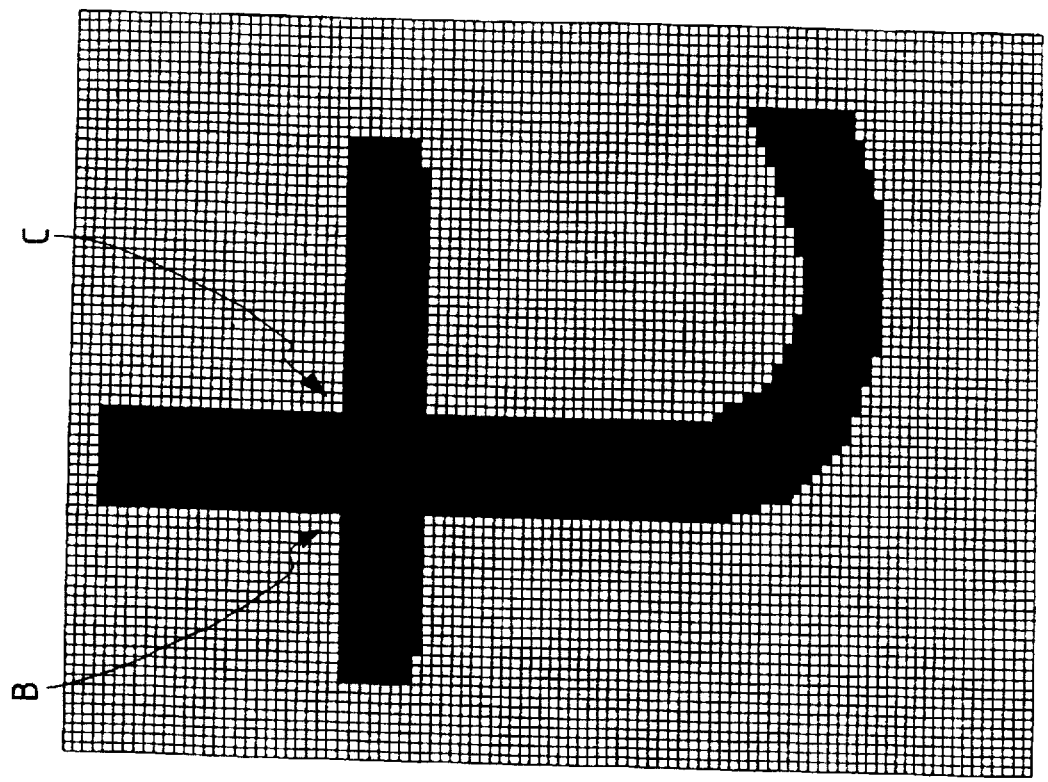
FIGS. 63 and 64 show printing samples subjected to interpolation processing.
Figure 63:
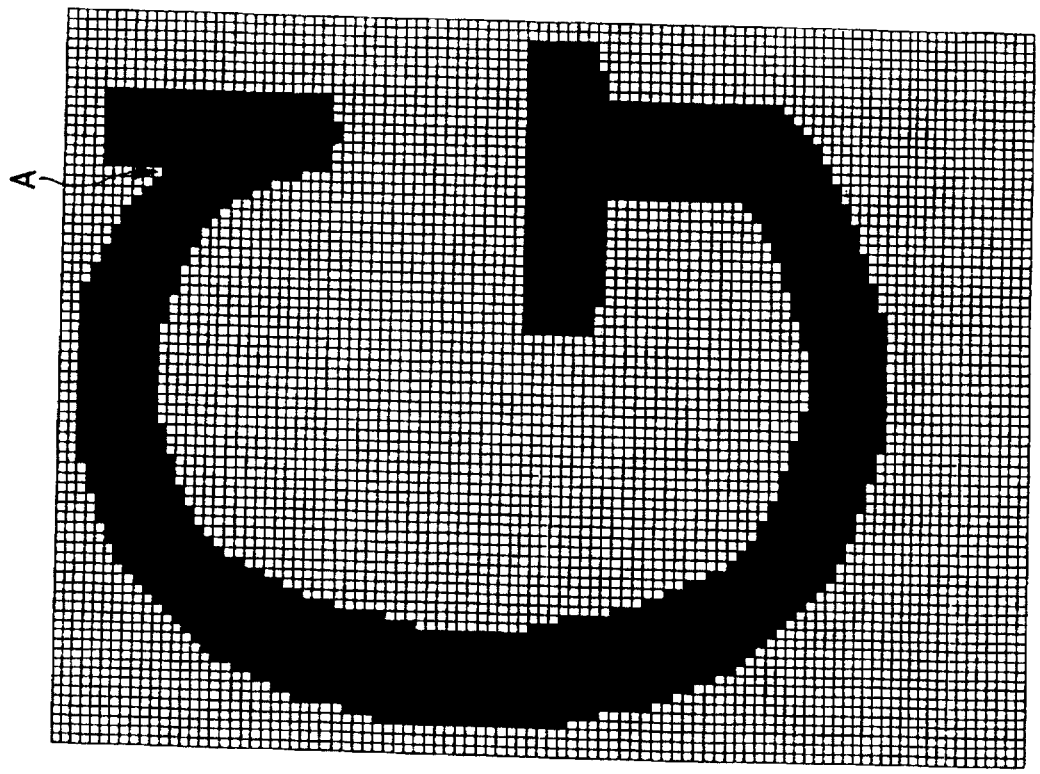

According to these logics, letters "G" and "t" shown in FIGS. 45 and 46 are smoothed as shown in FIGS. 63 and 64. In FIG. 63, a portion A can be sharp, and in FIG. 64, portions B and C can be sharp, thus providing very good characters.

(14th Embodiment)

The number of pixels to be compared is increased, and a logic shown in FIG. 65 is added to the logics of the 13th embodiment, thus further improving an image. The logic of this embodiment corresponds to processing for obtaining a clear corner portion. The logic is shown in detail in FIGS. 66-1 to 66-3.

Figure 68:
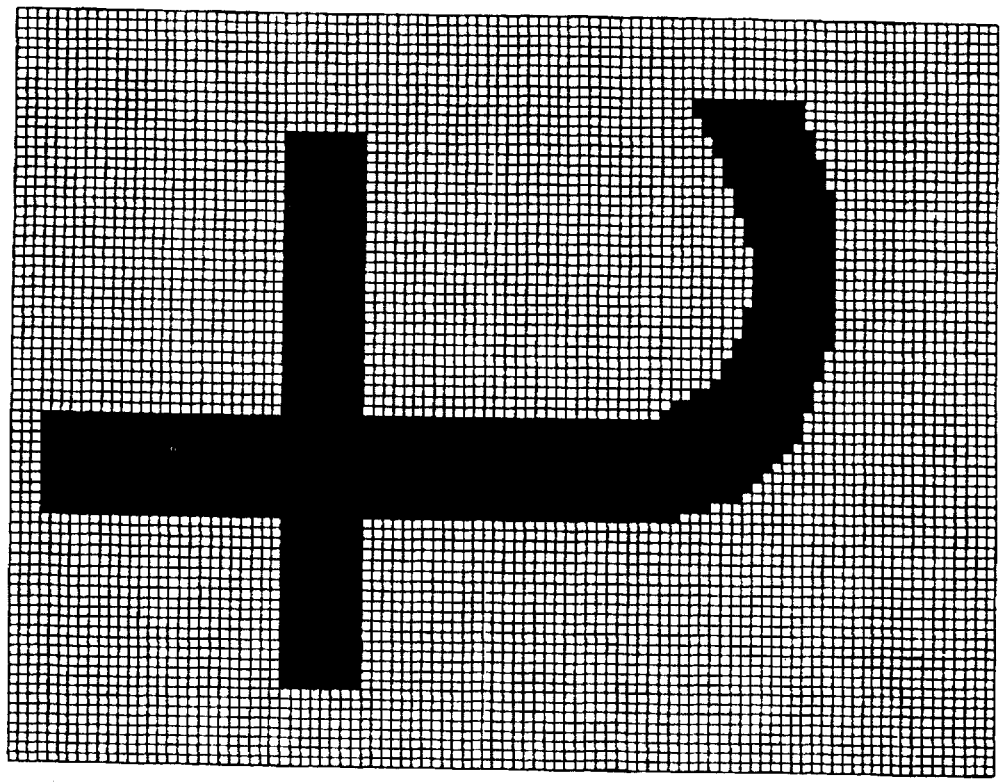
FIGS. 67 and 68 show printing samples subjected to interpolation processing.
Figure 67:
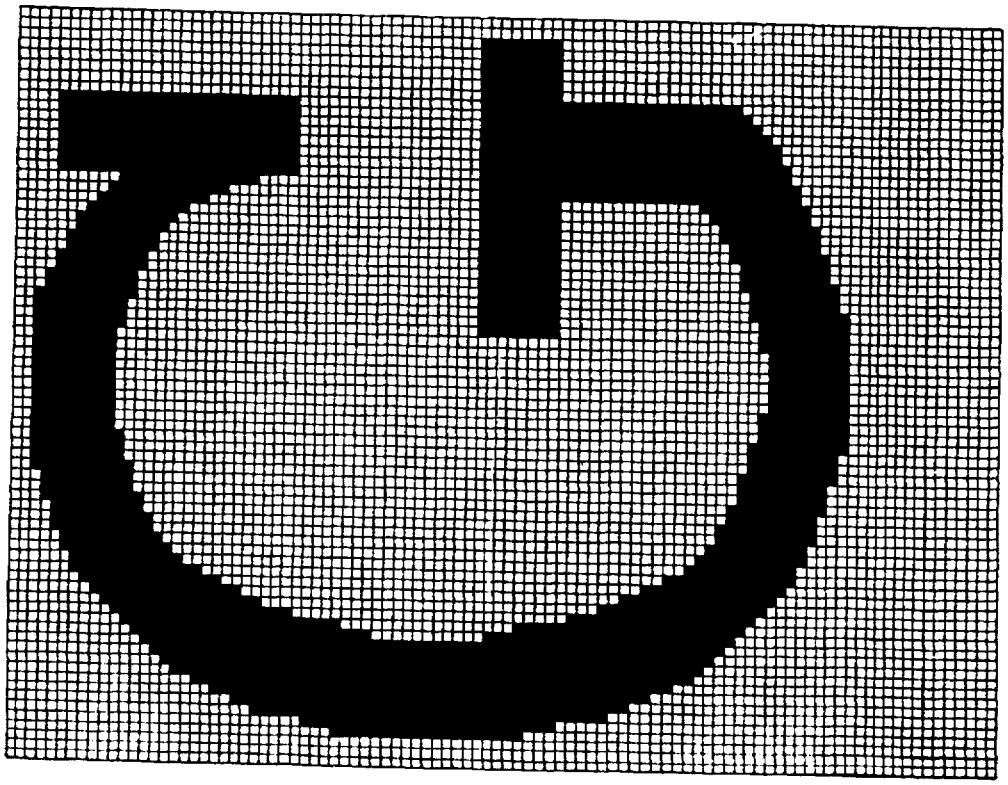

FIGS. 67 and 68 show images obtained by processing letters "G" and "t" shown in FIGS. 45 and 46 according to this logic. Thus, letters "G" and "t" printed at 300 dpi shown in FIGS. 45 and 46 can be converted to smooth and sharp images having the feature of 600-dpi printing.

In the above embodiment, a combination of a 300-dpi printer controller and a 600-dpi printer engine has been exemplified. However, the present invention may be applied to a combination of a 400-dpi printer controller and an 800-dpi printer engine.

The printer engine is not limited to the laser beam printer but may an LED printer, an ink-jet printer, or the like.

In this embodiment, four-line image data are compared. However, the present invention is not limited to this. Basically, image data comparison can be started from 3 lines. As the number of lines to be compared is increased, correction in a wider range can be performed, and a smoother image can be obtained.

(15th Embodiment)

Figure 80:
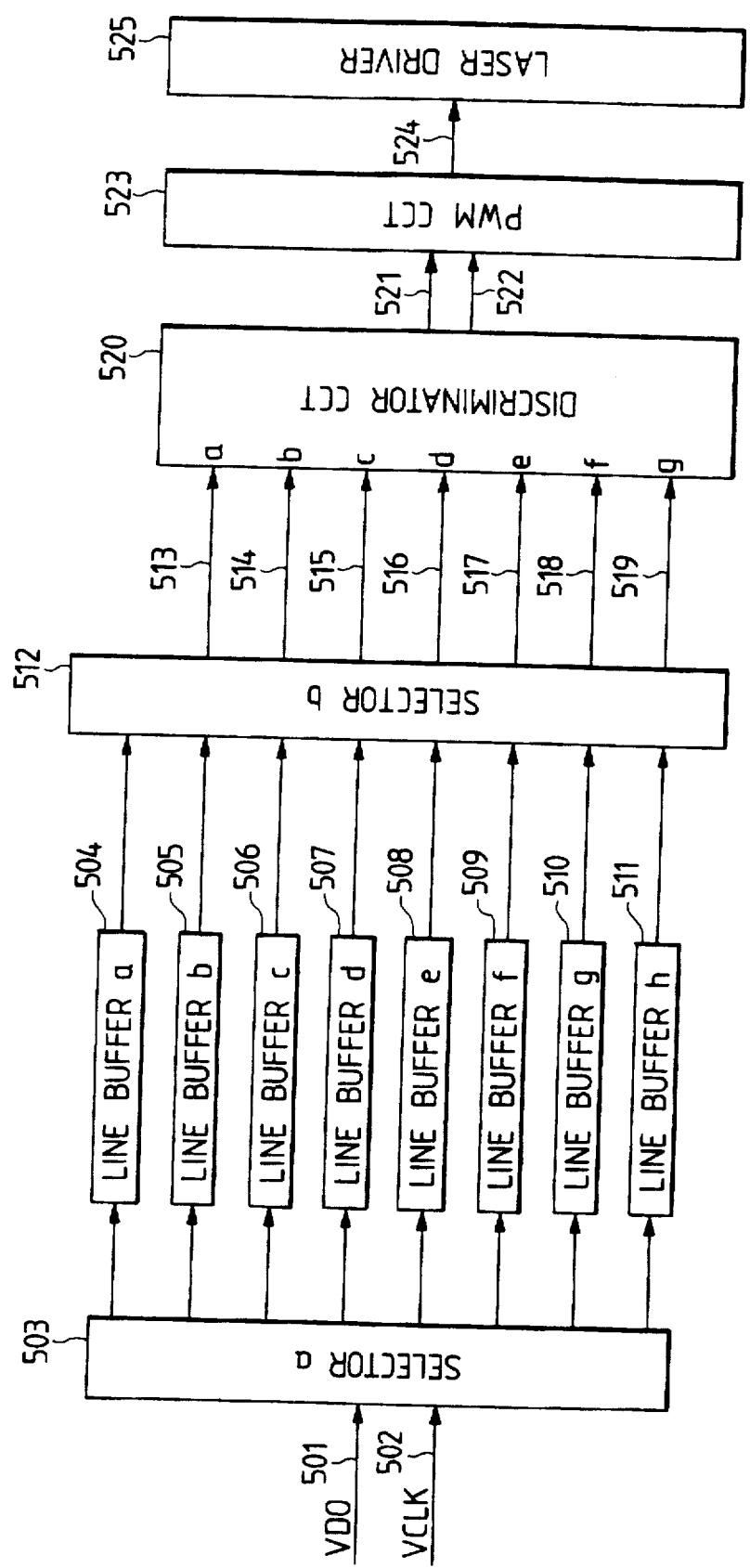
FIG. 80 is a block diagram showing an image processing apparatus comprising an image correction function.
Figure 81:
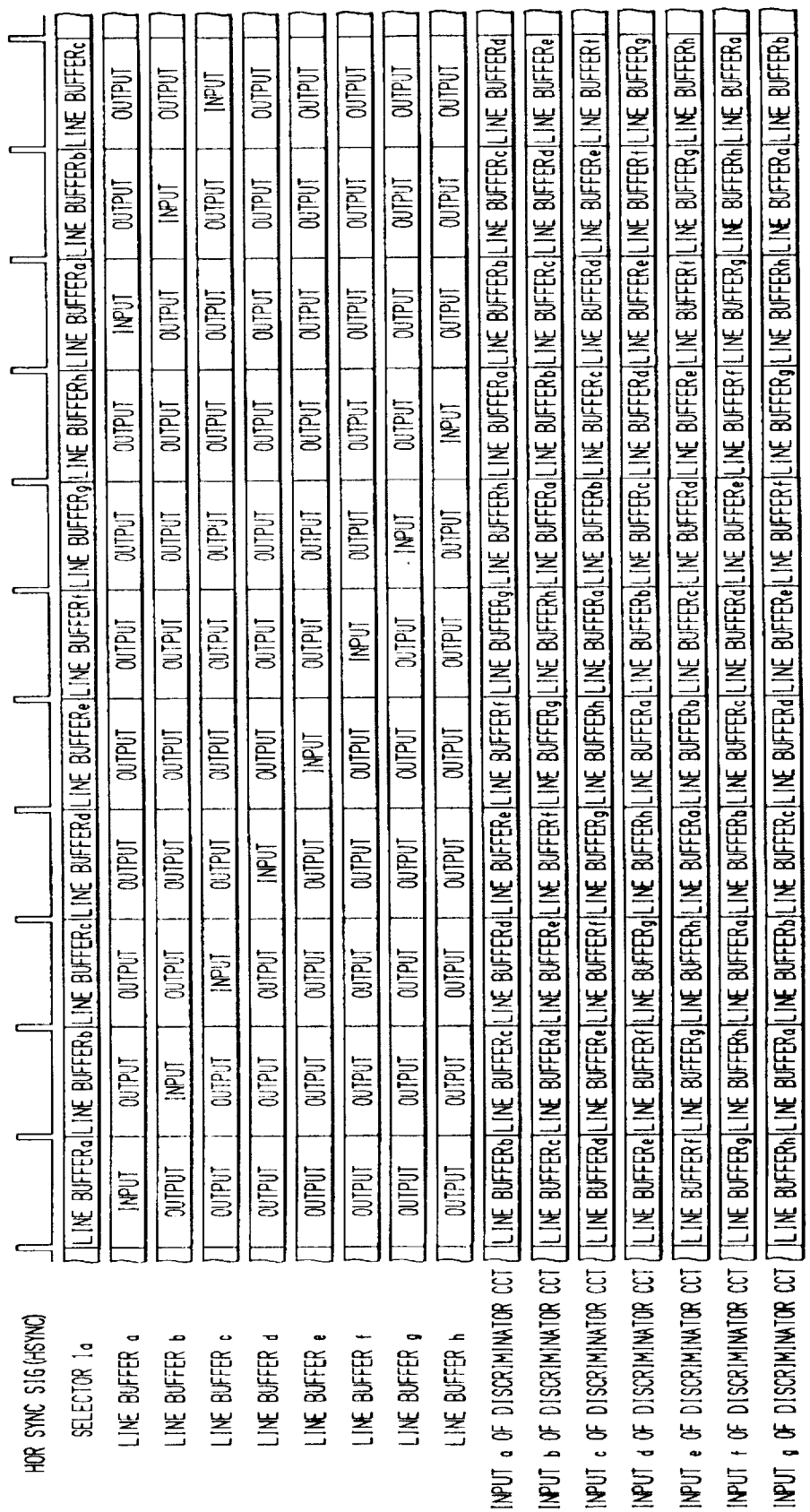
FIG. 81 is a timing chart showing an operation of the circuit shown in FIG. 80.

As described above, a pixel under consideration and its surrounding pixels are discriminated and an image is corrected according to the discrimination result to obtain a high-quality image. A circuit arrangement and an example of processing will be described below with reference to FIGS. 80 and 81. FIG. 80 is a block diagram of an image processing circuit comprising an image correction function, and FIG. 81 is a timing chart thereof.

The circuit shown in FIG. 80 is inserted between the printer controller 52 and the printer engine 51 shown in FIG. 1. In this embodiment, the circuit shown in FIG. 80 is arranged as part of the printer engine 51 (of course, it may be arranged as part of the printer controller 52). The printer controller 52 supplies an image signal (VDO) 501 to the printer engine in synchronism with a transfer clock signal (VCLK) 502. The printer engine stores the received image data in eight line buffers a (504) to h (511) in units of scan lines.

A selector a (503) distributes the data in units of scan lines, and selects buffers from the line buffer a (504) to the line buffer h (511) in turn and then selects the line buffer a (504) again. Of the eight line buffers a to h, the buffers other than the line buffer selected by the selector a repetitively output data therein. Each line buffer repetitively outputs the same content in units of scan lines, and continues this output operation until the next data is input. The data output from the seven buffers are input to terminals a to g of a discriminator circuit 520, as shown in FIG. 81. Upon selection by a selector b (512), a scan line including a pixel under consideration and three lines each above and below the scan line are input to the discriminator circuit 520. FIG. 82 shows in detail the discriminator circuit 520. The discriminator circuit 520 comprises shift registers 526a to 526g and a logic circuit 528. The shift register 526d is a shift register including a pixel under consideration, and a central hatched cell corresponding to the pixel under consideration. Pixel data of the pixel under consideration and surrounding pixels are input to the logic circuit 528. Since the shift registers 526a to 526g are shifted in synchronism with an image clock signal (not shown), the content input to the logic circuit 528 changes in synchronism with the image clock signal. The logic circuit 528 will be described in detail below.

FIGS. 83A to 83P explain judgement conditions for correction processing. Assuming that a hatched circle is a pixel under consideration, a solid black circle is a image-formation pixel, and a hollow circle is a non-image formation pixel. Referring to FIG. 83D, if a condition that two left neighboring pixels of the pixel under consideration, a pixel immediately below the pixel under consideration, and its right neighboring pixel are white (i.e., non-image formation) pixels, and a pixel immediately above the pixel under consideration and two right left neighboring pixels are black (i.e., image-formation) pixels is satisfied, and the pixel under consideration is a white pixel, the pixel under consideration is determined as one for which a smaller image is formed.

Figure 85:
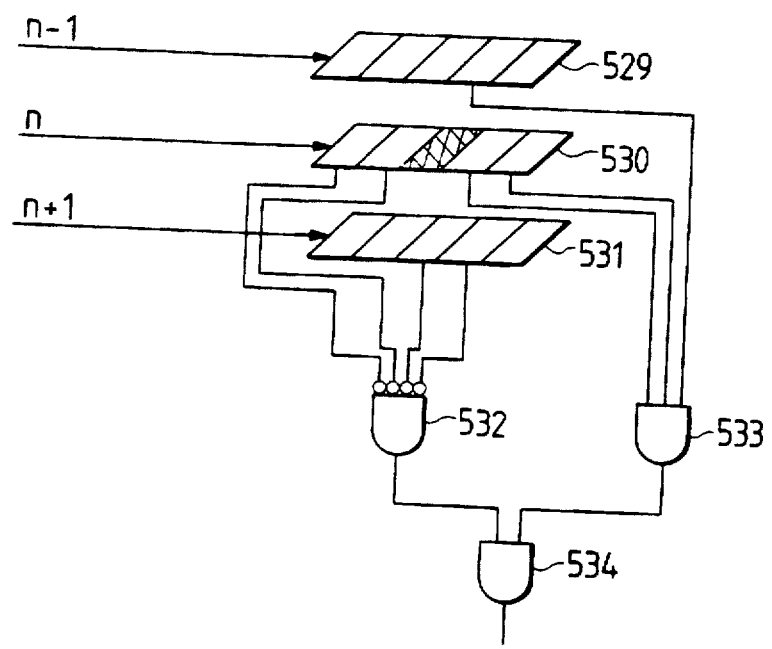
FIG. 85 is a circuit diagram showing a logic circuit 528.

However, further surrounding pixels (not shown) are not added to the judgement condition. The above judgement is made according to all the logics in FIGS. 83A to 83P, and if one of these logics is satisfied, the pixel under consideration is determined as a pixel for which a smaller image is formed. FIG. 84 shows its logical expression. Whether or not a central pixel under consideration A is formed as a smaller image is determined according to FIG. 84. In FIG. 84, overlined symbols correspond to white pixels, and symbols without overlines correspond to black pixels. The logic circuit 528 shown in FIG. 82 is constituted based on this logical expression. For example, a circuit of the pattern shown in FIG. 83D is formed as shown in FIG. 85. In FIG. 85, a portion corresponding to a pattern in FIG. 83D defined by a shift register 530 including a pixel under consideration and shift registers 529 and 531 including lines n−1 and n+1 above and below the pixel under consideration is judged by logical gates 532 to 534. Decision by this logic circuit is performed for all the patterns shown in FIGS. 83A to 83P.

A portion which is judged as a pixel for which a smaller image by the above logical expression is subjected to PWM (pulse width modulation) to form a smaller pixel. Note that the discriminator circuit 520 supplies, to a PWM circuit 523, a signal 521 indicating whether or not a dot is formed and a signal 522 indicating that whether or not a smaller dot is formed. The PWM circuit 523 supplies a drive signal 524 to a laser driver on the basis of the signals 521 and 522.

Figure 86:
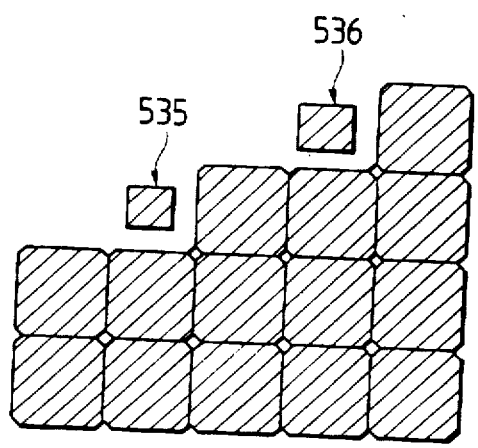
FIGS. 86 and 87 show output image samples.

FIG. 86 shows an image subjected to this processing.

Small dots are formed at hatched portions 535 and 536. These small dots are shifted to an image side upon development, and hence eliminate indentations formed in an oblique line.

Figure 87:
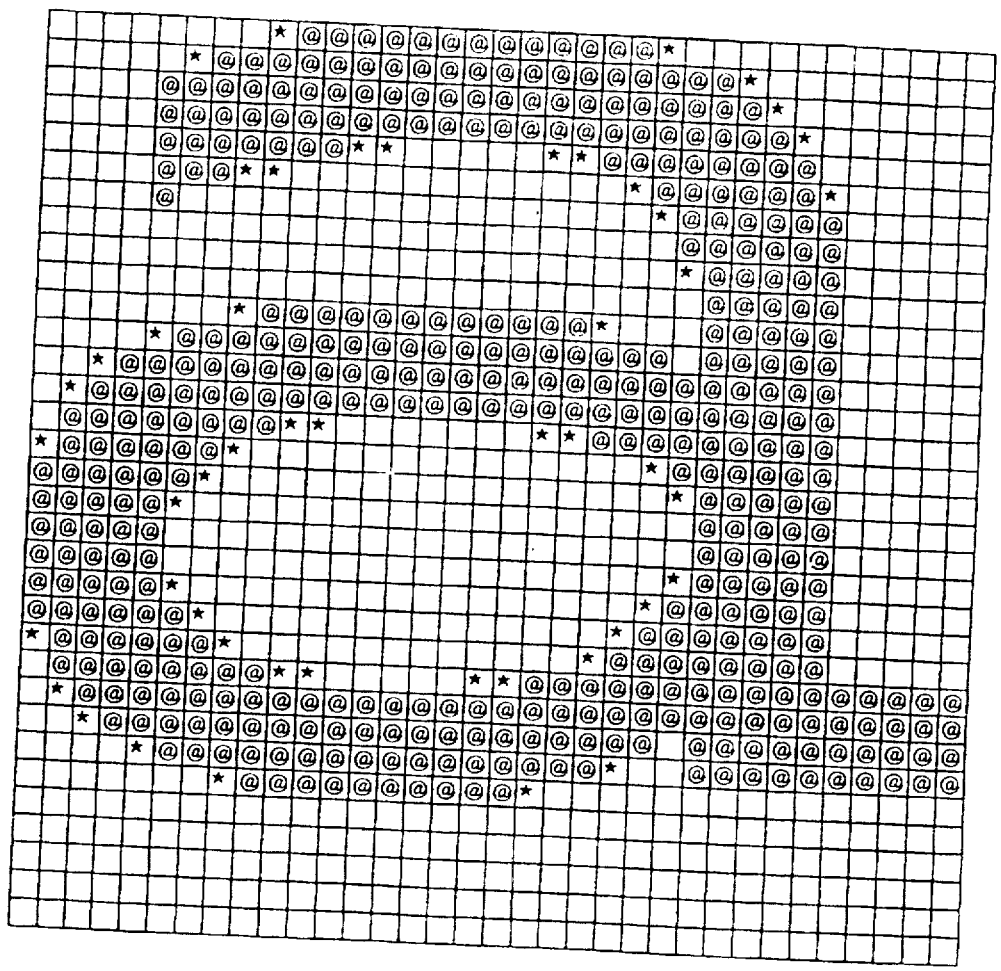

FIG. 87 shows a state wherein small dots are formed when this processing is performed for letter "a".

In FIG. 87, ⓐ indicates an original one dot, and * indicates a position where a small dot is formed. With this method, an oblique line portion can be smoothed by small dots.

In the above method, however, although the oblique line can be smoothed, a plurality of line buffers are necessary, as shown in FIG. 80, and a circuit becomes expensive.

Especially, when surrounding pixels are to be observed in a wide range, the number of line buffers must be increased, thus posing a problem of cost.

An apparatus which can eliminate the problem of cost will be described below.

Figure 70:
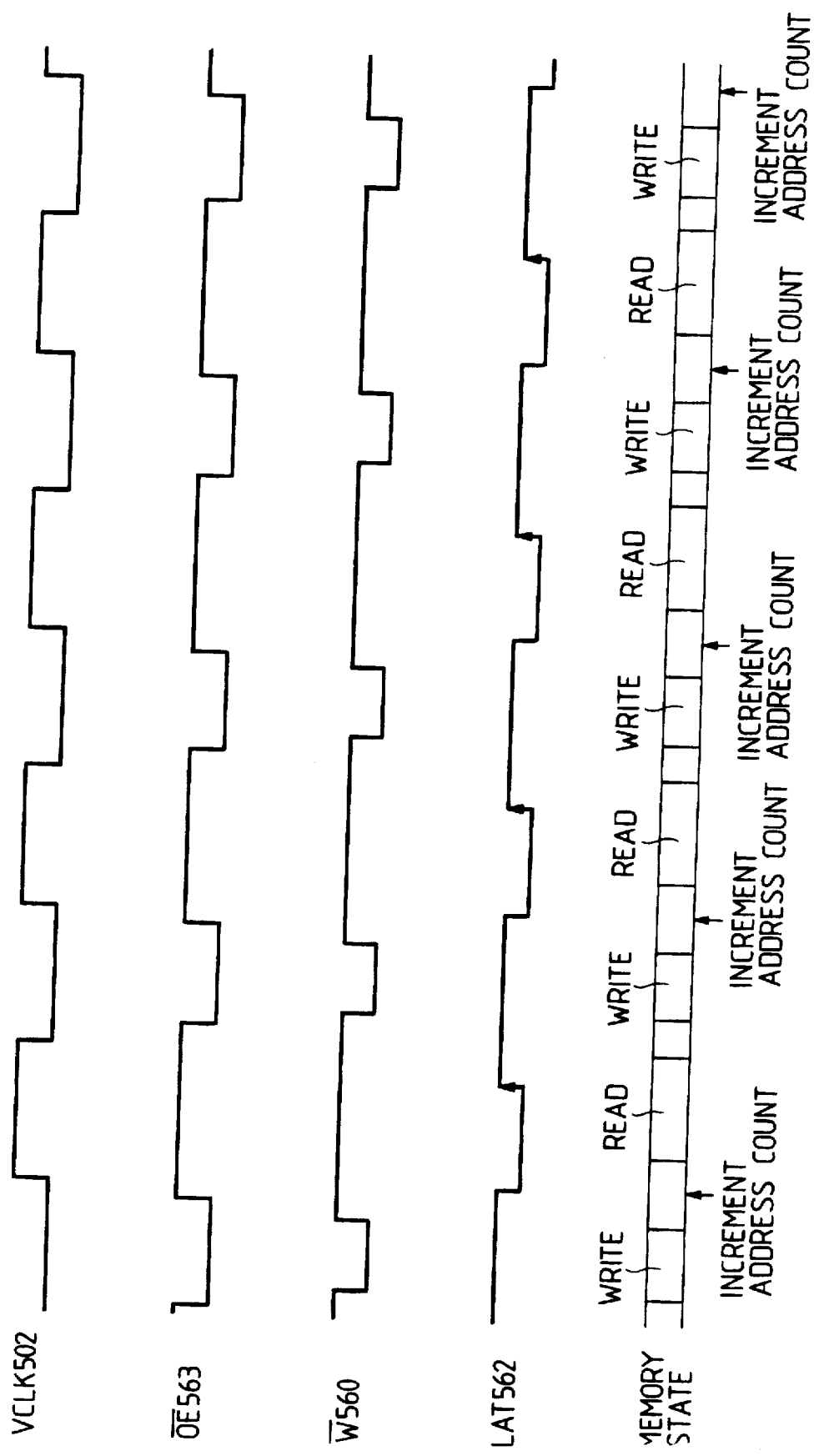
FIGS. 70 and 71 are timing charts showing an operation of the circuit shown in FIG. 69.
Figure 71:
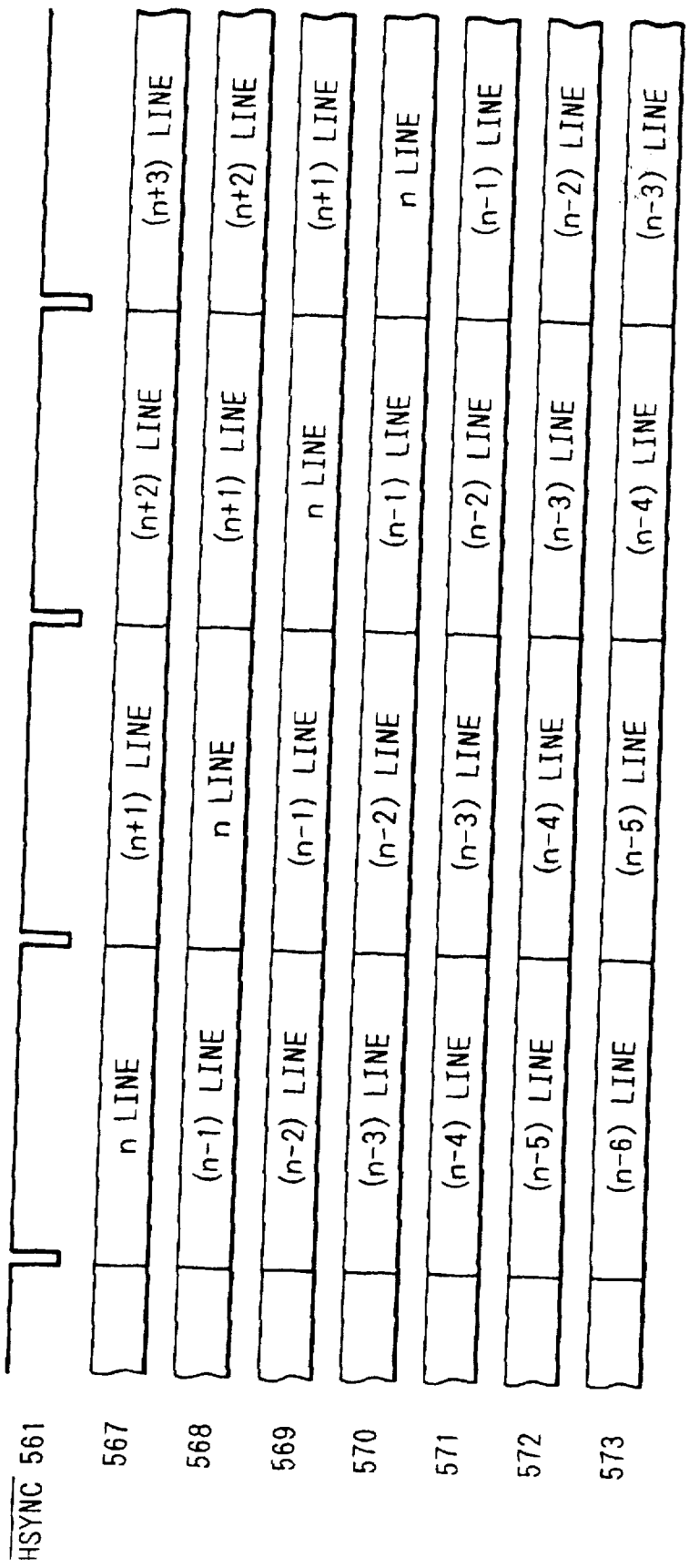

FIG. 69 shows an arrangement of an image processing apparatus in the 15th embodiment. Note that the same reference numerals denote parts having the same functions as in FIG. 80. FIGS. 70 and 71 are timing charts for explaining the operation of FIG. 69.

Sequentially input pixel signals VDO (501) are input to bit "0" of a memory 565 through a 3-state latch 564. During this operation, the content of an address counter 566 is incremented in response to an image clock signal VCLK (502), so that the present pixel signal VDO (501) is stored at bit "0" in the order starting from address "0" of the memory 565.

When the 1-line pixel signals VDO (501) are stored at the position of bit "0", the address counter 566 is reset in response to a horizontal sync signal HSYNC. Thereafter, the next line pixel signals are similarly stored at bit "0". In this case, the 1-line data previously stored at bit "0" are supplied to a discriminator circuit 520 through the 3-state latch 564, and are simultaneously stored at bit "1" of the memory 565. The above-mentioned operation is repeated from bit "0" to bit "6". Thus, pixel data 567 to 573 for seven lines can be simultaneously and continuously supplied to terminals a to g of the discriminator circuit 520 without using the line buffers for eight lines as shown in FIG. 80. FIG. 71 is a timing chart of this operation.

In the 15th embodiment, four operations, i.e., the increment operation of the address counter 566, read access of the memory 565, the latch operation of the 3-state latch 564, and write access of the memory 565 must be performed during formation of one pixel. FIG. 70 shows the timings of these operations.

The increment operation of the address counter 566 is started at the leading edge of the image clock signal VCLK (520), thus starting a read mode. At the trailing edge of the signal VCLK (502), the read mode is terminated. When data read from the memory is attained during the read mode period, the readout data is latched in the 3-state latch 564. In FIG. 70, a timing signal LAT (562) is used by the 3-state latch 564 for latching data read out from the memory 565. The latched value is returned to the memory in response to a timing signal $\overline{OE}$ (563), and is written in the memory in response to a timing signal $\overline{W}$ (560).

With the above operation, pixel data input to the discriminator circuit 520 is converted to a reproduced image by the above-mentioned method. As described above, the discriminator circuit 520 determines on the basis of data corresponding to a pixel under consideration and its surrounding pixels whether or not a dot is formed for the pixel under consideration, and a size when the pixel under consideration is reproduced.

The PWM circuit 523 supplies a PWM signal to a laser driver 525 on the basis of the signals 521 and 522 supplied from the discriminator circuit 520. When the signal 521 indicates formation of a dot and the signal 522 indicates a dot of a normal size, the PWM circuit 523 outputs a pulse signal of a predetermined pulse width. When the signal 521 indicates formation of a dot and the signal 522 indicates a dot of a size smaller than the normal size, the PWM circuit 523 outputs a pulse signal having a smaller pulse width than the predetermined pulse width.

(16th Embodiment)

Figure 72:
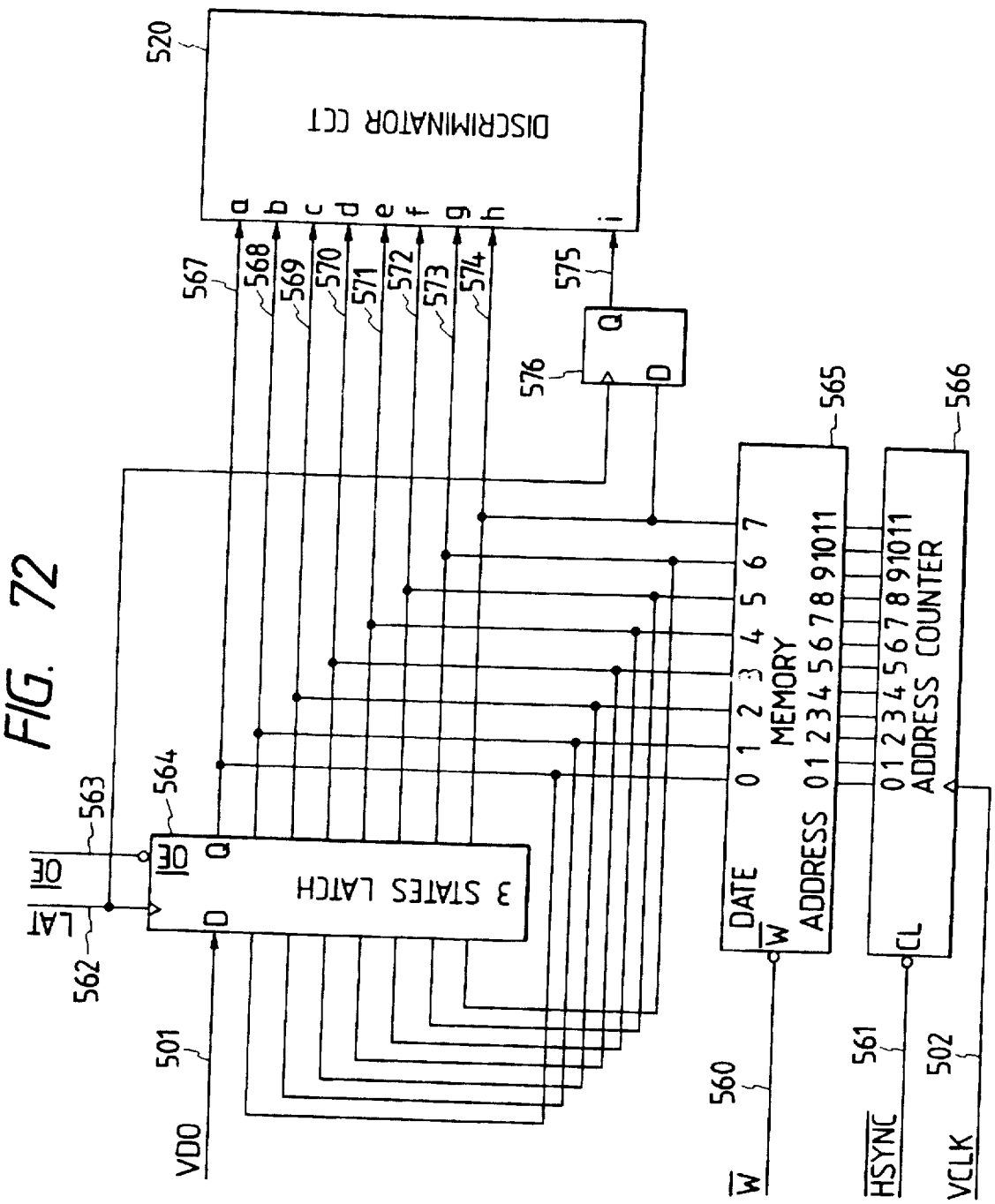
FIG. 72 is a block diagram showing an image processing apparatus according to a 16th embodiment of the present invention.

In the 15th embodiment, data from the memory 565 is input to the discriminator circuit 520. FIG. 72 shows an embodiment wherein data (8 bits in this embodiment) from a memory and a signal VDO (501) are input to the discriminator circuit 520. The same reference numerals denote the parts having the same functions as in FIG. 69, and a circuit after the discriminator circuit 520 is omitted. After the pixel signal VDO (501) is latched by a latch 564, it is input to a terminal a of the discriminator circuit 520, and data from a 7th bit of a memory 565 is latched by a latch 576 and is input to a terminal i of the discriminator circuit 520. Thus, data of lines corresponding in number to (the maximum number of bits+1) of the memory used can be input to the discriminator circuit 520. With this arrangement, surrounding pixel data in a wider range can be input. Note that the timings of signals LAT (562), $\overline{OE}$ (563), $\overline{W}$ (560), $\overline{HSYNC}$ (561), and VCLK (502) are the same as those in FIG. 70.

(17th Embodiment)

In the above embodiment, an image is formed in synchronism with the clock signal VCLK (502). For this reason, when means for generating signal VDO (501) and VCLK (502) are different from a printer engine, for example, when the controller 52 (FIG. 1) generates the signals VDO (501) and VCLK (502), signals $\overline{W}$ (560), LAT (562), and $\overline{OE}$ (563) must be generated in synchronism with the signal VCLK (502). Therefore, the signals $\overline{W}$ (560), and the like must be transferred from the controller 52. In this case, connection between the controller 52 and the printer engine 51 is complicated. When the signals $\overline{W}$ (560) and the like are generated in the printer engine on the basis of the clock signal VCLK (502), the circuit arrangement is complicated.

The signal VCLK (502) is used as a pixel signal transfer clock, and is separated from an image formation clock SCLK (583) in the engine 51, thus simplifying the arrangement.

Figure 73:
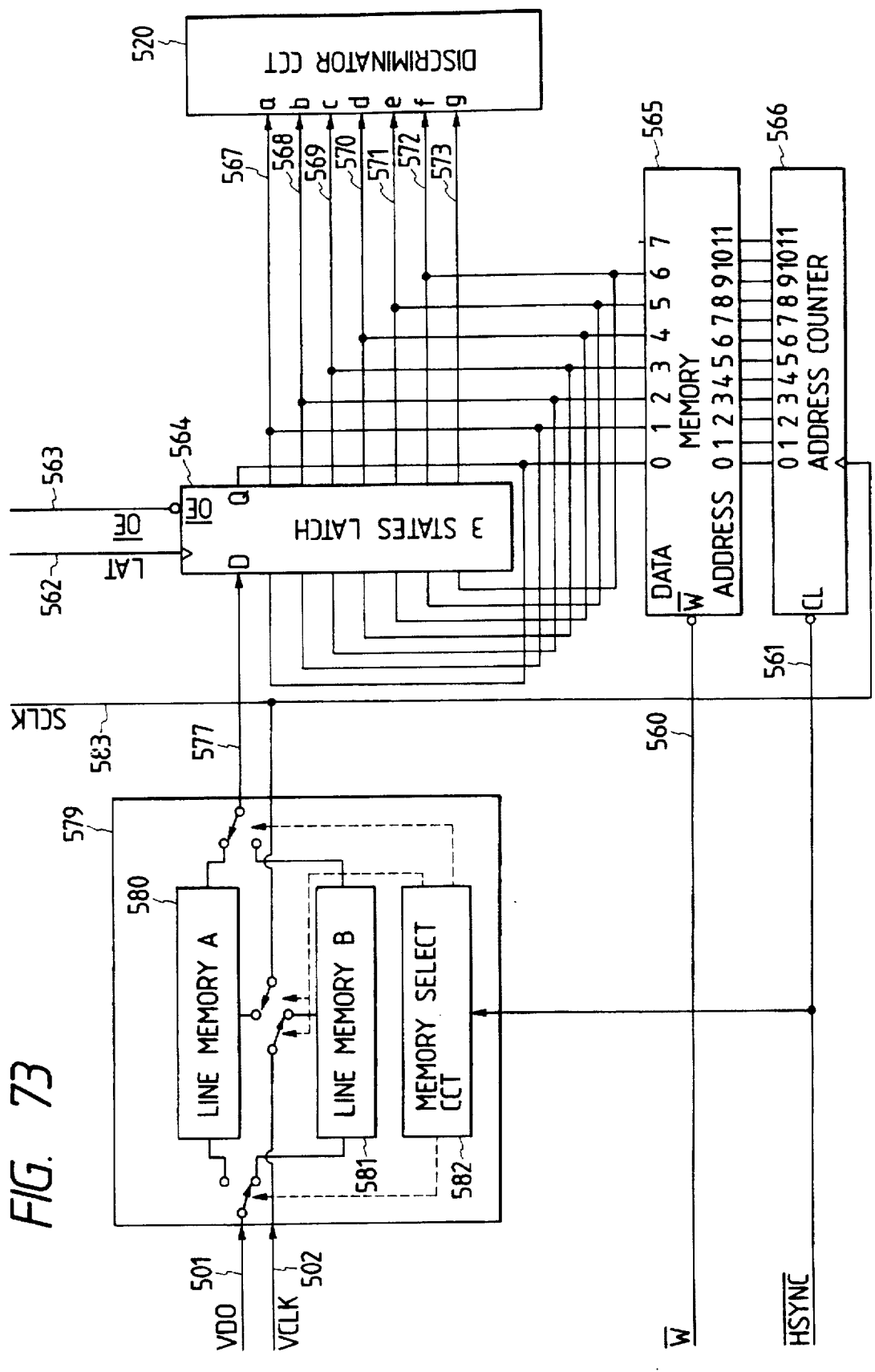
FIG. 73 is a block diagram showing an image processing apparatus according to a 17th embodiment of the present invention.

FIG. 73 shows an embodiment in this case. The same reference numerals denote the parts having the same functions as in FIG. 69, and a circuit after a discriminator circuit 520 is omitted. A toggle memory 579 switches between a line memory A (580) and a line memory B (581) in units of lines by a memory switching unit 582 in synchronism with a horizontal sync signal HSYNC (561).

Assuming that a pixel signal VDO (501) is being written in the line memory B in synchronism with the clock signal VCLK (502), the line memory A is set in a read enable state, and data (pixel signal VDO) 577 is read out therefrom in synchronism with the clock signal SCLK (583) generated in the printer engine. Note that the signals $\overline{W}$ (560), LAT (562), $\overline{OE}$ (563), and the like are generated based on the clock signal SCLK (583). Contrary to this, if the pixel signal VDO (501) is written in the line memory A in synchronism with the clock signal VCLK (502), the line memory B is set in a read enable state, and the data 577 is read out therefrom in synchronism with the clock signal SCLK (583).

The read and write states of the line memories A and B are selected in synchronism with a signal HSYNC (561).

Since other operations are the same as those in the 15th embodiment, a detailed description thereof will be omitted.

(18th Embodiment)

Figure 74:
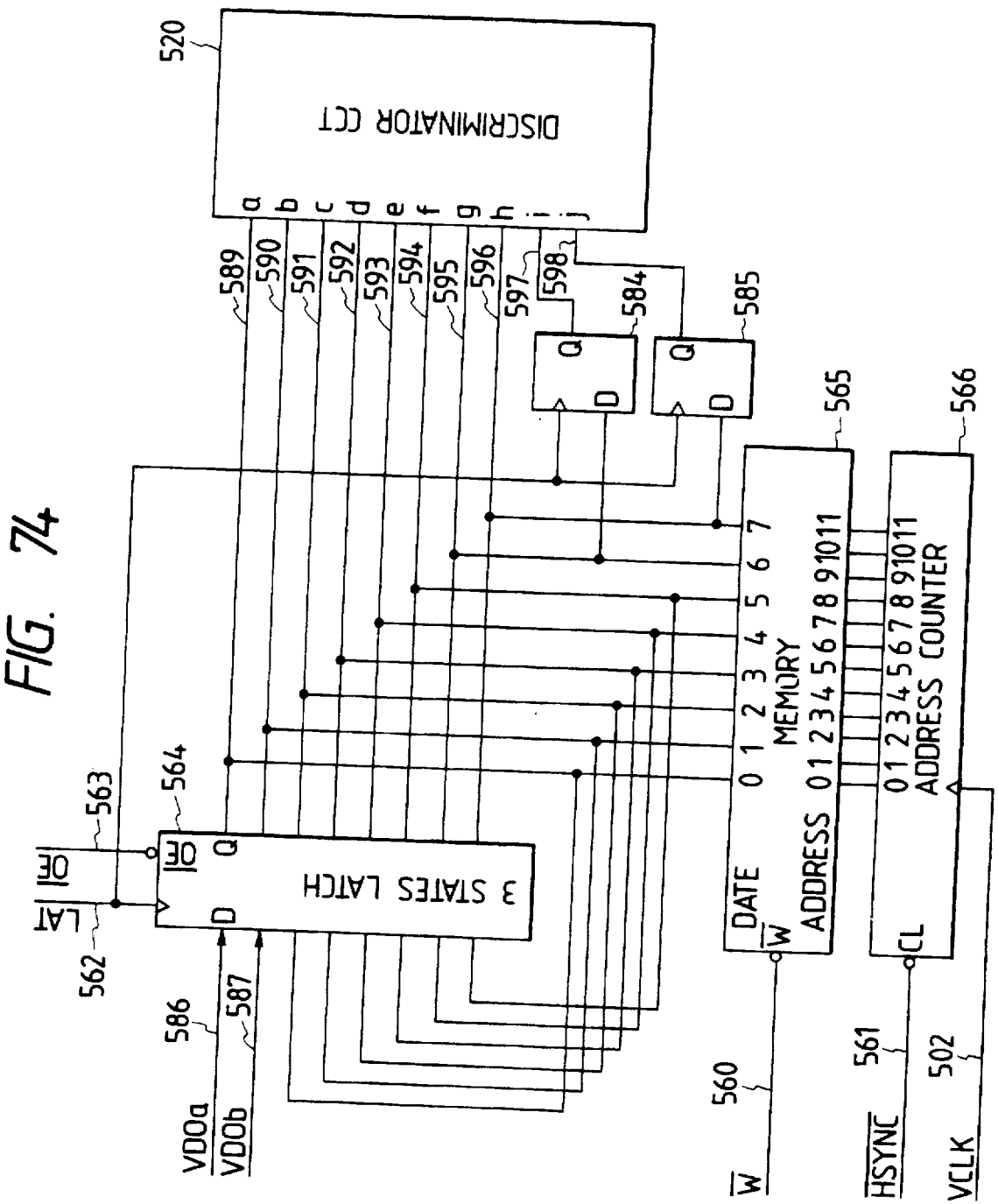
FIG. 74 is a block diagram showing an image processing apparatus according to an 18th embodiment of the present invention.

FIG. 74 shows an embodiment wherein image data is multi-value data.

Figure 75:
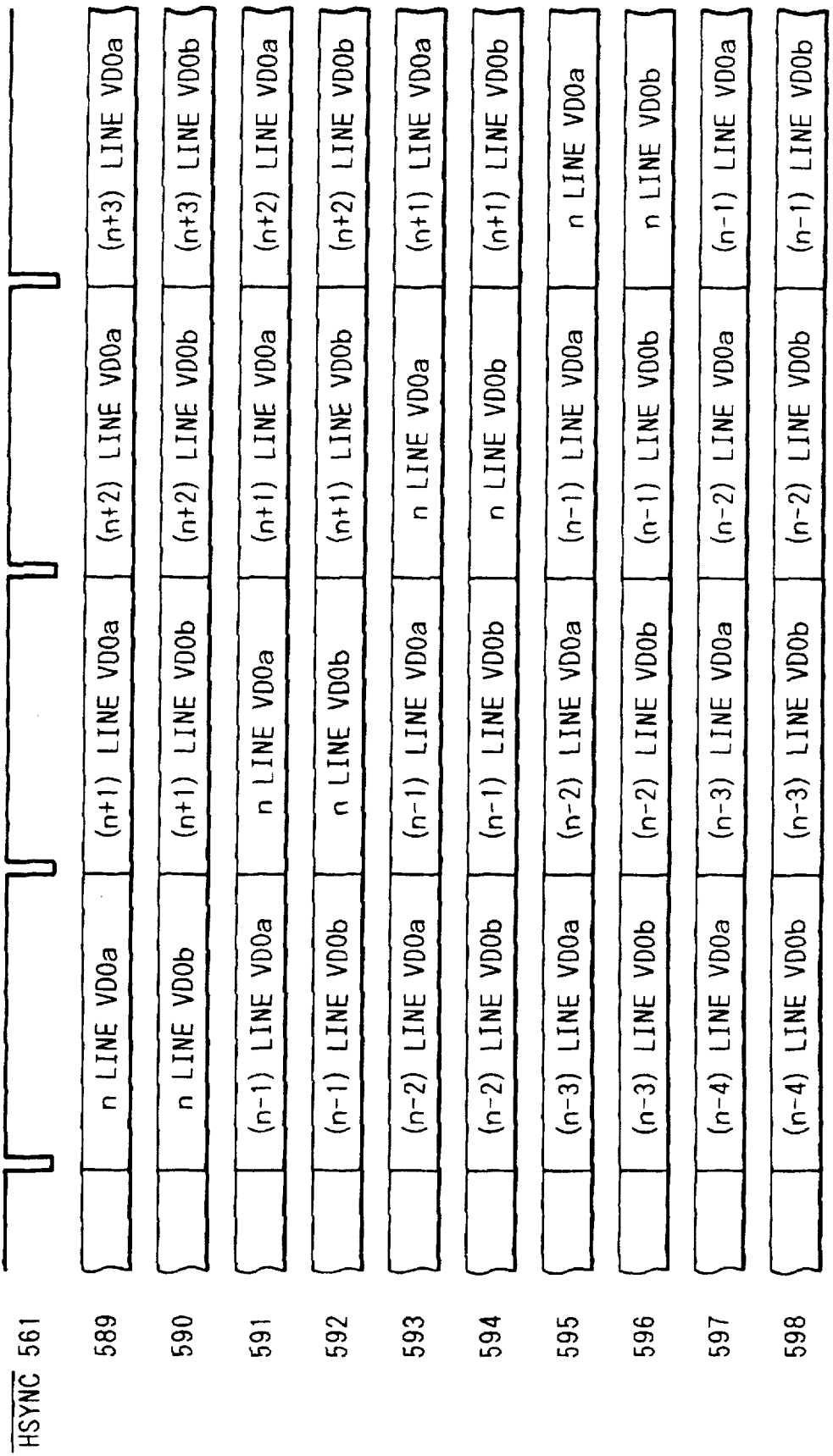
FIG. 75 is a timing chart showing an operation of the circuit shown in FIG. 74.

Note that the same reference numerals denote the parts having the same functions as in FIG. 69, and a circuit after the discriminator circuit 520 is omitted. The basic operation of this embodiment is the same as that in FIG. 69. 2-bit image data VDOa (586) and VDOb (587) are input to bits "0" and "1" of a memory 565 through a 3-state latch 564. Data at bits "0" and "1" are supplied to a discriminator circuit 520 through a 3-state latch 564, and are simultaneously input to bits "2" and "3" of the memory 565. Note that 584 and 585 designate latches. In this manner, when data are processed in units of 2 bits, multi-value data (589 to 598) for five lines including two upper (or lower) lines each can be supplied to the discriminator circuit 520. As a result, the discriminator circuit 520 can perform high-precision discrimination operation as compared to a case wherein binary data is input. FIG. 75 is a timing chart showing the operation of the circuit shown in FIG. 74.

In the 18th embodiment, 2-bit multi-value data has been exemplified. However, the present invention is not limited to the number of bits of multi-value data.

(19th Embodiment)

In the 16th embodiment, the number of lines processed by a single memory is (the number of bits+1). When the number of lines exceeds (the number of bits+1), a plurality of memories may be arranged, as shown in FIG. 76.

Figure 76:
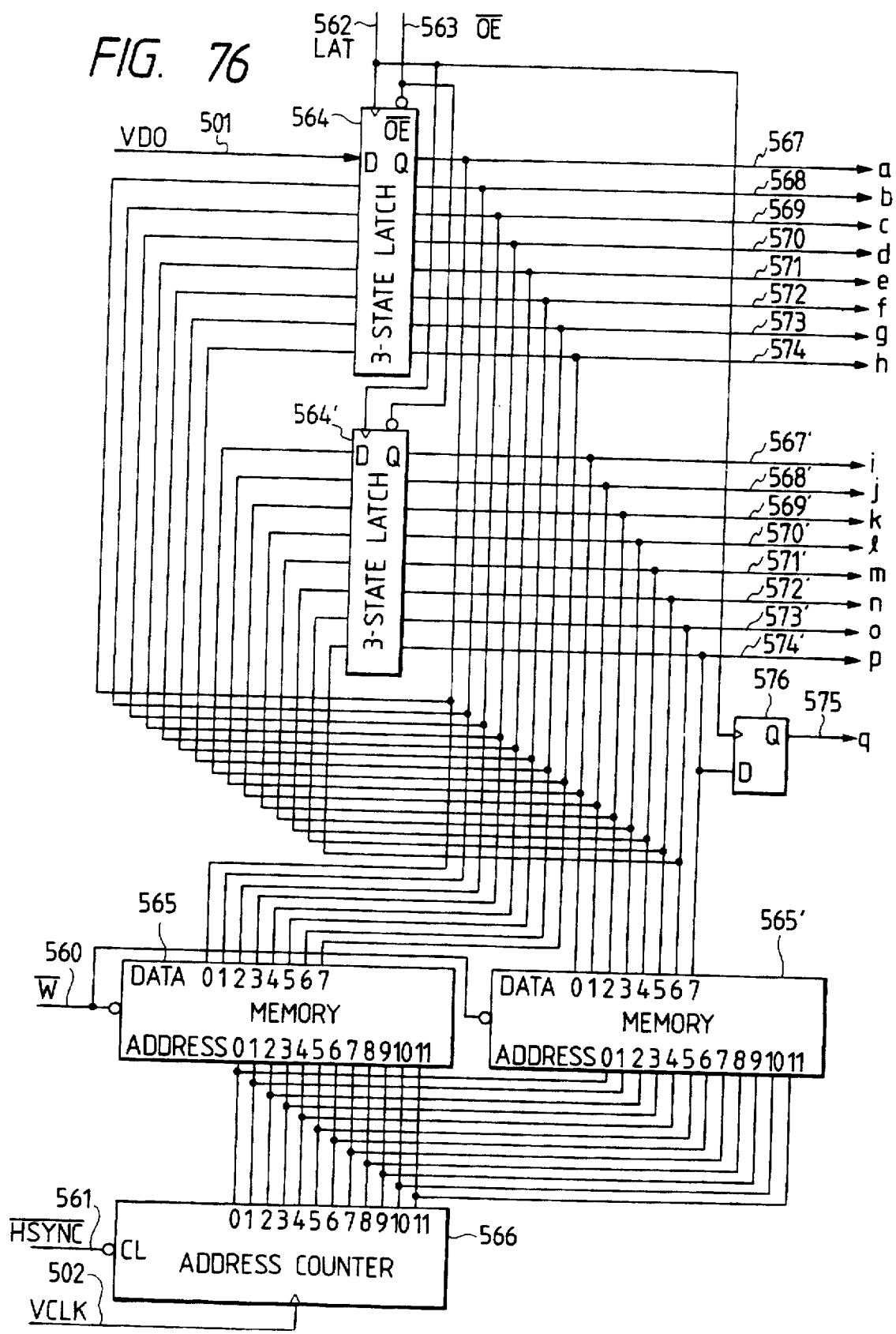
FIG. 76 is a block diagram showing an image processing apparatus according to a 19th embodiment of the present invention.

The image processing apparatus shown in FIG. 76 employs two memories, and can supply data (a to g) of 17 lines (567 to 575) to a discriminator circuit 520. Memories 565 and 565' are operated on the basis of the same control method as in the above embodiment.

Note that in FIG. 76, the same reference numerals denote the parts having the same functions as in FIG. 72, and the discriminator circuit 520, and the like are omitted. With this method, when a plurality of memories are connected, a buffer corresponding to the necessary number of lines can be constituted.

(20th Embodiment)

Figure 77:
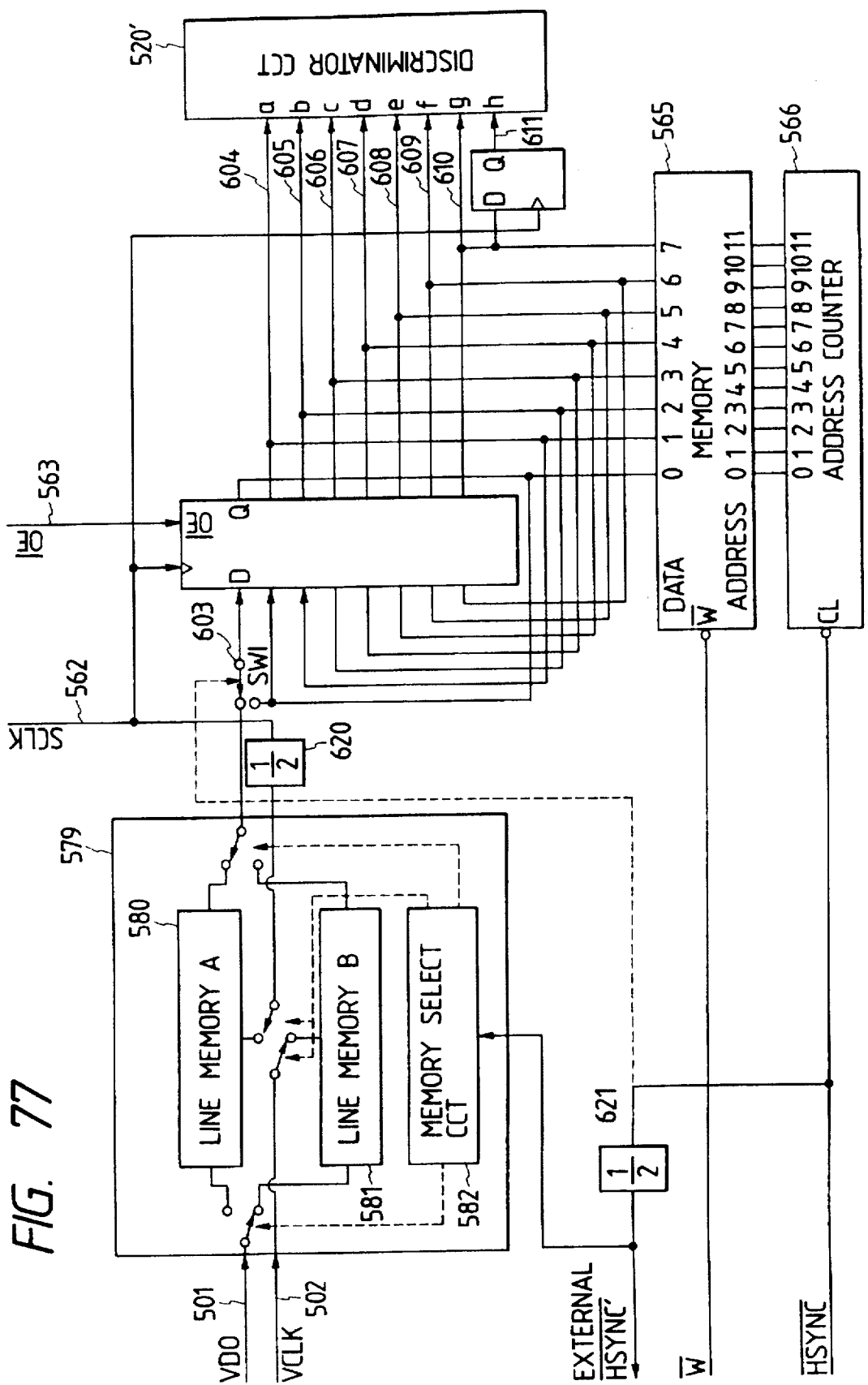
FIG. 77 is a block diagram showing an image processing apparatus according to a 20th embodiment of the present invention.

FIG. 77 shows an embodiment wherein the present invention is applied to a conversion circuit for adding interpolation data to data obtained from a controller having a resolution of 300 dpi and converting the data into data for a printer engine having a resolution of 600 dpi. Note that the same reference numerals denote the parts having the same functions as in FIG. 73, and the discriminator circuit 520', and the like are omitted.

Figure 78:
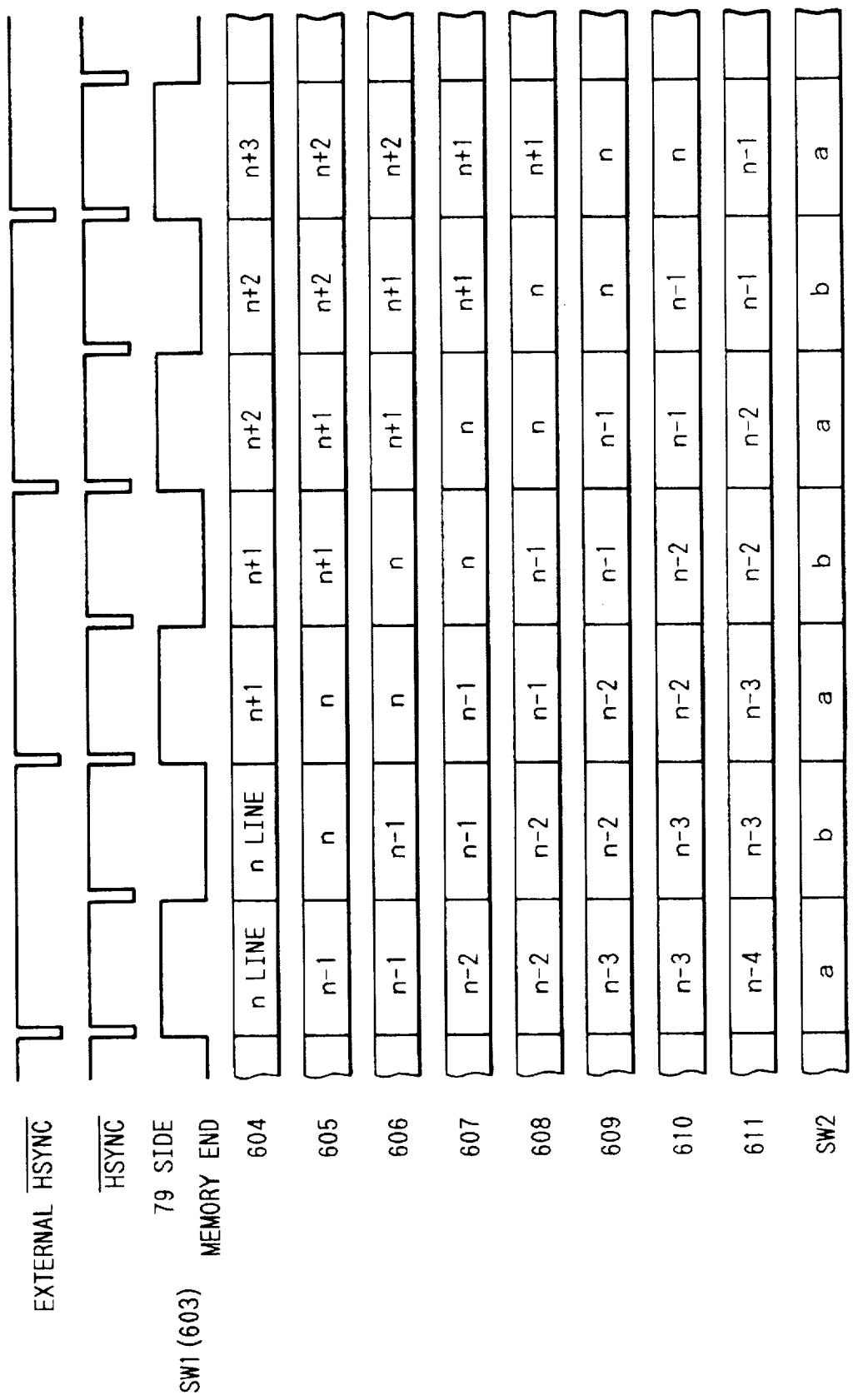
FIG. 78 is a timing chart showing an operation of the circuit shown in FIG. 77.
Figure 79:
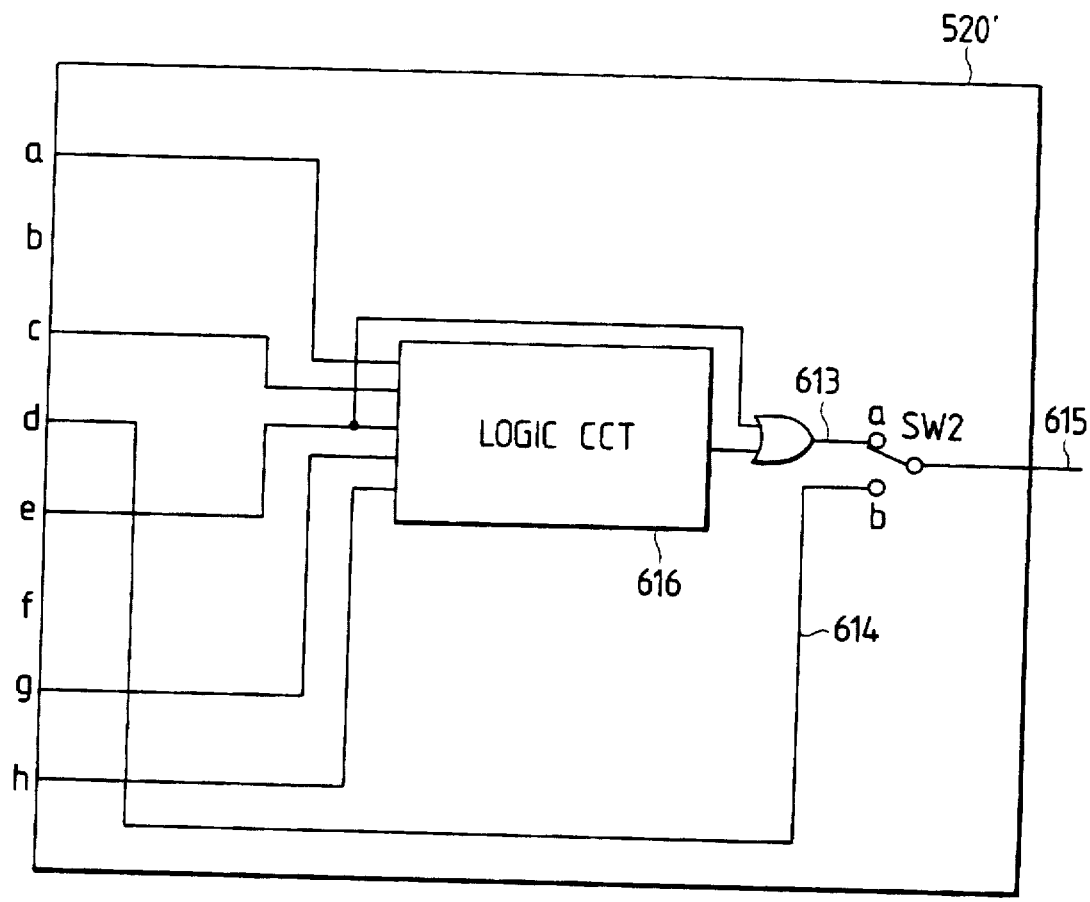
FIG. 79 is a circuit diagram of a discriminator circuit 520' shown in FIG. 77.

Pixel data VDO (501) and an image clock signal VCLK (502) for 300 dpi are input to a toggle buffer 579 which has been described in the 17th embodiment. Data is read out from the toggle buffer 579 at a frequency ½ that of a 600-dpi image clock signal SCLK (562), and is fetched in the memory in response to the 600-dpi clock signal SCLK, thus obtaining data which is doubled in size in the main scan direction. A switch SW1 (603) switches data from the toggle buffer 579 and data from a memory 565, and its switching timing is shown in FIG. 78. Note that the circuit shown in FIG. 77 includes a frequency divider 620 for ½ frequency-dividing the image clock signal SCLK, and an external horizontal sync signal generator 621 for supplying an external horizontal sync signal $\overline{HSYNC}'$ to an external apparatus every two horizontal sync signals $\overline{HSYNC}$. When the switch SW1 is switched in units of main scan lines, the same main scan data on lines 604 to 611 appear twice. The data are input to a discriminator circuit 520' shown in FIG. 79, thus forming an interpolated line 615 to which 300 dpi is converted to 600 dpi.

A switch SW2 can be switched between terminals a and b. When the switch SW2 is switched to the terminal a side, the interpolated line can be formed, and an output 613 from a logic circuit 616 is obtained. The logic circuit 616 forms the interpolated line with the two vertically adjacent lines, and can employ the above-mentioned methods.

According to the 15th and subsequent embodiments, image data is managed in units of lines, and data in units of lines is stored in corresponding bits of a memory. As a result, a plurality of line memories can be substituted with one memory, thus improving economy.

Note that in the 15th and subsequent embodiments described above, a memory has a capacity corresponding to 1 main scan line×7 bits. However, a memory having a capacity corresponding to m words×n bits (m and n are natural numbers) may be used.

In the above embodiments, a plurality of pixel data are input to the discriminator circuit. However, a plurality of pixel data may be input to processing circuits other than the discriminator circuit.

The present invention is not limited to the above embodiments, and various changes and modifications may be made within the scope of the claims.

What is claimed is:

1. A data processing apparatus comprising:

image data generating means for generating binary image data of a first density; and converting means for converting the first density binary image data generated by said image data generating means into smoothed binary image data in which notches in lines oblique to main scan and sub-scan directions of the binary image data are smoothed, wherein said converting means comprises storage means for storing the first density binary image data generated by said image data generating means and smoothing means for smoothing a notch pattern in the first density binary image data, said smoothing means smoothing the notch pattern on the basis of a state of a pattern formed by plural pixels of the first density binary image data stored in said storage means, and wherein said converting means produces smoothed binary image data of a second density higher than the first density in the sub-scan direction and produces smoothed binary image data in a third density higher than the first and second densities in the main scan direction.

2. An apparatus according to claim 1, wherein said converting means converts the first density image data into the smoothed image data on the basis of a specific logical expression.

3. An apparatus according to claim 1, wherein said notches are right-angle notches formed by intersection of at least two pixels in a main-scan and a sub-scan direction.

4. A data processing apparatus comprising:

image data generating means for generating image data of a first density;

converting means for converting the first density image data generated by said image data generating means into image data of a second density; and discriminating means for discriminating whether the first density image data represents a character image or a picture image, wherein said converting means has at least first and second conversion modes which are different, and wherein in the first conversion mode said converting means converts the first density image data into the second density image data with smoothing such that notches in oblique lines of the image data are smoothed, and wherein in the second conversion mode said converting means converts the first density image data into the second density image data without smoothing, and wherein in a case where said discriminating means discriminates that the first density image data represents a character image, said converting means converts the first density image data into second density image data utilizing the first conversion mode, and in a case where said discriminating means discriminates that the first density image data represents a picture image, said converting means converts the first density image data into second density image data utilizing the second conversion mode.

5. An apparatus according to claim 4, wherein said notches are right-angle notches formed by intersection of at least two pixels in a main-scan and a sub-scan direction.

6. An apparatus according to claim 4, wherein said converting means conducts a converting operation thereof in the first conversion mode regarding a character image.

7. A data processing apparatus comprising:

input means for inputting pixels of binary image data of a first density;

storage means for storing plural lines of binary image data input by said input means;

detecting means for detecting a right-angled part of the first density binary image data;

smoothing means for producing smoothed binary image data of a second density higher than the first density, said smoothing means smoothing a notch pattern in the first density binary image data on the basis of a state of a pattern formed by plural pixels of the first density binary image data stored in said storage means; and inhibit means for inhibiting a smoothing process of said smoothing means in a case where said detecting means detects the right-angled part.

8. A recording apparatus comprising:

input means for inputting plural lines of information of a first density;

laser beam modulating means for modulating a laser beam;

output means for outputting a signal for scanning the laser beam in a sub-scan direction at a second density n times ($n \geq 2$) as high as the first density;

forming means for forming an image onto a photosensitive drum on the basis of the laser beam;

beam detect means for detecting a scan position of the laser beam in a main scan direction;

storage means for storing M×N bits of the inputted information wherein M is a number of dots in the main scan direction and N is a number of lines in the sub-scan direction;

information converting means for discriminating a characteristic of the information stored in said storage means and for converting a line of first density information into smoothed information of a third density in which notches in lines oblique to the main scan and sub-scan directions are smoothed, the second density being m times (m>2) as high as the first density in the main scan direction and the third density being higher than the second density; and control means for controlling said information converting means to execute sequentially the conversion of the plural lines of information input by said input means in accordance with the scan position detected by said beam detect means.

9. An apparatus according to claim 8, wherein said notches are right-angle notches formed by intersection of at least two pixels in a main-scan and a sub-scan direction.

* * * * *

UNITED STATES PATENT AND TRADEMARK OFFICE
CERTIFICATE OF CORRECTION

PATENT NO. : 5,754,188

DATED : May 19, 1998

INVENTOR : KAORU SETO, et al.

It is certified that error appears in the above-identified patent and that said Letters Patent is hereby corrected as shown below:

On the cover page, an inventor's name is misspelled and should be changed from "Michio Ito," to --Michio Itoh,--.

COLUMN 1

Line 33, "many" should read --much--.

COLUMN 2

Line 56, "compare &" should read --compare and--.

COLUMN 3

Line 1, "compare &" should read --compare and--.

Line 43, "compare &" should read --compare and--.

COLUMN 5

Line 42, "lines" should read --line--.

UNITED STATES PATENT AND TRADEMARK OFFICE
CERTIFICATE OF CORRECTION

PATENT NO. : 5,754,188

DATED : May 19, 1998

INVENTOR : KAORU SETO, et al.

It is certified that error appears in the above-identified patent and that said Letters Patent is hereby corrected as shown below:

COLUMN 6

Line 39, "execute" should read --executes--

COLUMN 7

Line 13, "compare &" should read --compare and--.

COLUMN 11

Line 52, "n th" should read --nth--.

COLUMN 13

Line 7, "compare &" should read --compare and--.

Line 18, ""3"-bit" should read --3-bit--.

UNITED STATES PATENT AND TRADEMARK OFFICE
CERTIFICATE OF CORRECTION

PATENT NO. : 5,754,188

DATED : May 19, 1998

INVENTOR : KAORU SETO, et al.

It is certified that error appears in the above-identified patent and that said Letters Patent is hereby corrected as shown below:

COLUMN 15

Line 8, delete "(dots/inch)".

Line 20, "has" should read --have--.

Line 55, "compare &" should read --compare and--.

COLUMN 18

Line 29, "stored" should read --stores--

COLUMN 20

Line 31, "the" should read --a--.

Line 32, "may" should read --may be--.

COLUMN 21

Line 16, "a image-" should read --an image- --.

UNITED STATES PATENT AND TRADEMARK OFFICE
CERTIFICATE OF CORRECTION

PATENT NO. : 5,754,188

DATED : May 19, 1998

INVENTOR : KAORU SETO, et al.

It is certified that error appears in the above-identified patent and that said Letters Patent is hereby corrected as shown below:

<u>COLUMN 24</u>

Line 6, "perform" should read --perform a--.

<u>COLUMN 25</u>

Line 6, "are" should read --in--.

Signed and Sealed this

Thirty-first Day of August, 1999

Attest:

Q. TODD DICKINSON

*Attesting Officer*       Acting Commissioner of Patents and Trademarks